(12) United States Patent  
Bascom

(10) Patent No.: US 7,389,241 B1  
(45) Date of Patent: Jun. 17, 2008

(54) METHOD FOR USERS OF A NETWORK TO PROVIDE OTHER USERS WITH ACCESS TO LINK RELATIONSHIPS BETWEEN DOCUMENTS

(75) Inventor: Thomas Layne Bascom, 7025 Elizabeth Dr., McLean, VA (US) 22101

(73) Assignee: Thomas Layne Bascom, McLean, VA (US)

( * ) Notice: Subject to any disclaimer, the term of this patent is extended or adjusted under 35 U.S.C. 154(b) by 1077 days.

(21) Appl. No.: 10/118,093

(22) Filed: Apr. 9, 2002

Related U.S. Application Data

(63) Continuation-in-part of application No. 10/090,740, filed on Mar. 6, 2002, now Pat. No. 7,111,232, which is a continuation-in-part of application No. 10/050,515, filed on Jan. 18, 2002.

(60) Provisional application No. 60/282,470, filed on Apr. 10, 2001, provisional application No. 60/273,520, filed on Mar. 7, 2001.

(51) Int. Cl.  
    *G06Q 99/00* (2006.01)
(52) U.S. Cl. .......................... 705/1; 707/501.1
(58) Field of Classification Search .............. 705/1; 707/501.1  
See application file for complete search history.

(56) References Cited

U.S. PATENT DOCUMENTS

| | | | |
|---|---|---|---|
| 5,204,947 A * | 4/1993 | Bernstein et al. ............ | 715/854 |
| 5,297,249 A * | 3/1994 | Bernstein et al. ............ | 715/854 |
| 5,608,900 A | 3/1997 | Dockter et al. | |
| 5,794,257 A * | 8/1998 | Liu et al. ................. | 715/501.1 |
| 5,895,470 A | 4/1999 | Pirolli et al. | |
| 5,933,827 A | 8/1999 | Cole et al. | |
| 5,940,831 A | 8/1999 | Takano | |
| 5,940,834 A | 8/1999 | Pinard et al. | |
| 5,943,670 A | 8/1999 | Prager | |
| 5,958,016 A * | 9/1999 | Chang et al. ................ | 709/229 |
| 5,966,126 A | 10/1999 | Szabo | |
| 5,999,929 A | 12/1999 | Goodman | |
| 6,009,410 A | 12/1999 | Le Mole et al. | |
| 6,035,281 A * | 3/2000 | Crosskey et al. .............. | 705/14 |

(Continued)

OTHER PUBLICATIONS www.uscity.net, retrieved from the Internet Archive Wayback Machine <www.archive.org>, Date Range: May 8, 1999-Oct. 11, 1999.*

(Continued)

*Primary Examiner*—Jonathan Ouellette  
(74) *Attorney, Agent, or Firm*—Andrews Kurth LLP

(57) ABSTRACT

Providing improvements in searching, identifying, and publishing information over computer networks, and on individual computers or other information access devices, by creating and sharing link relationships between documents distributed on the network, computers, or other devices. Further providing methods for billing for the use of link relationships to relate and search document objects. Methods for enabling users of a network to provide other users with access to link relationships between documents are described. In one example, this is accomplished by creating link directories for storing link relationships between documents and making the link relationships accessible to users. The users may populate the link directories with link relationships. Furthermore, the methods include a step of billing users based upon the link directories created and/or a step of billing users based upon the activity of users accessing the link directories.

78 Claims, 25 Drawing Sheets

U.S. PATENT DOCUMENTS

| | | | |
|---|---|---|---|
| 6,035,325 A | 3/2000 | Potts, Jr. | |
| 6,037,935 A | 3/2000 | Bates et al. | |
| 6,049,799 A | 4/2000 | Mangat et al. | |
| 6,073,135 A * | 6/2000 | Broder et al. | 707/100 |
| 6,092,074 A * | 7/2000 | Rodkin et al. | 707/102 |
| 6,112,202 A | 8/2000 | Kleinberg | |
| 6,145,000 A * | 11/2000 | Stuckman et al. | 709/219 |
| 6,182,072 B1 | 1/2001 | Leak et al. | |
| 6,182,113 B1 | 1/2001 | Narayanaswami | |
| 6,185,614 B1 | 2/2001 | Cuomo et al. | |
| 6,195,681 B1 * | 2/2001 | Appleman et al. | 709/203 |
| 6,209,036 B1 | 3/2001 | Aldred et al. | |
| 6,226,655 B1 | 5/2001 | Borman et al. | |
| 6,236,768 B1 | 5/2001 | Rhodes et al. | |
| 6,236,991 B1 | 5/2001 | Frauenhofer et al. | |
| 6,266,649 B1 | 7/2001 | Linden et al. | |
| 6,292,789 B1 * | 9/2001 | Schutzer | 705/40 |
| 6,311,194 B1 * | 10/2001 | Sheth et al. | 715/505 |
| 6,356,922 B1 | 3/2002 | Schilit et al. | |
| 6,489,968 B1 * | 12/2002 | Ortega et al. | 715/713 |
| 6,581,065 B1 * | 6/2003 | Rodkin et al. | 707/102 |
| 6,606,619 B2 * | 8/2003 | Ortega et al. | 707/2 |
| 6,725,227 B1 * | 4/2004 | Li | 707/102 |
| 6,772,139 B1 * | 8/2004 | Smith, III | 707/3 |
| 6,882,995 B2 * | 4/2005 | Nasr et al. | 707/3 |
| 6,948,135 B1 * | 9/2005 | Ruthfield et al. | 715/854 |
| 6,981,040 B1 * | 12/2005 | Konig et al. | 709/224 |
| 6,993,657 B1 * | 1/2006 | Renner et al. | 713/182 |
| 7,013,308 B1 * | 3/2006 | Tunstall-Pedoe | 707/104.1 |
| 7,020,679 B2 * | 3/2006 | Tian | 709/201 |
| 7,024,468 B1 * | 4/2006 | Meyer et al. | 709/220 |
| 2001/0034733 A1 * | 10/2001 | Prompt et al. | 707/102 |
| 2001/0052080 A1 * | 12/2001 | Dusenbury, Jr. | 713/201 |
| 2002/0065671 A1 * | 5/2002 | Goerz et al. | 705/1 |
| 2002/0124082 A1 * | 9/2002 | San Andres et al. | 709/225 |
| 2002/0198888 A1 * | 12/2002 | Young | 707/100 |
| 2003/0050916 A1 * | 3/2003 | Ortega et al. | 707/1 |
| 2005/0086186 A1 * | 4/2005 | Sullivan et al. | 706/16 |
| 2005/0114353 A1 * | 5/2005 | Malik et al. | 707/10 |
| 2006/0020586 A1 * | 1/2006 | Prompt et al. | 707/3 |

OTHER PUBLICATIONS

Goldfarb, Charles F., et al., "The XML Handbook", Third Edition, Prentice Hall PTR, Upper Saddle River, New Jersey, (selected portions/pages only) 2001.

Goldfarb, Charles F., et al., "The XML Handbook", Prentice Hall PTR, 2001, The handbook in its entirety.

DeRose, Steve, et al., "XML Linking Language (XLink) Version 1.0", www.w3.org/TR/xlink/, Jun. 27, 2001, pp. 1-34.

* cited by examiner

METHOD FOR USERS OF A NETWORK TO PROVIDE OTHER USERS WITH ACCESS TO LINK RELATIONSHIPS BETWEEN DOCUMENTS

This application is a continuation-in-part of U.S. application Ser. No. 10/090,740, filed Mar. 6, 2002 now U.S. Pat. No. 7,111,232, entitled A METHOD AND SYSTEM FOR MAKING DOCUMENT OBJECTS AVAILABLE TO USERS OF A NETWORK, which is a continuation-in-part of U.S. application Ser. No. 10/050,515, filed Jan. 18, 2002, entitled A SYSTEM AND METHOD FOR COLLECTING, STORING, MANAGING AND PROVIDING CATEGORIZED INFORMATION RELATED TO A DOCUMENT OBJECT, which claims priority from U.S. Provisional Application No. 60/273,520, filed Mar. 7, 2001, entitled SYSTEM AND METHOD FOR COLLECTING AND PROVIDING USERS WITH CATEGORIZED INFORMATION RELATED TO AN OPEN DOCUMENT and U.S. Provisional Application No. 60/282,470, filed Apr. 10, 2001, entitled SYSTEM AND METHOD FOR COLLECTING, STORING, MANAGING AND PROVIDING TO NETWORK USERS CATEGORIZED INFORMATION RELATED TO AN OPEN DOCUMENT.

This application also claims priority from U.S. application Ser. No. 10/090,739, filed Mar. 6, 2002, entitled FRAMEWORK FOR MANAGING DOCUMENT OBJECTS STORED ON A NETWORK, and from U.S. Provisional Application No. 60/273,520, filed Mar. 7, 2001, entitled SYSTEM AND METHOD FOR COLLECTING AND PROVIDING USERS WITH CATEGORIZED INFORMATION RELATED TO AN OPEN DOCUMENT and U.S. Provisional Application No. 60/282,470, filed Apr. 10, 2001, entitled SYSTEM AND METHOD FOR COLLECTING, STORING, MANAGING AND PROVIDING TO NETWORK USERS CATEGORIZED INFORMATION RELATED TO AN OPEN DOCUMENT, which are all hereby incorporated by reference.

TECHNICAL FIELD

The technical field is relating documents on computer networks and storing, indexing and presenting those relationships to network users.

BACKGROUND

Networks connecting many computers offer users access to a wide variety of information. Computers are exceptional devices for storing, sorting and relating large amounts of information. Information is stored on computers and networked computing and storage devices as documents or objects, together referred to as document objects. Such document objects may contain any form of information, from text documents and articles, financial data, statistical information, electronic mail, images and photos, music, animation, and even motion pictures.

The Internet, as a network of interconnected networks, offers users access to an even broader collection of information—the Worldwide Web (the "Web"). On the Web, publishers offer information for educational, recreational, and commercial purposes. The Internet, and it's predominant Web form, is organized and accessed by assigning document objects an address, or Uniform Resource Locator ("URL"). These URLs define the transfer protocol for and location of each individual document object on the Internet, or other network, including the Internetworking Protocol ("IP") address of the host computer system of the document object.

A URL may also represent an address including instructions for accessing a document object that is generated on request by retrieving and rendering for presentation organized information in response to information supplied by the requester. When the URL contains enough information to recreate the document object generated in such a manner, that document object can be recreated for others using the URL. A URL may also include information, sometimes called a bookmark, with information allowing the rendering tool to present or highlight a location in the document upon opening the document.

Users accessing computer networks and the Internet are generally required to perform their own searches across the networks for the information, stored as document objects, that they desire or need. As the amount of information available on computer networks, and on the Internet in particular, grows exponentially, existing search and information location techniques become increasingly less effective. Existing Internet search techniques often yield too many seemingly related references which are not, in fact, truly useful to the user. The usefulness of traditional Internet search and indexing systems is actually decreasing as the number of documents on the Internet explodes.

Existing search, categorization, and retrieval techniques for document objects stored on computer networks, while generally executed at the high speeds of modern computer systems, are increasingly imprecise and often much too broad, as well as time and labor intensive, owing to the explosion of information being added to those networks.

A need exists to enhance the network user's information search and access experience.

A need exists to provide network users with information relevant to the individual document object they are accessing and provide that information in a context of value to them by presenting relationships the document object they are accessing participates in with other document objects within a specific context. Such other document objects may or may not be offered by the publisher of the document object currently accessed. A need exists to provide network users with information relevant to the specific information the user may be searching for and relevant to the user's immediate personal, professional, geographic and other interests. A need further exists to enable users to derive value and/or revenue from providing this service to users.

A need exists for entities or groups to be able to communicate information to their employees or members as those employees or members access document objects on a network, and to enable those employees or members to view content deemed important to the entities or groups. A need further exists for publishers of content on the Internet to be able to personalize content presented to Internet users without requiring the establishment of a personal relationship between the user and the content publisher. A need exists to enable the collection of the search experiences of a group of users and share that experience with other users of networked information devices. A need further exists to enable users to derive value and/or revenue from the process of collecting and sharing search experiences with other users.

A need exists for creators of document object content to be able to distribute that content to users of a network with similar interests by means other than through a traditional website hosting service, Internet portal or by placement with a web search engine. A need further exists for content creators to derive value and/or revenue from the process of sharing their content with other users through the use of relationships with other document objects.

A need exists to aggregate related document objects on a user's computer, or other information access device, without modifying the document objects or the means by which they are stored.

SUMMARY

The systems, apparatus and methods of the present invention (hereinafter "Linkspace") incorporate and provide many improvements on existing methods for publishing, distributing, relating and searching document objects on computer networks, including the Internet.

Linkspace operates to provide many beneficial improvements in searching, identifying and publishing information over computer networks and on individual computers or other information access devices.

Linkspace permits a user of a computer, information access device, a computer network, or the Internet, to establish and/or search relationships between document objects located on the device, network or the Internet. Those relationships may comprise link relationships and link references and are maintained by Linkspace in one or more link directories. The contents of link directories may be organized, categorized, sorted, filtered and presented in groupings based on various criteria relating to, among other things, user interests and their attributes, the types of document objects and the nature of the content of those document objects. Linkspace allows a network user to be presented with a selection of links to document objects related to the document object the user is currently accessing based upon the URL of the current document object, and link relationships created by the user and other users of the network stored in the link directories.

When a network user equipped with Linkspace identifies and locates a first document object on the network that is of interest to her, she may initiate one method of the present invention to mark the location, through its URL, as a start point of a link relationship. When she accesses a second document object on the network that she considers relevant to the first document object, she initiates another step of one method of the invention to mark the second document object as an end point of the link relationship. Upon marking the second document object as the end point, the link relationship is created and stored on a link directory selected to store similar link relationships. When a second network user equipped with Linkspace, and with access to the link directory, accesses the first document object, he is then presented with a link to the second document object as a relevant document object that may be of interest to him. Likewise, if the second network user accesses the second document object, he may then be presented with a link to the first document object as a relevant document object that may be of interest to him.

Linkspace consists primarily of a system and method for creating and publishing link relationships, a system and method for storing and managing link relationships in link directories, and a system and method for searching and presenting a network user with links related by link relationships to the document object the user is currently accessing.

In one respect what is described is a method for enabling users of a network to provide other users with access to link relationships between document objects. The method includes a step for creating link directories storing the link relationships. The method also includes a step for making the link relationships accessible to users of the network and a step for allowing users to fill the link directories with link relationships between document objects. Furthermore, the method includes a step of billing users based upon the link directories created and/or a step of billing users based upon the activity of users accessing the link directories.

In yet another respect, what is described is a computer readable medium on which is embedded a program. The embedded program comprises modules that execute the above method.

Those skilled in the art will appreciate these and other advantages and benefits of various embodiments of the invention upon reading the following detailed description of a preferred embodiment with reference to the below-listed drawings.

DESCRIPTION OF THE DRAWINGS

The detailed description will refer to the following drawings, wherein like numerals refer to like elements, and wherein.

DETAILED DESCRIPTION

Figure 1:
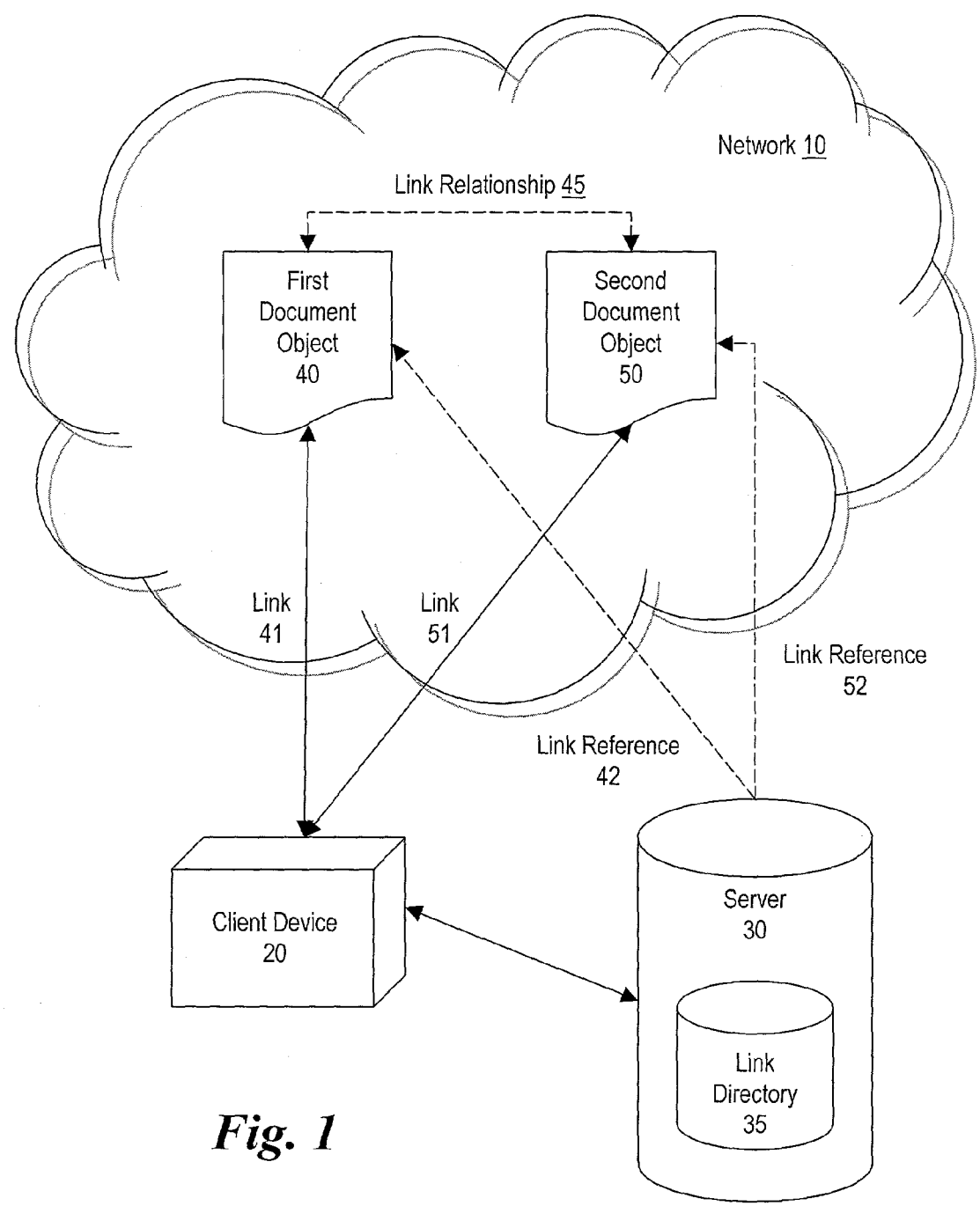
FIG. 1 is a diagram showing a system according to one embodiment of the invention.

FIG. 1 shows one embodiment of a system 100 for collecting, storing, managing and providing to network users categorized information related to an open document object. A document object may contain any form of information, including text documents and articles, financial data, statistical information, electronic mail, images and photos, music, voice data, animation, and even motion pictures, or may refer to a portion thereof. A document object may be dynamically created or formed. The system 100 includes a network 10, such as the Internet or other network of interconnected computers or a combination of networks and the Internet; one or more Linkspace-enabled client devices 20; one or more Linkspace-enabled servers 30, one or more first document objects 40; one or more second document objects 50; one or more link references 42 and 52, corresponding to the first document objects 40 and the second document objects 50 respectively; and one or more link relationships 45. The system 100 may also include one or more links 41 and 51 pointing to the first document objects 40 and second document objects 50 respectively. The client devices 20, as well as the server 30, are preferably Linkspace-enabled. The client device 20 may comprise a computer or other digital information device running software enabled by the present invention to create, filter, sort and display the link references 42, 52, and the link relationships 45. The server 30 may comprise a server computer or other digital information device running software enabling the present invention to store, index, search, filter, sort and transmit the link references 42, 52, and the link relationships 45 to client devices 20. The server 30 further comprises one or more link directories 35 for storing and indexing information regarding the link relationships 45 and link references 42 and 52 developed by the client devices 20 with respect to the one or more first documents 40 and second documents 50.

The link reference 42, 52 comprises a pointer to one document object 40, 50 on the network 10 and attributes associated with that document object 40, 50. The link relationship 45 comprises two pointers, one each to the first document object 40 and to the second document object 50, and attributes describing characteristics of the relationship between the two document objects 40, 50 related by the link relationship 45. The pointers included in a link relationship 45 may be comprised of pointers to a link reference 42, 52. The link relationship 45 establishes a meaningful relationship between two document objects 40, 50, whereas the locations of the document objects 40, 50 may be maintained within the Linkspace system 100 by means of the link references 42, 52.

The system 100 shown in FIG. 1 operates to create and store link relationships 45. The system 100 creates and stores link relationships 45 between a first document object 40 and a second document object 50, preferably on one or more servers 30 in one or more link directories 35 in the manner described as follows. The client device 20 is enabled by means of software or other devices to request, access and display document objects on the network 10. When the user of a client device 20 identifies one first document object 40 of interest to her that she wishes to associate with a second document object 50, she utilizes the software running on the Linkspace-enabled client device 20 to create a link relationship 45 between the first document object 40 and the second document object 50. This link relationship 45 is then stored on the server 30 in a link directory 35.

In an alternate embodiment, the system 100 may operate to perform the functions described above, including the creation of link relationships 45 and link references 42, 52, the storing of link relationships 45 and link references 42, 52, and providing access to and retrieval of link relationships 45 and link references 42, 52, by means of automated procedures requiring little or no user interaction.

When a client device 20 later requests and accesses a first document object 40 for which the server 30 has stored an associated link relationship 45 in one or more link directories 35, the server 30 delivers to the client device 20 the link references 42 and the link relationships 45, along with contextual information, or attributes, associated with the link references 42 and the link relationships 45. The client device 20 then displays to the user of the client device 20 the existence of a link relationship 45 between the first document object 40 being accessed by the client device 20 and the second document object 50. This enables the user of the client device 20 to be made aware of the second document object 50, the context of the second document object 50, and the context of the relationship between the second document object 50 and the first document object 40 as that relationship may be of interest to the user of the client device 20 while viewing the first document object 40.

Each link relationship 45 may also operate in the reverse direction. In this manner, when a user of the client device 20 is accessing the second document object 50 for which an associated link relationship 45 is stored in the one or more link directories 35 on the server 30, the server 30 then transmits the link references 42 and the link relationships 45, with contextual information, to the client device 20. This enables display of the availability of the related first document object 40 to the user of the client device 20 with the context of the first document object 40, and within the context of its relationship to the displayed second document object 50.

While the system 100 is generally described as having enabling software resident on the client device 20 and on the server 30, various other software configurations are possible, including having all of the software resident at either the server 30 (making the client device 20 essentially a "dumb terminal") or at the client device 20 (making the client device 20 essentially perform server functions), or various software sharing arrangements. For example, the client device 20 may include the one or more link directories 35, a communications module (described later in reference to FIG. 3a), and a user data store that may maintain information regarding authorized users of the client device 20 (described later in reference to FIGS. 2, 3a, and 3b).

Figure 2:
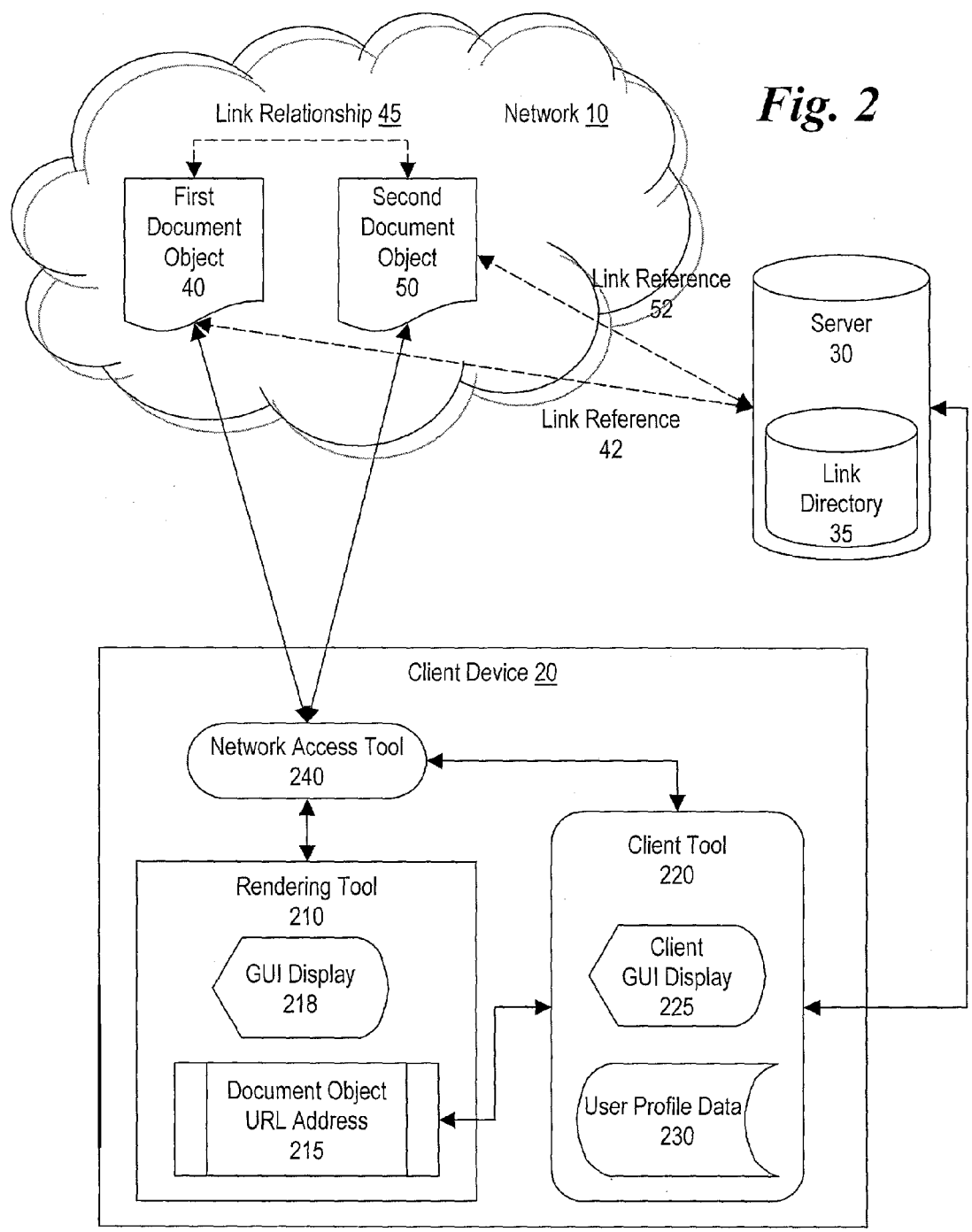
FIG. 2 is a diagram showing a client device which is Linkspace-enabled and its interaction with other hardware and software.

FIG. 2 is a diagram showing an example of the components of a Linkspace-enabled client device 20 and its interaction with other software and hardware. The client device 20 preferably includes a rendering tool 210, such as a web page browser like Microsoft® Internet Explorer, for rendering document objects located on the network 10 and displaying those document objects to users of the client device 20; a client tool 220, for allowing the user of the client device 20 to create and access link relationships 45 between document objects; and a network access tool 240, such as a TCP/IP stack or other interface, for allowing software modules on the client device 20 to connect to and communicate with other devices and document objects on the network 10. The client device 20 operates primarily to create and present link relationships 45 to users.

The rendering tool 210 may store a document object URL address 215 for referring to the document object currently being accessed and rendered by the rendering tool 210. The rendering tool 210 may also include a Graphic User Interface ("GUI") display 218, or other type of display, for displaying the document objects accessed and rendered by the rendering tool 210. In alternate embodiments of the invention, the client device 20 may include more than one rendering tool 210 enabling the user of the client device 20 to access multiple document objects.

The client tool 220 may include a client GUI display 225, or other display software and hardware, for displaying link references 42, 52 and link relationships 45 to the user of the client device 20. Typically, the displayed link references 42, 52 and link relationships 45 would be those link references 42, 52 and link relationships 45 relevant to the document object currently being rendered and displayed by the rendering tool 210 (as determined by the document object URL address 215 in the rendering tool 210). The client tool 220 may also include Linkspace user profile data 230 for storing information about the user of the client device 20, the link directories 35 the user may have access to, and the attributes of link references 42, 52, and attributes of link relationships 45 that the user may be interested in. The Linkspace user profile data 230 may also or alternatively be stored on the one or more servers 30, along with the Linkspace user profile data 230 of all other users of the system 100.

An example of how the client device 20 operates to create and present link relationships 45 to users of the client device 20 follows. While the network access tool 240 is active and placing the client device 20 in communication with the network 10, the user enables the rendering tool 210 and the client tool 220. The user may then request and access document objects stored on the network 10 by means of the rendering tool 210. Through the GUI display 218, the users enters or otherwise selects a document object URL address 215 associated with the first document object 40 of interest to the user. The client tool 220 connects to and uses the rendering tool 210 and accesses the document object URL address 215 associated with the first document object 40. The client tool 220 then establishes contact with the server 30 and passes to the server 30 the stored document object URL address 215 associated with the first document object 40, along with any relevant information that may come from the Linkspace user profile data 230. The connection to the server 30 may be initiated through the network access tool 240 or by other means not utilizing the network access tool 240.

The Linkspace-enabled server 30 searches the link directories 35 for any URLs in the link references 42, 52 matching, or similar to, the document object URL address 215. After searching, the server 30 retrieves the one or more link relationships 45 that include the document object URL address 215. Prior to searching, the URLs may be stripped of any information not relevant to the location of the document object 40, 50 on the network 10. Such information not relevant to the location of the document object 40, 50 may include query strings or other data attached to URLs for tracking or other purposes.

The server 30 then determines the link references 42, 52 which may be of interest to the user of the client device 20 by filtering the retrieved link references 42, 52 using the Linkspace user profile data 230 and the attributes assigned to the link references 42, 52 and to the link relationships 45. The filtering of link references 42, 52 and link relationships 45 may be accomplished by one of several methods of filtering data including matching, character and Boolean comparing, and other data comparison and filtering methods. The server 30 then transmits to the client tool 220 the filtered link references 42, 52 included in the one or more link relationships 45. The client tool 220 presents the transmitted link references 42, 52 within the context established by the link relationships 45 by means of the client GUI display 225.

To create a new link relationship 45, the user of the client device 20 must select a first document object 40 to begin the link relationship, a second document object 50 to complete the link relationship 45, and assign attributes to the link references 42, 52 and the link relationship 45 between the two document objects 40, 50. To select a first document object 40 to begin the new link relationship 45, the user interacts with the client GUI display 225 to activate a function of the client tool 220 to capture the document object URL address 215 associated with the first document object 40. To select a second document object 50 to complete the new link relationship 45, the user may interact with the GUI display 218 of the rendering tool 210 to request, access and display the second document object 50. The user may then interact with the client GUI display 225 again to activate a further function of the client tool 220 to capture the document object URL address 215 associated with the second document object 50, completing the selection of document objects 40, 50 participating in the new link relationship 45. Once the two document objects 40, 50 are established, attributes of the link references 42, 52 and the new link relationship 45 may be assigned.

The user may select or otherwise specify attributes associated with the link references 42, 52 and link relationship 45. These attributes aid in categorizing, sorting or filtering the link references 42, 52 and the link relationship 45 in the link directories 35 for delivery to other client devices 20. The attributes may be, for example, descriptive, temporal, spatial, or quantitative in nature, i.e., describe the link reference in terms of who or what, when, where, or how much. One such attribute (not shown) may be a plain language name for the link reference 42, 52, determined and entered by the user to describe the link reference in terms more useful to users of the system 100 than the document object URL address 215. Other examples of attributes may include description of the content of either of the document objects 40, 50 related by the link relationship 45, wherein that content may be described to include a product review, news article, product information page, competitor's product information, or product order forms, among other types of content.

Normally, upon completion of the endpoint capturing and attribute assignment functions, the client tool 220 connects to the server 30 to store the link references and the new link relationship 45 in the appropriate link directory 35. Generally, the new link relationship 45 is then made available to other users. Typically, other client devices 20 who have access to the server 30 and are assigned access privileges on the link directory 35 in which the new link relationship 45 has been stored are given access to the new link relationship 45.

Furthermore, if the user of the client device 20 determines that there is a relationship that is not already described by the transmitted link relationships 45 between the currently accessed document object 40 and a second document object 50, the user may proceed to create and publish a new link relationship 45 between the first document object 40 (currently accessed and displayed by the rendering tool 210) and the second document object 50. This may be accomplished without displaying the second document object 50.

Figure 3A:
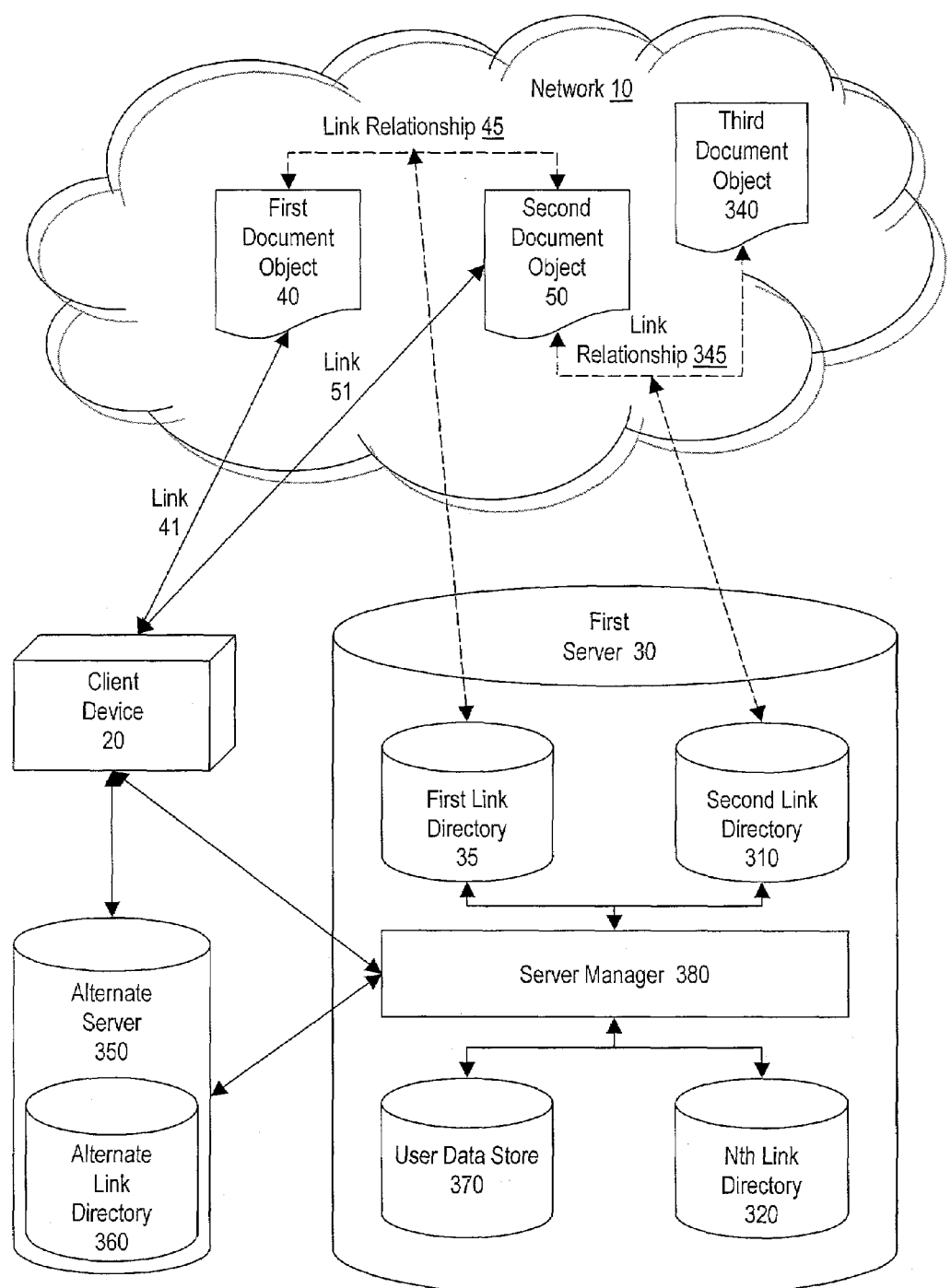
FIG. 3*a* is a diagram showing the components of a server which is Linkspace-enabled and its interaction with other hardware and software.

FIG. 3a is a diagram showing the components of the Linkspace-enabled server 30 and its interaction with other hardware and software. The server 30 includes a first link directory 35, a user data store 370, and a server manager 380. The server 30 may also include a second link directory 310 and one or more Nth link directories 320. The server manager 380 coordinates communications between the other components of the server 30. The server manager 380 also coordinates communications with outside objects, including the one or more client devices 20. The server manager 380 also performs the function of locating appropriate link directories 35, 310, 320 for the user to participate in based upon a document object presently displayed on the client device 20. The user of the client device 20 may request that the server manager 380 look in all link directories 35, 310, 320 across the system 100, regardless of whether the user has an affiliation with the specific link directory 35, 310, 320 (which may be set in the user's Linkspace user profile data 230), for the URL of the document object the user is currently accessing with the client device 20. The user data store 370 stores identification and user profile data regarding users authorized to access the server 30, which of the several link directories 35, 310, and 320 those users are permitted access to, and which attribute preferences the users have for each of the link directories 35, 310, 320. In alternate embodiments of the invention, portions of the information maintained in the user data store 370 may be stored in the link directories 35, 310, 320.

FIG. 3a also shows one or more alternate Linkspace-enabled servers 350 that may reside on the network 10. In alternate embodiments of the system of the invention, the one or more alternate servers 350 may be located off the network 10 but otherwise connected to or in communication with the client devices 20 and/or the first server 30. One or more alternate link directories 360 may reside on the one or more alternate servers 350. The one or more alternate servers 350 may include other elements duplicating the functions of the server manager 380 and user data store 370, as well as additional link directories 310 and 320. The existence of the alternate servers 350 provides for flexibility in the distribution of link directory data across several servers, redundancy and interoperability across multiple networks and/or sets of client devices 20 and users of the Linkspace system 100.

Each of the several link directories 35, 310, 320 or 360 may be associated with and store link references 42, 52 and link relationships 45. These link references 42, 52 and link relationships 45 may have attributes matching categories defined by an authorized user designated to manage such link directories 35, 310, 320 or 360. In this manner, each link directory 35, 310, 320 or 360 may be considered to be a community of interest. The authorized user designated to manage such link directories 35, 310, 320 or 360 may also establish attributes by which to organize, sort and filter the link references and link relationships 45. Attributes may describe the types and properties of the document objects 40, 50 and the link relationships 45. Any authorized user of the link directories 35, 310, 320 or 360 may then create and place link references and link relationships 45 in the link directories 35, 310, 320 or 360 and assign attributes to the link references and link relationships 45.

FIG. 3a further illustrates the provision for a further link relationship 345 between the second document object 50 and a third document object 340. The link relationship 345 may be created by an authorized user of one of the client devices 20, just as the link relationship 45 between the first document object 40 and the second document object 50 was created. The link relationship 345 may be stored in a second link directory 310, separated from the link relationship 45 stored in the first link directory 35. As such, the link relationships 45 and 345 may be considered to belong to differing communities of interest represented by the separate first link directory 35 and second link directory 310. A user of a client device 20 who is currently viewing or otherwise accessing the second document object 50 will only be presented with the link relationship 345 if the user is an authorized user of, and thus in the user directory 370 list for, the second link directory 310. Furthermore, a user of a client device 20 who is currently viewing or otherwise accessing the second document object 50 will only be presented with both the link relationship 45 and the link relationship 345 if the user is an authorized user of, and thus in the user data store 370 lists for, both the first link directory 35 and the second link directory 310. A user of the Linkspace system may be or may apply to be an authorized user for any combination of or all of the link directories 35, 310, 320, and 360.

Figure 3B:
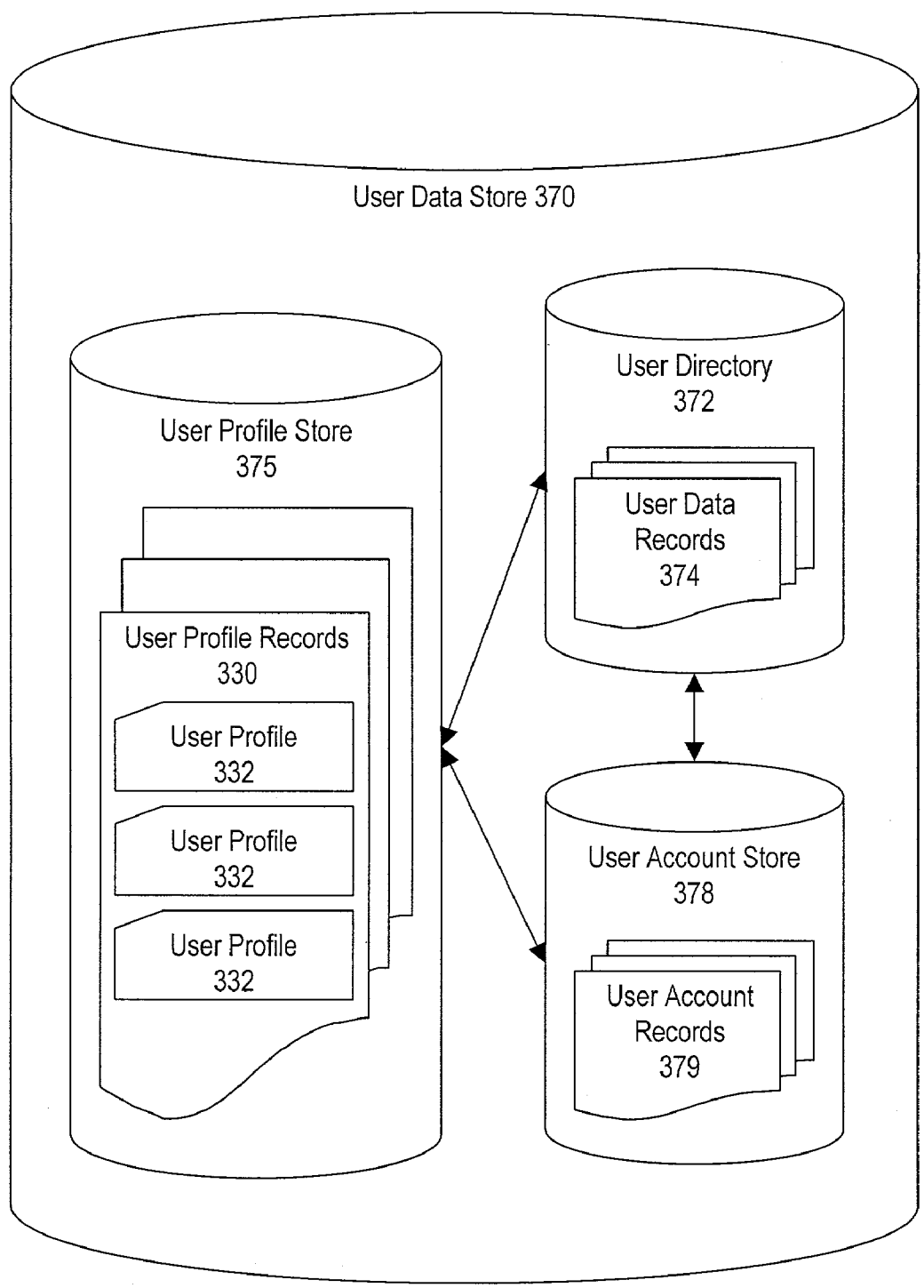
FIG. 3*b* is a diagram showing more detail of one embodiment of a user data store from FIG. 3*a*.

FIG. 3b is a diagram showing more detail of one embodiment of the user data store 370 from FIG. 3a. The user data store 370 may include a user directory 372, a user profile store 375, and a user account store 378.

The user directory 372 includes one or more user data records 374, typically one or more each for every authorized user of the servers 30, 350. The user data records 374 may include personal identifying data for an associated authorized user and data indicating the link directories 35, 310, 320, 360 to which each user has access.

The user profile store 375 includes one or more user profile records 330, typically one or more each for every authorized user of the servers 30, 350. The user profile records 330 for each authorized user may further include one or more user profiles 332.

Each user profile 332 may contain data regarding specific, differing configurations of the user's personal, professional, geographic and other interests, and the servers 30, link directories 35, 310, 320, 360, and attributes associated with those interests, as entered by the user or collected by the client tool 220. The data in the user profile 332 may be used to determine what link directories 35, 310, 320, 360 that the user may have engaged. The data in the user profile 332 may further determine what attributes of link references 42, 52, and of link relationships 45, will be considered by the server 30 in returning the link references 42, 52 and the link relationships 45 from the link directories 35, 310, 320, 360 to the user's client device 20.

The user account store 378 includes one or more user account records 379, usually one each for every authorized user of the servers 30, 350. The user account records 379 hold information regarding usage of the Linkspace system 100 by each authorized user. The information in the user account records 379 may include data on instances of the publication of link relationships 45, and the transmissions of link relationships 45 and link references 42, 52 based upon the document object displayed by the client tool 220 of each user. In alternate embodiments of the invention, data regarding the document objects 40, 50, 340 requested and accessed by users of the system 100 is not recorded in the user account records 379 against the individual authorized user in order to maintain user privacy with regard to what document objects 40, 50, 340 each individual user may request or access.

When an authorized user of a client device 20 creates a link relationship 45 that is stored in one or more of the link directories 35, 310, 320, 360, the server manager 380 records in the user account record 379 (associated with the authorized user creating the link relationship 45) the activity of creating and storing a link relationship 45. Each of the authorized users of the link directories 35, 310, 320, 360 may be allowed to create link relationships 45 to be stored in one or more of the link directories 35, 310, 320 or 360, to which that authorized user is permitted publication access. Each of the authorized users of each specific link directory 35, 310, 320, 360 may also be allowed access for display those link relationships 45 stored in the specific link directory 35, 310, 320, 360 that relate to the first document object 40 or second document object 50 that the user is currently viewing on the user's client device 20.

The interaction of each of the elements of the server 30, alternate server 350, the client devices 20, and the first, second and third document objects 40, 50, and 340, along with the creation and presentation of the link relationships 45 and 345 may be illustrated by the application of the methods 600, 700, and 800 described below with reference to FIGS. 6, 7, and 8.

Figure 4A:
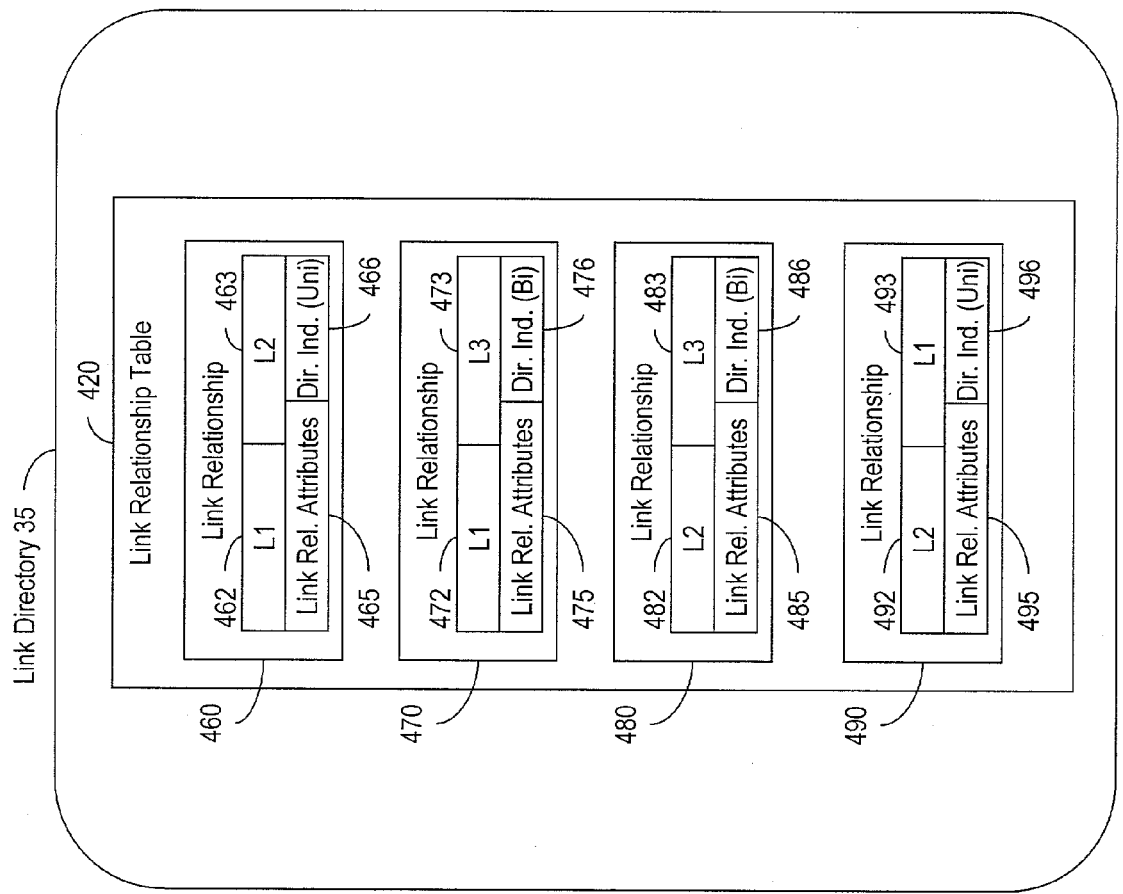
FIG. 4*a* is a diagram illustrating one embodiment of a link directory according to one embodiment of the invention.

FIG. 4a shows the general structure of one embodiment of the link directory 35. This embodiment of the link directory 35 includes a link relationship table 420.

The link relationship table 420 comprises a list of link relationships 460, 470, 480, 490. These link relationships 460, 470, 480, 490 correspond to the link relationships 45, 345 created by users of the client device 20 as they are stored in the link directory 35. The link relationship 460 comprises a field 462 containing a link reference 42 (L1) including the URL address of the first document object 40 related by the link relationship 460; a field 463 containing a link reference 52 (L2) including the URL address of the second document object 50 related by the link relationship 460; a set of link relationship attributes 465; and a directional indicator 466 showing the nature of the link relationship between the two document objects, either unidirectional or bi-directional. The link relationship 460 is shown with the directional indicator 466 specifying that the link relationship 460 is a unidirectional link relationship.

Some or all of the list of link relationships 460, 470, 480, 490 comprising the link relationship table 420 may, in one embodiment of the invention, be stored on the server 30 in the form of relational database records. The relational database record corresponding to the link relationship 460 may be comprised of one or more relational database fields corresponding to the field (L1) 462, field (L2) 463, link relationship attributes 465, and directional indicator 466. Each of the one or more relational database fields may be formatted and designated to store various forms of relational database data types. In one embodiment of the invention, the relational database field corresponding to the field 462, as well as the relational database field corresponding to the field 463, may contain data specifying the appropriate URL as text or other format appropriate for the network upon which the invention may be implemented. In one embodiment of the invention, the relational database field corresponding to the directional indicator 466 may be formatted as a simple flag (i.e., Boolean) data type such as True/False, Yes/No, or On/Off. Alternatively, the relational database field corresponding to the directional indicator 466 may be formatted as a type to allow entry of a value indicating whether the link relationship attribute 465 applies forward, backward or in both directions across the link relationship 460. In one embodiment of the invention, the link relationship attributes 465 may be represented by one or more relational database fields. In this embodiment, the relational database fields comprising the link relationship attributes 465 may include a field of text data listing the assigned titles of the one or more specific link relationship attributes assigned to the link relationship 460. The relational database fields comprising the link relationship attributes 465 may then also include one or more attribute value fields containing data formatted appropriately for the corresponding link relationship attribute listed in the above described field of text data. For example, the plain language name link relationship attribute may have its corresponding value stored in a field formatted as text, whereas a zip code attribute may have its corresponding value stored in a field formatted as a 5 or 9 digit integer, and a date attribute may have its corresponding value stored in a field formatted in a date format. In an alternative embodiment, the relational database fields comprising the link relationship attributes 465 may utilize relational database key fields which point to additional database tables containing the records specifying each available type of link relationship attribute for the link relationship 460 and key fields which point to additional tables containing the values associated with each of link relationship attribute identified by a key.

As with the link relationship 460, the link relationship 470 comprises a field 472 containing a link reference 42 (L1) including the URL address of the first document object 40 related by the link relationship 470; a field 473 containing a third link reference (L3) including the URL address of the third document object 340 related by the link relationship 470; a set of link relationship attributes 475; and a directional indicator 476 showing the nature of the link relationship between the two document objects, either unidirectional or bi-directional. The link relationship 470 is shown with the directional indicator 476 specifying that the link relationship 470 is a bi-directional link relationship. The link relationship 480 comprises a field 482 containing a link reference 52 (L2) including the URL address of the second document object 50 related by the link relationship 480; a field 483 containing the third link reference (L3) including the URL address of the third document object 340 related by the link relationship 480; a set of link relationship attributes 485; and a directional indicator 486 showing the nature of the link relationship between the two document objects, either unidirectional or bi-directional. The link relationship 480 is shown with the directional indicator 486 specifying that the link relationship 480 is a bi-directional link relationship.

The link relationship 490 comprises a field 492 containing a link reference 52 (L2) including the URL address of the second document object 50 related by the link relationship 490; a field 493 containing a link reference 42 (L1) including the URL address of the first document object 40 related by the link relationship 490; a set of link relationship attributes 495; and a directional indicator 496 showing the nature of the link relationship between the two document objects, either unidirectional or bi-directional. The link relationship 490 is shown with the directional indicator 496 specifying that the link relationship 490 is a unidirectional link relationship.

The link relationship attributes 465, 475, 485, 495 may include a plain language name (not shown) associated with each of the link references 42, 52 participating in the respective link relationship 460, 470, 480, 490, as determined and entered by the user of the client tool 220. The plain language name serves to describe the link reference 42, 52 in terms better understood by the users of the system 100 than the URL associated with the link reference 42, 52. The link relationship attributes 465, 475, 485, 495 serve to describe the link references 42, 52 in terms useful to users of the system 100, and to place the link references 42, 52 in a context that may attract users to select the link references 42, 52. Other examples of link relationship attributes 465, 475, 485, 495 may include descriptions of the content of either of the document objects 40, 50 related by the link relationship 460, 470, 480, 490, wherein that content may be described to include a product review, news article, product information page, competitor's product information, or product order forms, among other types of content.

The link relationship 470 may have a value assigned to the directional indicator 476 specifying that the link relationship 470 is a bi-directional link relationship. This indicates that the link relationship attributes 475 apply to either of the two document objects (40 and 340) equally in the context of the link relationship 470.

The link relationship 460 may, on the other hand, have a value assigned to the direction indicator 466 specifying that the link relationship 460 is a unidirectional link relationship. This signifies that the link relationship attributes 465 apply in only one direction between the two document objects 40 and 50 represented in the fields 462 and 463 through the link references 42 and 52 respectively. In this instance, a link relationship will not be transmitted and presented to the user of the client device 20 when requested in the direction opposite to that specified by the direction indicator 466. In the case of the link relationship 460 shown in FIG. 4*a*, the attributes 465 apply only as the link relationship 460 is traversed from the first link reference 42 to the second link reference 52, and not in the reverse direction. In a similar manner, the link relationship 490 may have a value assigned to the direction indicator 496 specifying that the link relationship 490 is a unidirectional link relationship. This signifies that the link relationship attributes 495 apply in only one direction between the two document objects 50 and 40 represented in the fields 492 and 493 through the link references 52 and 42 respectively. In the case of the link relationship 490 shown in FIG. 4*a*, the attributes 495 apply only as the link relationship 490 is traversed from the second link reference 52 to the first link reference 42, and not in the reverse direction. In this instance, a link relationship will not be transmitted and presented to the user of the client device 20 when requested in the direction opposite to that specified by the direction indicator 496.

In an alternate embodiment, the direction indicator 466 of the link relationship 460 may comprise a plurality of directional indicator fields (not shown). Each directional indicator field may then correspond to one of the one or more link relationship attributes 465 and indicate whether the corresponding link relationship attribute 465 may apply in one direction or in both directions between the two document objects 40 and 50 represented in the fields 462 and 463 through the link references 42 and 52 respectively. Likewise, the direction indicator 496 of the link relationship 490 may comprise a plurality of directional indicator fields (not shown). Each directional indicator field may then correspond to one of the one or more link relationship attributes 495 and indicate whether the corresponding link relationship attribute 495 may apply in one direction or in both directions between the two document objects 50 and 40 represented in the fields 492 and 493 through the link references 52 and 42 respectively. In the alternate embodiment, a similar arrangement may then be implemented for the remaining direction indicators 476, 486 of the link relationships 470, 480.

Figure 4B:
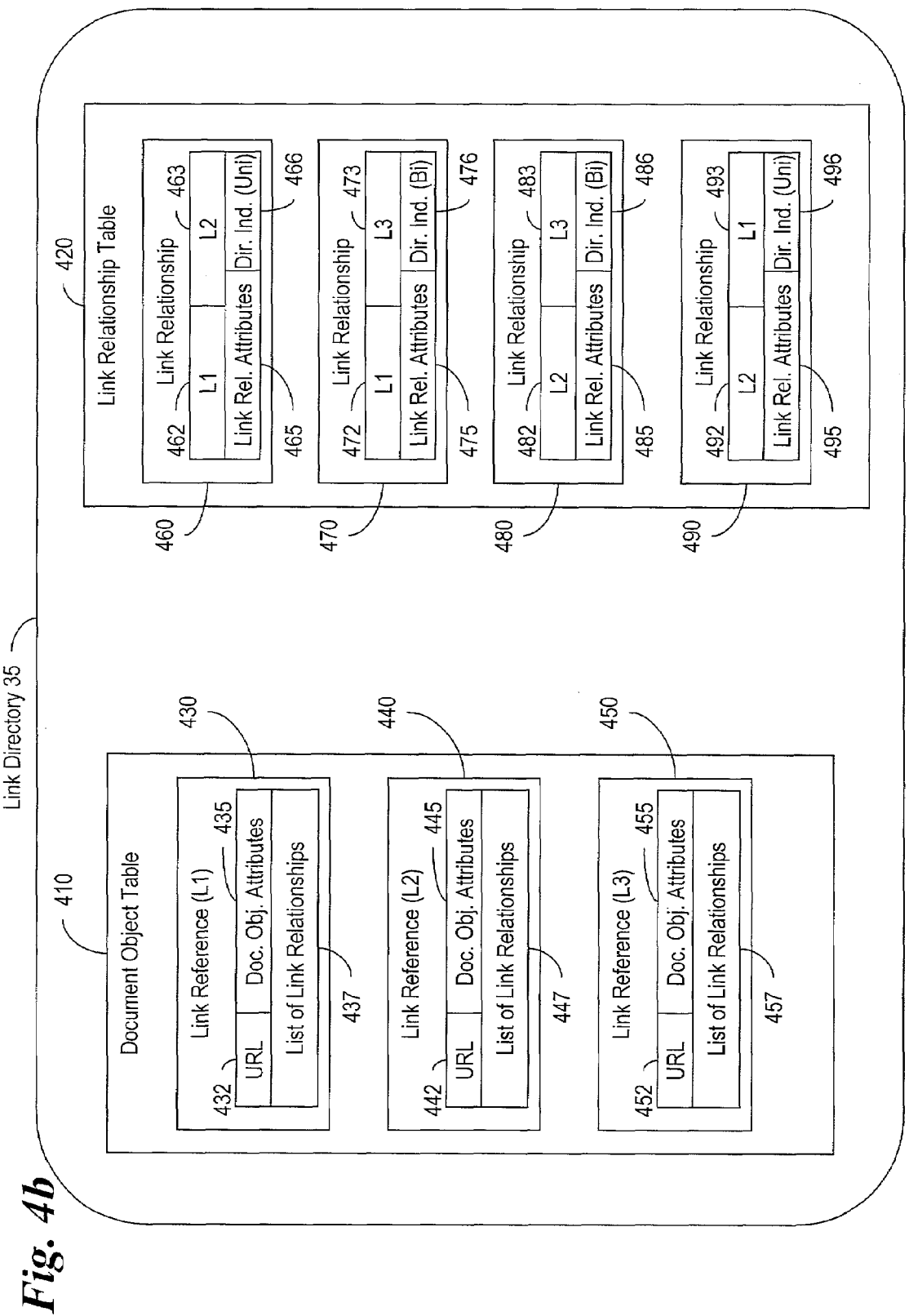
FIG. 4*b* is a diagram illustrating another embodiment of a link directory according to one embodiment of the invention.

FIG. 4*b* shows the general structure of another embodiment of the link directory 35. This embodiment of the link directory 35 includes a document object table 410, and a link relationship table 420, as described above for FIG. 4*a*.

The document object table 410 comprises a set of link references 430, 440, 450 to document objects located on the network 10 to which the link directory 35 is connected. Each link reference 430, 440, 450 further comprises the URL 432, 442, or 452 of the respective document object 40, 50, 340 of interest; a set of document object attributes 435, 445, 455 associated with the URL 432, 442, 452; and a list 437, 447, 457 of pointers to any of the link relationships 460, 470, 480, 490 by which the link references 430, 440, 450 may be connected to each other with context. In the case of a link relationship 460, 490 having the direction indicator 466, 496 set to indicate that the link relationship 460, 490 is unidirectional, the link relationship 460, 490 will be listed only in the list 437, 447, 457 of pointers for the link reference 430, 440, 450 that begins the unidirectional link relationship 460, 490. The link references 430, 440, and 450 in FIG. 4*b* correspond to the link references 42, 52, and the third link reference (not shown), as described in FIGS. 1-4*a* above, and which point to the URL addresses of the document objects 40, 50, and 340 respectively.

The document object attributes 435, 445, 455 serve to describe the link references 430, 440, 450 in terms useful to users of the system 100, and to place the link references 430, 440, 450 in a context that may attract users to select the link references 430, 440, 450. The document object attributes 435, 445, 455 may include a plain language name that serves to describe the document object 40, 50, 340 in terms better understood by the users of the system 100 than the URLs associated with the link references 430, 440, 450; descriptions of the content of the document object 40, 50, 340 associated with link references 430, 440, 450, wherein that content may be described to include a product review, news article, product information page, competitor's product information, or product order forms, among other types of content; and other descriptive characteristics associated with the document object 40, 50, 340.

The link references 430, 440, and 450 may be created and placed in the document object table 410 when a user of the client device 20 creates a link relationship 45 between a first document object 40 and a second document object 50 or a third document object 340.

The link relationship table 420 shown in FIG. 4*b* comprises the same list of link relationships 460, 470, 480, 490, detailed above in FIG. 4*a*. In FIG. 4*b*, the link relationship 460 comprises a field 462 containing a pointer to the link reference 430 for the first document object 40 related by the link relationship 460; a field 463 containing a pointer to the link reference 440 for the second document object 50 related by the link relationship 460; the link relationship attributes 465; and the directional indicator 466. In FIG. 4*b*, the link relationship 470 comprises a field 472 containing a pointer to the link reference 430 for the first document object 40 related by the link relationship 470; a field 473 containing a pointer to the link reference 450 for the third document object 340 related by the link relationship 470; the link relationship attributes 475; and the directional indicator 476. In FIG. 4*b*, link relationship 480 comprises a field 482 containing a pointer to the link reference 440 for the second document object 50 related by the link relationship 480; a field 483 containing a pointer to the link reference 450 for the third document object 340 related by the link relationship 480; the link relationship attributes 485; and the directional indicator 486. Likewise, in FIG. 4*b*, the link relationship 490 comprises a field 492 containing a pointer to the link reference 440 for the second document object 50 related by the link relationship 490; a field 493 containing a pointer to the link reference 430 for the first document object 40 related by the link relationship 490; the link relationship attributes 495; and the directional indicator 496.

Figure 5:
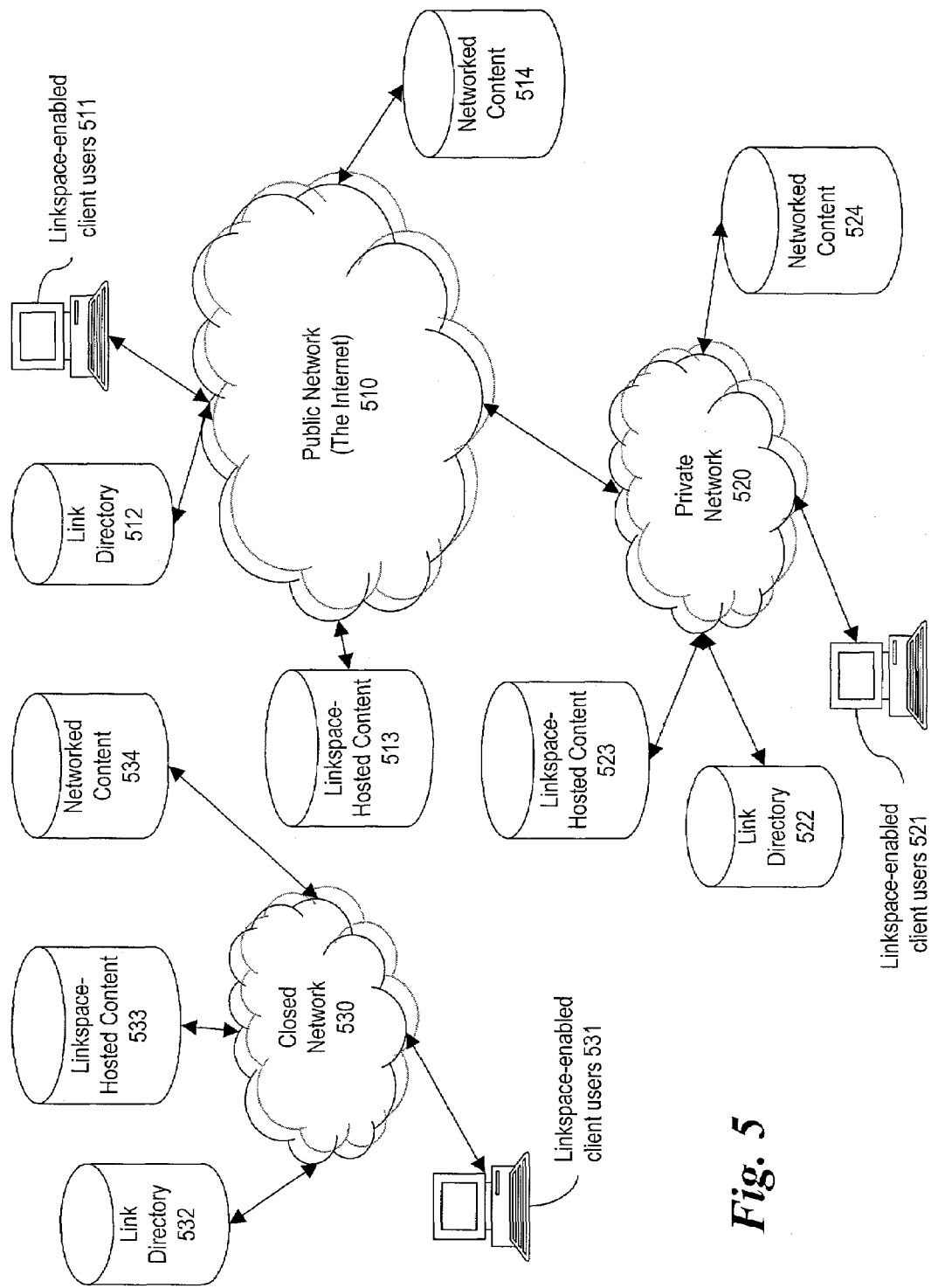
FIG. 5 is a diagram showing one embodiment of the invention implemented on public, private or closed computer networks.

FIG. 5 illustrates one embodiment of the present invention in which the invention may operate on multiple networks of varying degrees of network security. The different networks on which the systems and methods of the present invention may be implemented include a public network such as the Internet 510, a private network 520 that may be connected to the Internet 510, and a closed network 530 that is secure and not accessible to users not connected to the closed network 530. The closed network 530 is not connected to any public network such as the Internet 510, and is not connected to another private network 520.

The public network or Internet 510 may have components connected to it that implement the present invention, including one or more Linkspace-enabled client users 511, one or more link directories 512, one or more Linkspace-hosted content units 513, and one or more networked content units 514. The link directories 512 described here are functionally equivalent to the link directories 35, 310, 320, and 360 described above in connection with FIGS. 1, 2 and 3a. The Linkspace-hosted content units 513 comprise information storage devices connected to the network 510 that provide additional document object storage facilities to users of the Linkspace system 100 separate from the publicly or privately operated networked content units 514. The networked content units 514 may include networked data servers or web servers.

The Linkspace-hosted content units 513 are provided to accommodate the streamlined publication and/or distribution of content by users of the Linkspace system 100. The client tool 220 may allow a user of the Linkspace system 100 to store document objects of his or her own creation through a simplified procedure, i.e., a publish document function enabled through the client GUI display 225. The user of the client device 20 may select a document object 40 that she wishes to publish through the Linkspace-hosted content units 513, or she may create a document object (not shown) using the rendering tool 210 or other document object creation tool. The user of the client device 20 then selects the publish document function through the client GUI display 225 and selects the link directories 35, 310, 320, 360 in which she wishes to create and publish new link relationships 45, 345 referencing the user created or selected document object. The user of the client device 20 may then create and publish link relationships 45, 345 referencing the user created or selected document object. The client tool 220 may automatically upload the user created or selected document object from the user's client device 20, or from another location on the network, in this case the Internet 510, and save it on the Linkspace-hosted content unit 513. The client tool 220 may then publish the new link relationships 45, 345 referencing the user created or selected document object to the appropriate link directory 35, 310, 320, 360, and then make the user created or selected document object available to other users of the Linkspace system 100 through the new link relationships 45, 345. The activity of publishing a user created or selected document object in this manner is also recorded in the appropriate user account record 379 for the user creating or selecting the document object to be published.

Similarly, the private network 520 may have connected to it components that implement the present invention, including one or more Linkspace-enabled client users 521, one or more link directories 522, one or more Linkspace-hosted content units 523, and one or more networked content units 524.

Additionally, the closed network 530 may have connected to it components that implement the present invention, including one or more Linkspace-enabled client users 531, one or more link directories 532, one or more Linkspace-hosted content units 533, and one or more networked content units 534.

In FIG. 5, the private network 520 is shown connected to the public network or Internet 510. This may allow Linkspace-enabled client users 521 connected to the private network 520 to also be permitted access to any of the one or more link directories 512, Linkspace-hosted content units 513, and networked content units 514 that are connected to the public network or Internet 510. However, Linkspace-enabled client users 511 connected to the public network or Internet 510 that are not also among the group of authorized Linkspace-enabled client users 521 of the private network 520, may not be permitted to access the one or more link directories 522, Linkspace-hosted content units 523, and networked content units 524 that are connected to the private network 520.

A Linkspace client user 531 connected to the closed network 530, and therefore not connected to either the public network or Internet 510 nor to the private network 520, may only be permitted access to the one or more link directories 532, Linkspace-hosted content units 533, and networked content units 534 that are connected to the closed network 530.

Figure 6:
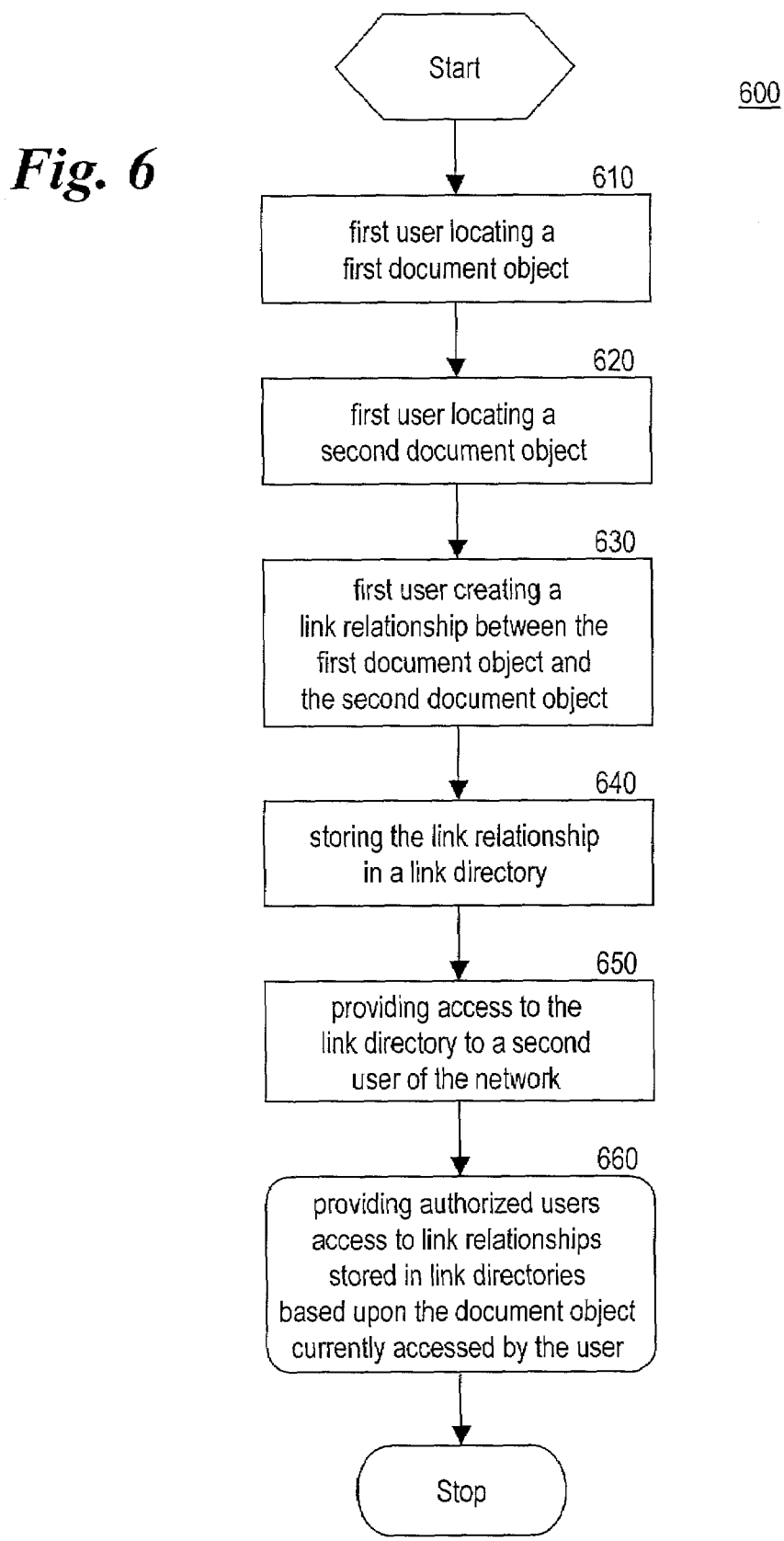
FIG. 6 is a flowchart illustrating a method for enabling users of a network to create, store, and provide access to relationships among document objects stored on the network according to one embodiment of the invention.

FIG. 6 is a flowchart showing the steps of a method 600 according to one embodiment of the present invention. The method 600 includes the steps of a first user (not shown) of a client device 20 locating a first document object 40 (step 610); the first user locating a second document object 50 (step 620); and the first user creating a link relationship 45 between the first document object 40 and the second document object 50 (step 630). The method 600 includes the additional steps of storing the link relationship 45 created by the first user in a link directory 35 (step 640); and providing access to the link directory 35 to a second user (not shown) of another client device 20 (step 650).

The method 600 may include a step for providing authorized users of client devices 20 access to the link relationships 45 stored in link directories 35, based upon the document object 40 currently accessed by the users on the users' client device 20 (step 660).

Figure 7:
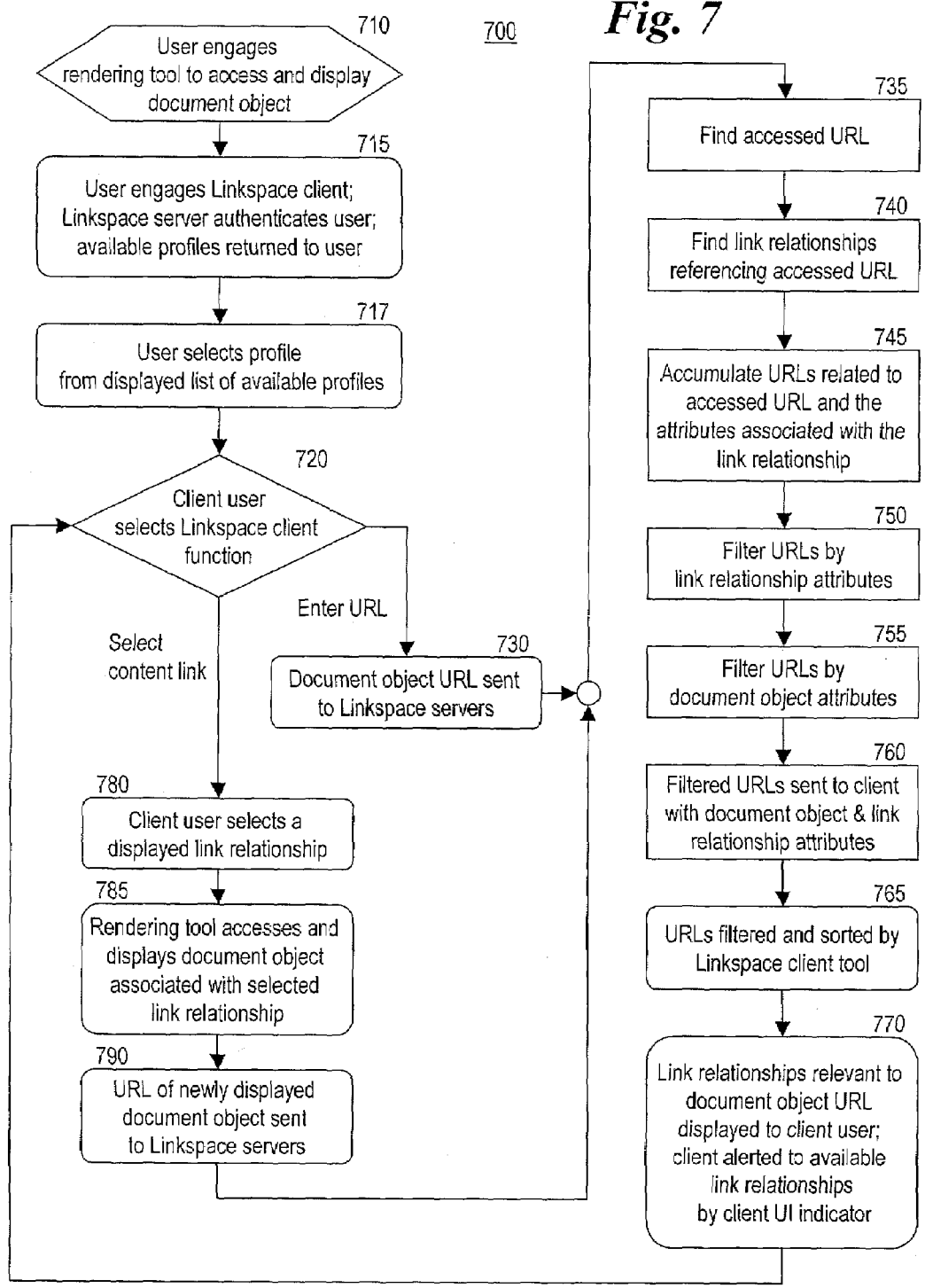
FIG. 7 is a flowchart illustrating a method for identifying link relationships between document objects according to one embodiment of the invention.

FIG. 7 is a flowchart showing the steps of a method 700 for accessing and displaying link relationships and related document objects on a network according to one embodiment of the present invention. The method 700 initiates when a user of a client device 20 engages the rendering tool 210 to request, access and display a document object 40 (step 710). The user of the client device 20 then engages the client tool 220 and is authenticated by a server 30 (step 715). The user of the client device 20 then selects a user profile 332 (step 717) that has been returned to the client device 20 upon authentication of the user by the server 30 in step 715. The selected user profile 332 may be used to determine what attributes of the link relationships 45 will be applied to filter and sort the link references 430, 440, 450 and link relationships 460, 470, 480 returned by the server 30. By filtering and sorting using attributes, a manageable and meaningful group of relevant link references 430, 440, 450 may be displayed to the user based on the user's needs and interests.

In alternate embodiments of the method 700, the steps 715 and 717 may occur before the step 710.

With the user profile 332 selected and the document object 40 displayed, the user then selects a client tool 220 function (step 720). The first function that the user may select is to enter a document object URL 215 into the rendering tool 210, whereupon that document object URL 215 is captured by the client tool 220 and transmitted to the servers 30 (step 730). The activity of transmitting the document object URL 215 to the servers 30 by the client tool 220 may be recorded and stored in an appropriate location within the user data store 370.

The server 30 then processes the transmitted document object URL 215 across the various link directories 35 to which the user is authorized access. One method of processing by the server 30 is according to the following steps. The server 30 performs a search of the document object tables 410 of all link directories 35 to find all instances of the document object URL 215 (step 735). The server 30 then searches the Link relationship tables 420 in the link directories 35 where the URL 215 was found. This search by the server 30 locates all link relationships 460, 470, 480, 490 referencing the URL 215 as one of the pointers to link references 462 or 463, 472 or 473, 482 or 483, 492 or 493 included in those link relationship 460, 470, 480, 490 (step 740). The server 30 then accumulates all the URLs 432, 442, 452 related, through the link relationships 460, 470, 480, 490 identified in step 740, to the URL 215. The server 30 also accumulates the document object attributes 435, 445, 455 associated with the identified URLs 432, 442, 452 and the link relationship attributes 465, 475, 485, 495 associated with the link relationships 460, 470, 480, 490 identified in step 740 (step 745).

The accumulated URLs 432, 442, 452 are then filtered by link relationship attributes 465, 475, 485, 495 (step 750), and then filtered again by document object attributes 435, 445, 455 (step 755). In alternate embodiments of the method 700, the accumulated URLs 432, 442, 452 may be filtered first by document object attributes 435, 445, 455 (step 755) and then by link relationship attributes 465, 475, 485, 495 (step 750). The user profile 332 is applied to determine what link relationship attributes 465, 475, 485, 495, and document object attributes 435, 445, 455 to use in filtering the accumulated URLs 432, 442, 452. The filtered URLs 432, 442, 452 are then sent back to the client device 20 that transmitted the URL 215, along with the associated document object attributes 435, 445, 455, and associated link relationship attributes 465, 475, 485, 495 (step 760). The activity of transmitting the filtered URLs 432, 442, 452, along with the associated document object attributes 435, 445, 455, and associated link relationship attributes 465, 475, 485, 495, to the client device 20 may be recorded and stored in an appropriate location within the user data store 370. Alternatively, the first filtering steps 750, 755 may be performed by the client device 20.

The client tool 220, upon receiving the filtered URLs 432, 442, 452 from the server 30, may further filter and sort the returned URLs 432, 442, 452 according to data stored in the selected user profile 332 (step 765). In this manner, the data in the user profile 332 may be applied to the filtered and sorted URLs 432, 442, 452 on either the server 30 or the client tool 20.

The filtered and sorted URLs 432, 442, 452 are then displayed to the user of the client device 20 by the client GUI display 225 and the client tool 220 alerts the user of the client device 20 to the availability of related links (in the form of the returned URLs 432, 442, 452) by means of an indicator in the client GUI display 225 (step 770). The method 700 then returns to step 720 to await further action by the user of the client device 20.

If, at step 720, the user of the client device 20 selects one of the URL links 432, 442, 452 displayed by the Linkspace GUI display as being related by link relationships 460, 470, 480, 490 to the presently accessed document object 40 with the URL 215 (step 780), the rendering tool 210 then accesses the new document object 50 associated with the selected URL and displays that document object 50 in the GUI display 218 of the rendering tool 210 (step 785). The new document object URL address 215 of the selected document object 50 is then passed on to the servers 30 (step 790) and the method 700 continues with step 735, as above, using the URL 215 of the new document object 50 as the URL to search for.

Figure 8:
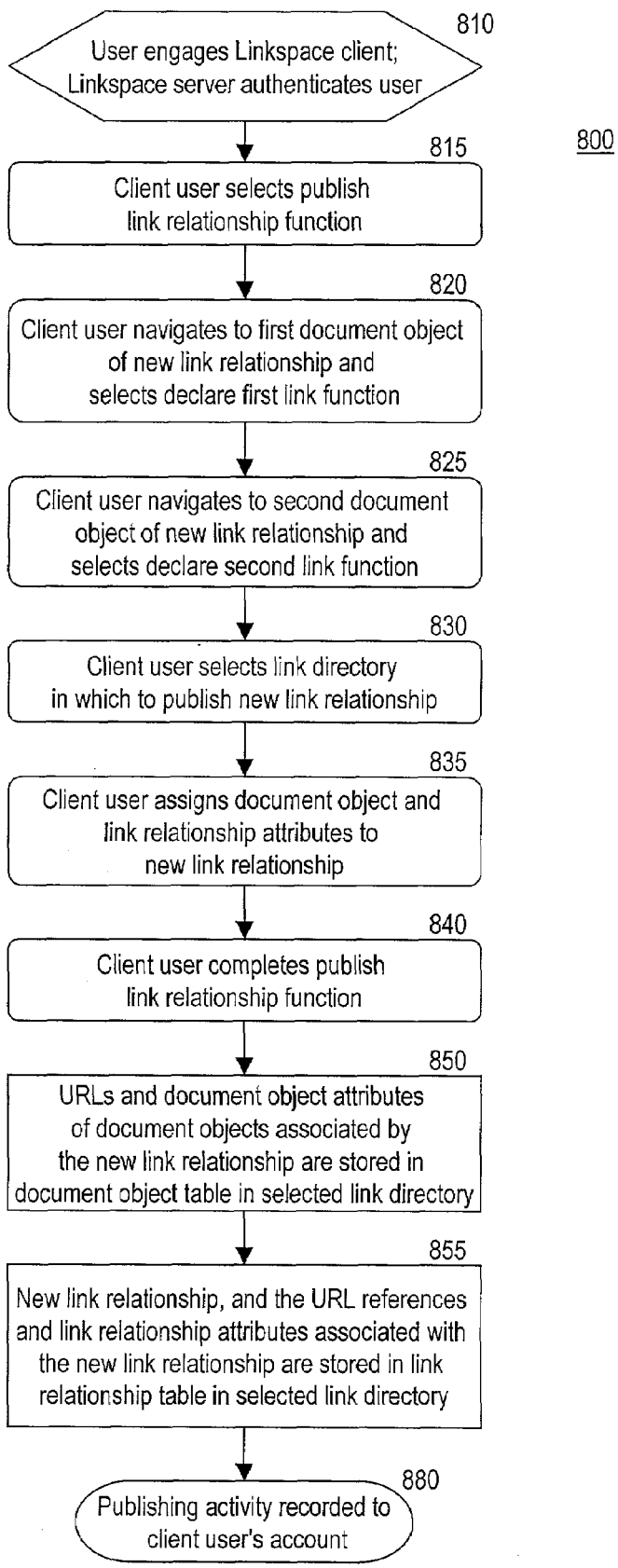
FIG. 8 is a flowchart illustrating a method for publishing link relationships between document objects according to one embodiment of the invention.

FIG. 8 is a flowchart showing the steps of a method 800 for creating and publishing link relationships according to one embodiment of the present invention. The method 800 initiates when a user of the client device 20 engages the client tool 220 and is authenticated by a server 30 (step 810). The user of the client device 20 may then select a publish link relationship function of the client tool 220 (step 815).

The user of the client device 20 may then navigate, using the rendering tool 210, to the first document object 40 of the new link relationship 45 that the user of the client device 20 wishes to create and publish. The user may then select a declare first link function of the client tool 220 (step 820). The user of the client device 20 may then navigate, again using the rendering tool 210, to the second document object 50 that the user of the client device 20 wishes to associate by means of a link relationship 45 with the first document object 40. The user can then select the declare second link function of the client tool 220 (step 825). The user of the client device 20 has now selected both ends of a link relationship 45.

The user now may select which of the link directories 35 in which the user wishes to publish the new link relationship 45 (step 830). The user of the client device 20 may then further assign link relationship attributes, such as those shown in FIG. 4 (465, 475, 485, 495) to the link relationship 45, along with assigning any document object attributes, such as those shown in FIG. 4 (435, 445, 455), to the first document object 40 and second document object 50 of the link relationship 45 (step 835). The user may then interact with a Linkspace GUI 225 button or element to complete the link relationship publish function (step 840). Upon completion of the link relationship publish function on the client device, the URLs and document object attributes of the document objects 40 and 50 associated by the new link relationship 45 are stored in the document object table 410 in the selected link directory 35 (step 850). Additionally, the new link relationship 45, along with the URL references to the first document object 40 and second document object 50 and the link relationship attributes, such as those shown in FIG. 4 (465, 475, 485, 495), are stored in the link relationship table 420 in the selected link directory 35 (step 855). The method 800 for creating and publishing link relationships completes by recording the publishing activity to the user account record 379 associated with the user 13 of the client device 20 for later tracking and billing purposes (step 880).

Figure 9:
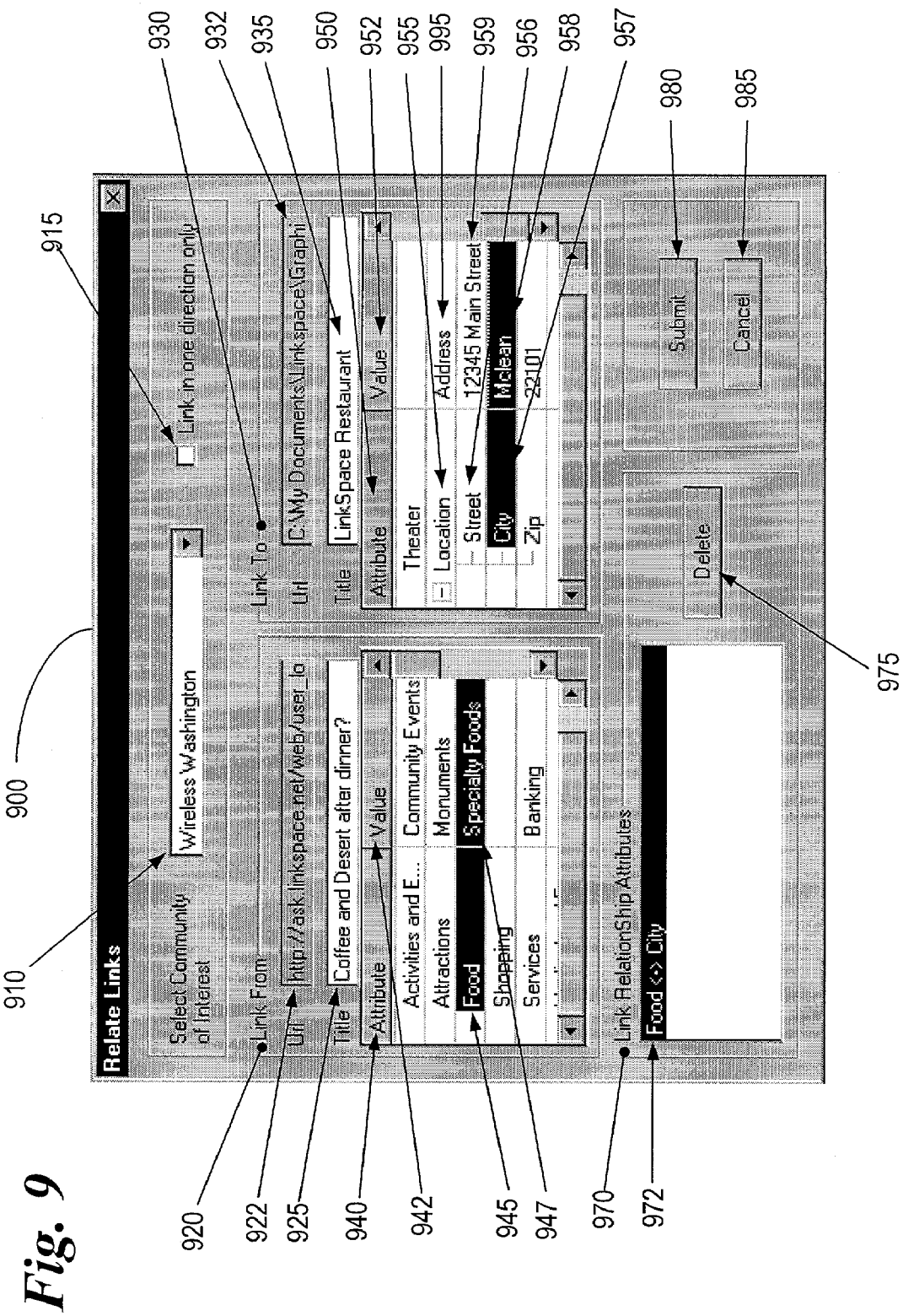
FIG. 9 is one example screen view of a user interface for a relate links dialog box according to one embodiment of the invention.

FIG. 9 is an example of a user interface, more specifically, a screen view of a user interface for a relate links dialog box 900, one element of the user interface of one embodiment of the invention. The relate links dialog box 900 is invoked when a user of the client tool 220 engages the publish link relationship function of the client tool 220. In the embodiment shown in FIG. 9, the relate links dialog box 900 includes a drop down list 910 for selecting a community of interest, a user interface term referring to one of the one or more link directories 35, and a checkbox 915 for indicating whether the link relationship 45 being created is to operate bi-directionally or unidirectionally. If the checkbox 915 is checked, then the link relationship 45 being created will only apply in one direction. In the example illustrated in FIG. 9, the user has selected the community of interest (link directory 35) referred to as "Wireless Washington," a link directory 35 storing link references 42, 52 and link relationships 45 considered by their creators as relevant to wireless device users in the Washington, D.C. metropolitan area.

The relate links dialog box 900 further includes a link-from section 920, a link-to section 930, a link relationship attributes display box 970, a submit link relationship button 980 and a cancel button 985. The submit link relationship button 980 is selected by the user when the user has selected and/or entered all information associated with the link references 42, 52 and the link relationship 45 that the user wishes to publish. Upon selection of the submit link relationship button 980, the client tool 220 closes the relate links dialog box 900 and transmits the information associated with the created link relationship 45 to one of the one or more servers 30. The cancel button 985 may be selected by the user to abort the creation and publication of the link relationship 45 that the user initiated and to close the relate links dialog box 900.

In an alternate embodiment, the relate links dialog box may include a target publish button (not shown) which permits the user publishing the link relationship 45 to target specific users of the system 100 to which the user publishing the link relationship 45 wishes to have the link relationship 45 made available to.

In the embodiment shown in FIG. 9, the link-from section 920 may include a first document object URL 922 associated with the first document object 40 included in the link relationship 45 being created, where the first document object URL 922 was captured when the publish link relationship function was engaged; a first plain language name field 925; and a listing of first link reference attributes 940 and the attribute values 942 associated with those first link reference attributes 940. In the example illustrated by FIG. 9, the first document object URL 922 is the address of a first document object 40 that is a web page for a coffee and dessert shop. The first plain language name field 925 may be captured when the publish link relationship function was engaged and/or may be edited by the user creating the link relationship 45. An exemplary first link reference attribute for food 945, and the value of specialty foods 947 assigned to the first link reference attribute 945 by the user creating the link relationship 45, are also shown.

The link-to section 930 similarly may include a second document object URL 932 associated with the second document object 50 included in the link relationship 45 being created, where the second document object URL 932 was captured when the publish link relationship function was engaged; a second plain language name field 935; and a listing of second link reference attributes 950 and the attribute values 952 associated with those second link reference attributes 950. In the example illustrated by FIG. 9, the second document object URL 932 is the address of a second document object 40 that is a web page for a "LinkSpace Restaurant" located in McLean, Va. (a suburb of Washington). The second plain language name field 935 may be captured when the publish link relationship function was engaged and/or may be edited by the user creating the link relationship 45. An exemplary second link reference attribute for location 955, and the value of address 995 assigned to the second link reference attribute 955 by the user creating the link relationship 45, are also shown. In addition, in the example illustrated by FIG. 9, a subordinate attribute for city 957, subordinate under the attribute for location 955, and a value of address 995 along with the assigned value of McLean 958 for the subordinate attribute for city 957, are also shown in the link-to section 930. Further subordinate attributes may include a street 956 with a value 959 of 12345 Main Street.

The link relationship attributes display box 970, as shown for the embodiment illustrated by FIG. 9, includes a list of link relationship attributes 972 and a delete link relationship attribute button 975. The link relationships 972 are formed by pairs of first link reference attributes 940 and second link reference attributes 950 that the user creating the link relationship 45 has selected to describe the nature of the link relationship 45. These link relationship attributes 972 may form the link relationship attributes 465, 475, 485, 495 described in FIG. 4a. The delete link relationship attribute button 975 may be used to delete a selected link relationship attribute 972 displayed in the link relationship attributes display box 970.

The exemplary link relationship attribute 972 shown in FIG. 9 indicates that the user creating the link relationship 45 has declared that the city subordinate attribute 957 (one selected second link reference attribute 950) of the Linkspace Restaurant associated with the second document object 50, having a value of McLean 958, is related to the food attribute 945 (one selected first link reference attribute 940), having a value of specialty foods 947, of the coffee shop associated with the first document object 40. As a result, once the exemplary link relationship 45 shown in FIG. 9 is created and published, other users of Linkspace-enabled client devices 20 that request and/or access the Linkspace Restaurant web page may be presented with a link reference 42, 52 pointing to the web page for the coffee and dessert shop, as illustrated in the link reference display window 1020 shown in FIG. 10.

In one embodiment of the invention, the link relationship attribute 972 may be declared by the user performing a drag-and-drop operation wherein the link reference attribute 957 is dragged and dropped onto the link reference attribute 945, creating the link relationship attribute 972 which relates the two document objects 40, 50 by the association of the city subordinate attribute 957 to the food attribute 945. In an alternate embodiment, the creation and selection of link relationship attributes 972 may be performed in a manner similar to that used in the link-to section 930 and link-from section 920 described above, utilizing a set of link relationship attribute types along with data input fields for entering or otherwise selecting values for those attributes.

Figure 10:
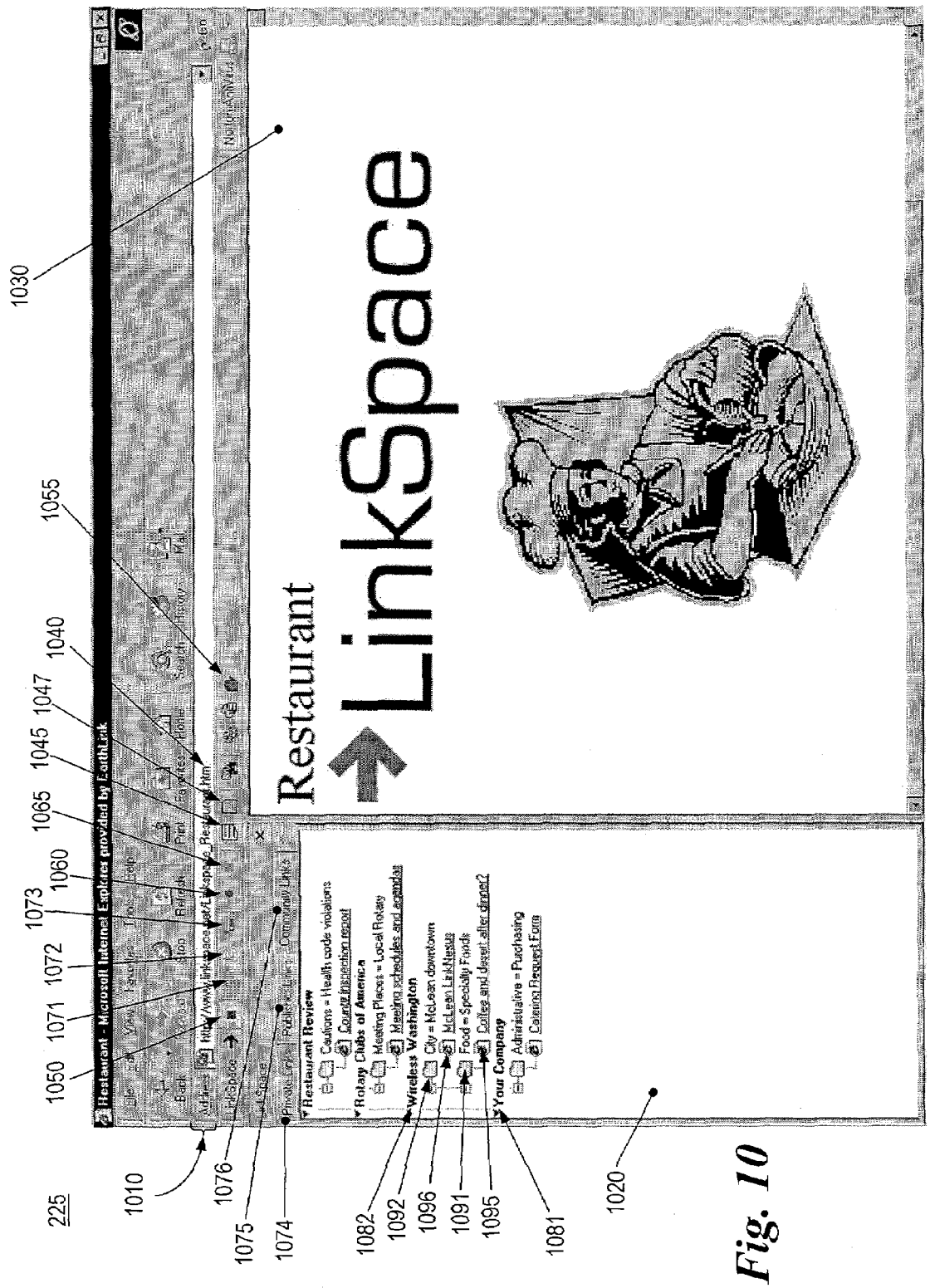
FIG. 10 is an example of a screen view for a client user interface according to one embodiment of the invention.

FIG. 10 is an example of a screen view for one embodiment of the client GUI display 225 for one embodiment of the invention, wherein the client GUI display 225 is integrated into the GUI display 218 of the rendering tool 210. In the embodiment shown in FIG. 10, a client toolbar 1010 and a link reference display window 1020 together comprise the client GUI display 225. A browser window 1030 displays the document object (40, 50) being requested and accessed by the rendering tool 210 and having the document object URL address 215 displayed in an address bar field 1040.

The client toolbar 1010 includes a number of GUI buttons that initiate various functions of the client tool 220. A client logon button 1050 initiates a connection between the client tool 220 and one or more servers 30. A client logoff button 1055 ends a user session for the client tool 220 and disconnects the client tool 220 from the one or more servers 30. A mark starting page button 1060 may be engaged to initiate the publish link relationship function of the client tool 220 by setting the currently displayed document object 40 shown in the browser window 1030 and referenced by the document object URL address 215 displayed in the address bar field 1040 as the first document object 40 in the link relationship 45. After the user navigates to a second document object 50, a mark ending page button 1065 may be engaged to complete the selection of participating document objects 40, 50 for the publish link relationship function of the client tool 220. Engaging the mark ending page button 1065 sets the newly displayed document object 50 shown in the browser window 1030 and referenced by the document object URL address 215 displayed in the address bar field 1040 as the second document object 50 in the link relationship 45, and opens a relate links dialogue box 900 (shown and described in FIG. 9 above) to allow the user of the client tool 220 to assign attributes to the link relationship 45.

The client toolbar 1010 also may include three icons that indicate the availability and type of link references 42, 52 related to the document object 40 open in the browser window 1030. These icons may include a publisher links indicator 1071, a private links indicator 1072, and a community links indicator 1073. These icons permit separation of link references 42, 52 into categories. These categories allow for broad classification of link references 42, 52 and enable the user of the client tool 220 to quickly identify who is offering the link relationships 45, the user of the client too 220 himself, a representative of the publisher of the document object 40, 50 they are viewing, or a third party.

The link reference display window 1020 presents the user with a hierarchical listing of any link references 42, 52, delivered by the server 30, that may be related to the document object 40 that is currently displayed in the browser window 1030 and has the document object URL address 215 shown in the address bar field 1040. The link reference display window 1020 may be presented in a tabbed format, wherein each tab may contain a different set of link references 42, 52 depending on the type of link reference and link relationship involved. In one embodiment of the invention, there may be three different tabs at the top of the link reference display window 1020, each corresponding to one of the indicator icons (1071, 1072, 1073) in the client toolbar 1010. The first tab may be a private links tab 1074, corresponding to the private links indicator 1072. The second tab may be a publisher links tab 1075, corresponding to the publisher links indicator 1071. The third tab may be a community links tab 1076, corresponding to the community links indicator 1073.

The publisher links tab 1075 displays an embodiment of the link reference display window 1020 presenting link references 42, 52 created by an entity responsible for the document object 40 displayed in the browser window 1030. The private links tab 1074 displays an embodiment of the link reference display window 1020 presenting link references 42, 52 created by the user of the client tool 220. The community links tab 1076 displays an embodiment of the link reference display window 1020 presenting link references 42, 52 created by the other users of the system 100.

The document object 40 displayed in the browser window 1030 in FIG. 10 is a representative web page, in this case for a restaurant named Linkspace. When this page is displayed, and the client tool 220 is engaged, as indicated by the recessed display of the client logon button 1050 in the client toolbar 1010, one or more of the indicator icons (1071, 1072, 1073) in the client toolbar 1010 will become highlighted if there are any link references 42, 52 available of the corresponding type.

For example, as illustrated in FIG. 10, the community links indicator 1073 is highlighted, while the publisher links indicator 1071 and the private links indicator 1072 are grayed out. This indicates that the server 30 has returned one or more link references 42, 52 that are categorized as community links and has not returned any link references 42, 52 categorized as publisher or private links. The returned link references 42, 52 are displayed in the link reference display window 1020 under the community links tab 1076. In this case, the link references 42, 52 are displayed in a hierarchical listing under affinity directory headings 1081, 1082. The affinity directory heading 1082 shown represents one community of interest, corresponding to one link directory 35 on a server 30, maintaining one set of link relationships 45 and link references 42, 52, that may include the document object 40 displayed in the browser window 1030. In addition, under each affinity directory heading 1081, 1082, there may be displayed one or more attribute folders 1091, 1092. Each attribute folder 1091, 1092 may contain a grouping of listed hyperlinks 1095, 1096 drawn from the respective affinity directory heading 1082 and related to the document object 40 displayed in the browser window 1030 by a particular link relationship attribute 972.

In the example shown in FIG. 10, affinity directory heading 1082 indicates a link directory 35 focusing on wireless devices in the Washington, D.C. area. Also shown in the example in FIG. 10, the attribute folder 1091 groups listed hyperlinks 1095 by the link relationship attribute 972, further relating document objects 40 to specialty food document objects 50. The listed hyperlink 1095, listed under the attribute folder 1091, comprises the text of the plain language name attribute of a document object concerning coffee and dessert after dinner. In this manner, the listed hyperlink 1095, displayed under the affinity directory heading 1082 and the attribute folder 1091, represents a link reference 52 to a document object 50 that is related, as a document object of interest to wireless device users in the Washington area, and as a specialty food document object, to the document object 40, the restaurant web page, displayed in the browser window 1030.

The attribute folder 1092 shown in the example in FIG. 10 groups listed hyperlinks 1096 by the link relationship attribute 972 further relating documents objects 40 to document objects 50 concerning the downtown area of the Washington, D.C. suburb of McLean. The listed hyperlink 1096 is to a LinkNexus document object for the city of McLean. A LinkNexus document object may comprise a listing of further link references 42, 52 to document objects 40, 50 relating to a particular subject. In the case illustrated in FIG. 10, the LinkNexus document object indicated by the listed hyperlink 1096 may contain link references 42, 52 concerning the suburban city of McLean. In this manner, the listed hyperlink 1096, displayed under the affinity directory heading 1082 and the attribute folder 1092, represents a link reference 52 to a document object 50 that is related, as a document object of interest to wireless device users in the Washington area, and as a link to content relevant to downtown McLean, to the document object 40, the restaurant web page, displayed in the browser window 1030.

The affinity directory heading 1081 shown in the example in FIG. 10 indicates a community related to "Your Company," the user's company. This affinity directory heading 1081 may contain link references 42, 52 to document objects 40, 50 maintained on the user's company's private network 520, accessible to users within the company, but not to the general public, as shown and described in FIG. 5.

The example of a screen view for one embodiment of the client GUI display 225 in FIG. 10 may further include a publish document object button 1045 and a submit link relationship annotation button 1047. The publish document object button 1045 activates a publish document object function of the client tool 220 and opens a publish document object dialog box 1100 within the client user interface 225. The submit link relationship annotation button 1047 activates a submit link relationship annotation function of the client tool 220 and opens a submit link relationship annotation dialog box 1200 within the client user interface 225.

Figure 11:
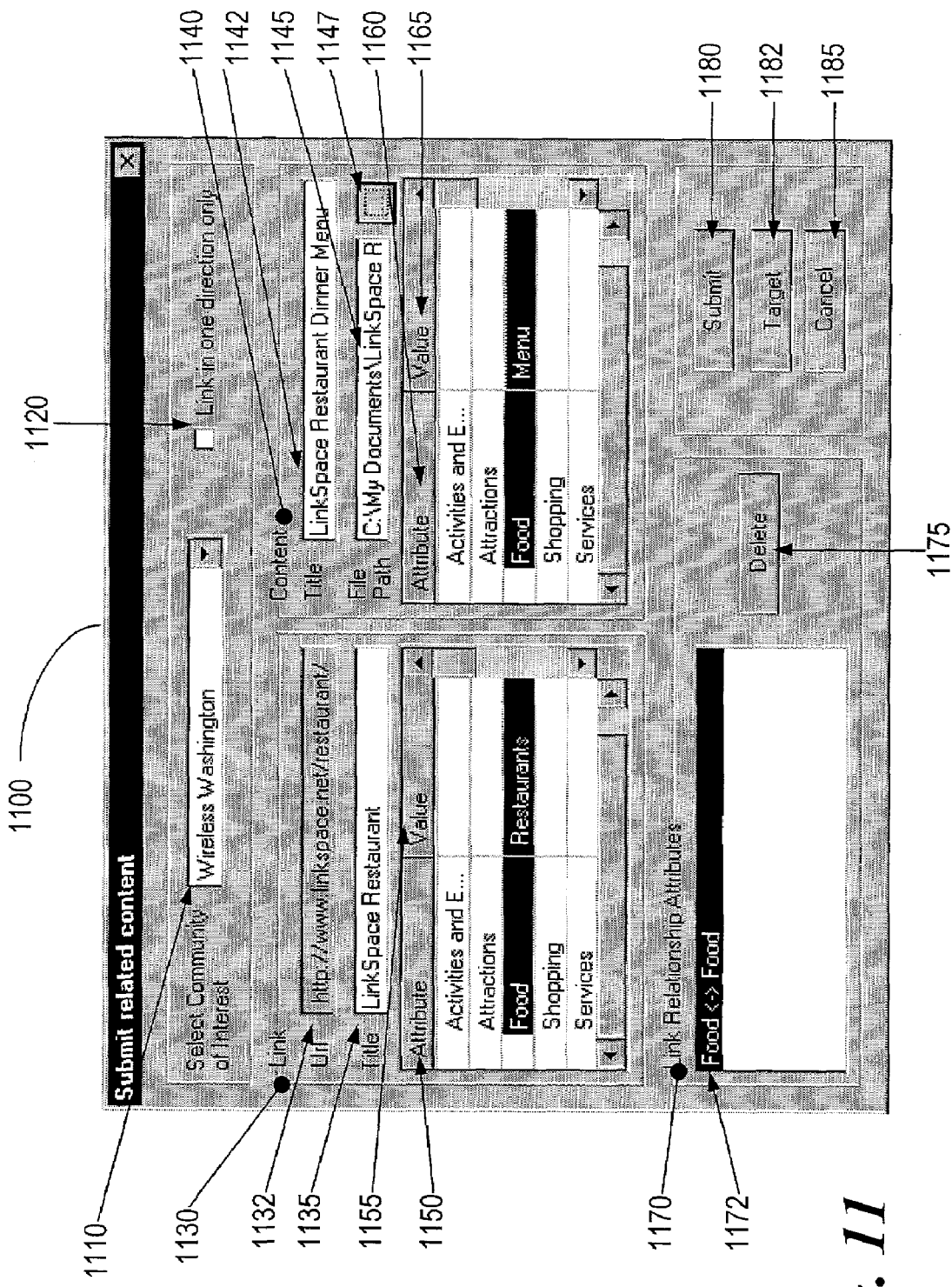
FIG. 11 is one example screen view of a user interface for a publish document object dialog box according to one embodiment of the invention.

FIG. 11 is an example of a user interface, more specifically, a screen view of a user interface for a publish document object dialog box 1100 according to one embodiment of the invention. Using the methods, users may publish link relationships 45 as well as publish or make accessible document objects 40, 50. The publish document object dialog box 1100 permits a user to complete the publish document object function of the client tool 220, enabling the user of the invention to distribute a first document object 40 to other users of the network 10, where the first document object 40 that may not have been otherwise available to other users of the network 10, or not previously stored on the network 10, and to create a link relationship 45 between the first document object 40 and a second document object 50 stored on the network. In one embodiment of the invention, the first document object 40 may be stored on the client device 20. In alternate embodiments of the invention, one or more of the first document objects 40 and second document objects 50 may be stored on the client device 20 or otherwise not made accessible to the network 10. In alternate embodiments of the invention, one or more of the link directories 35, and the link relationships 45 and link references 42, 52 stored in the one or more link directories 35, may be located on the client device 20 or otherwise not made accessible to the network 10.

In the embodiment shown in FIG. 11, the publish document object dialog box 1100 includes many similar features to those of the relate links dialog box 900 described in FIG. 9. In the publish document object dialog box 1100 of FIG. 11, the link-to section 930 of the relate links dialog box 900 in FIG. 9 is replaced with a content section 1140 that describes the first document object 40 that the user wishes to publish to the other users of the invention on the network 10. The publish document object dialog box 1100 includes a drop down list 1110 for selecting a community of interest, implemented as one or more link directories 35, to which the user wishes to publish the first document object 40, and a checkbox 1120 for indicating whether the link relationship 45 being created is to operate bi-directionally or unidirectionally. If the checkbox 1120 is checked, then the link relationship 45 being created will only apply in one direction. In the example illustrated in FIG. 11, the user has selected the community of interest with the name "Wireless Washington" which represents a link directory 35 storing link references 42, 52 and link relationships 45 considered by their creators as relevant to wireless device users in the Washington, D.C. metropolitan area.

The publish document object dialog box 1100 may further include a link section 1130 containing information regarding the second document object 50 to which a link relationship 45 to the first document object 40 is to be created, and a content section 1140 containing information regarding the first document object 40 that the user wishes to publish to other users of the invention. The publish document object dialog box 1100 also includes a link relationship attributes display box 1170, a submit to publish document object button 1180, a target publish button 1182, and a cancel publication button 1185. The submit to publish document object button 1180 is selected by the user when the user has selected and/or entered all information associated with the link reference 52 to the second document object 50, the link reference 42 to the first document object 40 the user wishes to publish, and the link relationship 45 associating the two document objects. Upon selection of the submit to publish document object button 1180, the client tool 220 closes the publish document object dialog box 1100 and transmits a copy of the first document object 40 from the location designated in a first document object file path 1145 to one of the one or more servers 30. The client tool 220 then transmits the information associated with the created link relationship 45, including the assigned unique file name (e.g., URL) of the stored copy of the first document object 40, to one of the one or more servers 30. The transmission of a copy of the first document object 40 may include having the client device 20 retrieve the first document object 40 from a location on the network 10 designated in a first document object file path 1145; storing the first document object 40 temporarily on the client device 20 if the first document object 40 doesn't already reside on the client device 20; transmitting the file containing the copy of the first document object 40 to one of the one or more servers 30; the server 30 assigning a unique file name under which the copy of the first document object 40 may be stored on one or more of the Linkspace-hosted content units 513, 523, 533; the server 30 replacing the first document object file path 1145 in the link reference 42 with the unique file name under which the copy of the first document object 40 is stored on one or more of the Linkspace-hosted content units 513, 523, 533; storing the copy of the first document object on the one or more Linkspace-hosted content units 513, 523, 533; and storing the information associated with the created link relationship 45, including the assigned unique file name (e.g., URL) of the stored copy of the first document object 40, on one of the one or more servers 30.

In one embodiment of the invention, the entity sponsoring or otherwise responsible for the link directory 35 determines the one or more Linkspace-hosted content units 513, 523, 533 on which the copy of the first document object 40 is stored. Alternatively, the user making the copy of the first document object 40 available to other users of the network 10 may determine the one or more Linkspace-hosted content units 513, 523, 533 or the networked content units 514, 524, 534 on which the copy of the first document object 40 may be stored. Using this method, the user may wish to make first document objects 40 of the user's own creation available on the network 10 through a specific link directory 35 or Linkspace-hosted content unit 513, 523, 533 or networked content units 514, 524, 534 that offers an economically advantageous hosting plan or a desired level of user access control and security. Once the first document objects 40 have been made available on the network 10, the user may link the first document objects 40 to other document objects 50 through other link directories 35 using the relate links dialog box 900 illustrated in FIG. 9.

The cancel button 1185 may be selected by the user to abort the creation and publication of the first document object 40 and the associated link relationship 45 and to close the publish document object dialog box 1100.

The target publish button 1182 permits the user publishing the first document object 40 to target specific users of the system 100 to which the user publishing the first document object 40 wishes to have the first document object 40 made available to. Activation of the target publish button 1182 by the user publishing the first document object 40 opens a target published document objects dialog box 1400 shown in FIG. 14.

The link section 1130 may include a second document object URL 1132 associated with the second document object 50 included in the link relationship 45 being created, where the second document object URL 1132 was captured when the publish document object function was engaged; a plain language name field 1135; and a listing of second link reference attributes 1150 and the attribute values 1155 associated with those second link reference attributes 1150. In the example illustrated by FIG. 11, the second document object URL 1132 is the address of a second document object 50 that is a web page for the "LinkSpace Restaurant" located in McLean, Va. The plain language name field 1135 may be captured when the publish document object function was engaged and/or may be edited by the user creating the link relationship 45.

In the embodiment shown in FIG. 11, the content section 1140 includes a first plain language title field 1142; a first document object file path 1145 associated with the first document object 40 the user wishes to publish to other users of the invention; a find file button 1147; and a listing of first link reference attributes 1160 and the attribute values 1165 associated with those first link reference attributes 1160. In the example illustrated by FIG. 11, the first document object file path 1145 is the file location address of a first document object 40 stored on the client device 20 where the first document object 40 is a dinner menu for the "Linkspace Restaurant"

currently residing on the user's client device 20 where it may not be accessible to other users of the network 10. Selection of the find file button 1147 allows the user to locate the file on the client device 20 or other location accessible to the client device 20 and define the first document object file path 1145.

The link relationship attributes display box 1170, as shown for the embodiment illustrated by FIG. 11, includes a list of link relationship attributes 1172 accompanied by a delete link relationship attribute button 1175. The link relationship attributes 1172 are formed by pairs of first link reference attributes 1150 and second link reference attributes 1160 that the user publishing the first document object 40 and creating the link relationship 45 has selected to describe the nature of the link relationship 45 between the first document object 40 and the second document object 50. The delete link relationship attribute button 1175 may be used to delete a selected link relationship attribute 1172 displayed in the link relationship attributes display box 1170.

Figure 12:
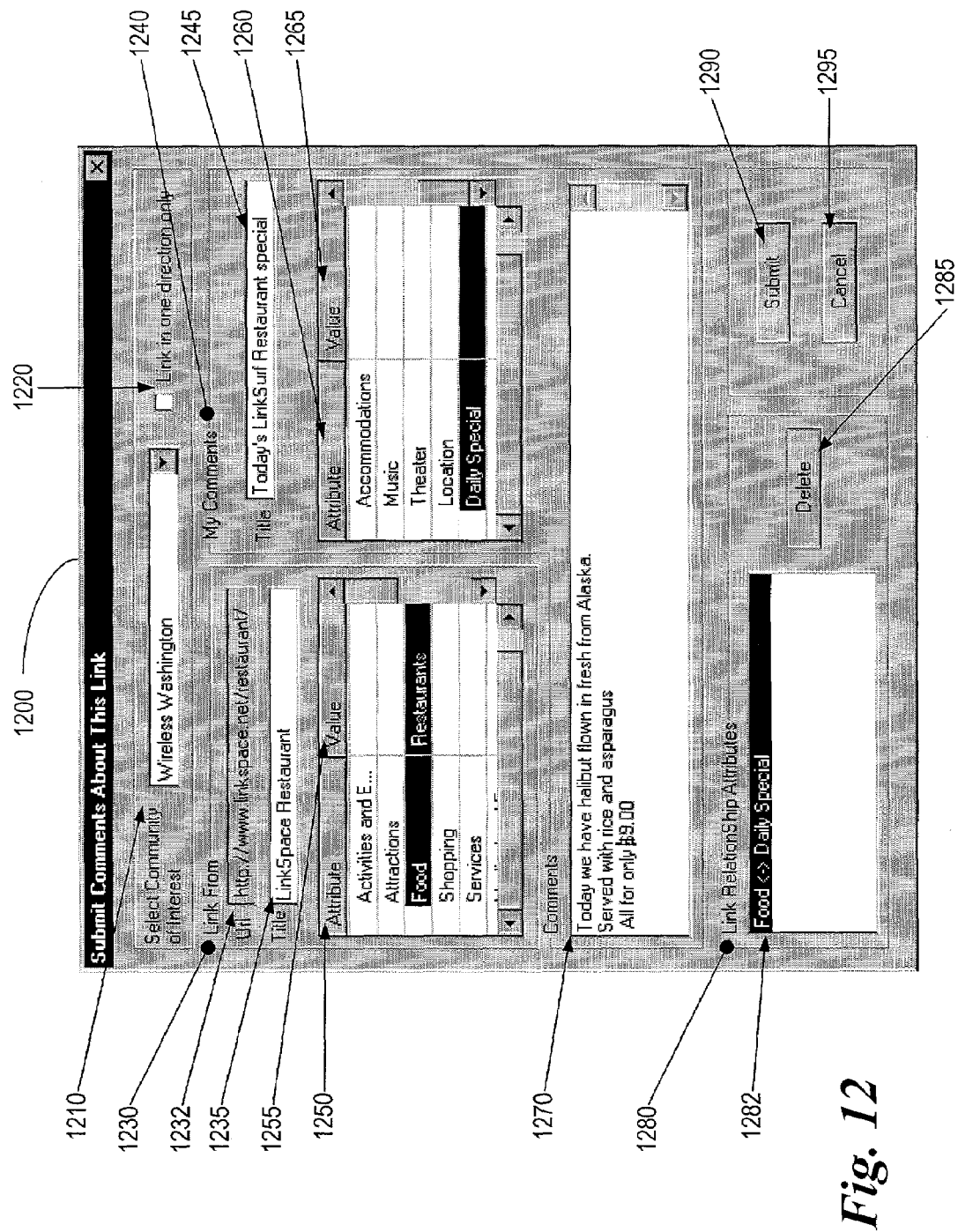
FIG. 12 is one example screen view of a user interface for a submit comments dialog box according to one embodiment of the invention.

FIG. 12 is an example of a user interface, more specifically, a screen view of a user interface for a submit link relationship annotations dialog box 1200 according to one embodiment of the invention. In a manner similar to the publish document object dialog box 1100, the submit link relationship annotations dialog box 1200 permits a user to complete a submit link relationship annotation function of the client tool 220, enabling the user of the invention to create and publish to other users of the network 10 text comments regarding a first document object 40 located on the network 10, and to create a link relationship 45 between the first document object 40 and the user-created text comments regarding the first document object 40.

In the embodiment shown in FIG. 12, the submit link relationship annotations dialog box 1200 includes many similar features to those of the publish document object dialog box 1100 described in FIG. 11. In the submit link relationship annotations dialog box 1200 of FIG. 12, the content section 1140 of the publish document object dialog box 1100 in FIG. 11 is replaced with a comments section 1240 that includes the text comments regarding the first document object 40 that the user wishes to make available to the other users of the invention on the network 10. The submit link relationship annotations dialog box 1200 includes a drop down list 1210 for selecting a community of interest, implemented as one or more link directories 35, to which the user wishes to publish the link relationship 45 and the text comments regarding the first document object 40, and a checkbox 1220 for indicating whether the link relationship 45 being created is to operate bi-directionally or unidirectionally. If the checkbox 1220 is checked, then the link relationship 45 being created will only apply in one direction.

The submit link relationship annotations dialog box 1200 may further include a link section 1230 containing information regarding the first document object 40 for which the text comments are to be created; a comments section 1240 containing information describing the comments regarding the first document object 40 that the user wishes to make available to other users of the invention; and a comment entry box 1270 where the user enters the text of her comments regarding the first document object 40. The submit link relationship annotations dialog box 1200 also includes a link relationship attributes display box 1280, a submit comments button 1290 and a cancel submission button 1295. The submit comments button 1290 is selected by the user when the user has selected and/or entered all information associated with the comments regarding the first document object 40, the link reference 42 to the first document object 40 the user wishes to publish, and the link relationship 45 associating the two document objects.

Upon selection of the submit comments button 1290, the client tool 220 closes the submit link relationship annotations dialog box 1200, transmits the comments regarding first document object 40 along with the link relationship 45 to one of the one or more servers 30. The server 30 then requests assignment of a unique file location to store text comments regarding the first document object 40, stores the comments regarding the first document object 40 on one of the Linkspace-hosted content units 513, 523, 533, and inserts the assigned file location (e.g., URL) for the text comments regarding the first document object 40 in the link relationship 45. The cancel button 1295 may be selected by the user to abort the creation and publication of the comments regarding the first document object 40 and the associated link relationship 45 and to close the submit link relationship annotations dialog box 1200.

The link section 1230 may include a first document object URL 1232 associated with the first document object 40 included in the link relationship 45 being created, where the first document object URL 1232 was captured when the submit link relationship annotation function was engaged; a plain language name field 1235; and a listing of first link reference attributes 1250 and the attribute values 1255 associated with those first link reference attributes 1250. The plain language name field 1235 may be captured when the submit link relationship annotation function was engaged and/or may be edited by the user creating the link relationship 45 and submitting comments.

In the embodiment shown in FIG. 12, the comments section 1240 includes a plain language title field 1245; and a listing of second link reference attributes 1260 and the second attribute values 1265 associated with those second link reference attributes 1260. In the example illustrated by FIG. 12, the plain language title 1245 for the comments entered in the comment entry box 1270 indicate the comments concern a daily special for the "Linkspace Restaurant" indicated by the first document object 40.

The link relationship attributes display box 1280, as shown for the embodiment illustrated by FIG. 12, includes a list of link relationship attributes 1282 accompanied by a delete link relationship attribute button 1285. The link relationship attributes 1282 are formed by pairs of first link reference attributes 1250 and second link reference attributes 1260 that the user publishing the first document object 40 and creating the link relationship 45 has selected to describe the nature of the link relationship 45 between the first document object 40 and the second document object 50. The delete link relationship attribute button 1285 may be used to delete a selected link relationship attribute 1282 displayed in the link relationship attributes display box 1280.

Figure 13:
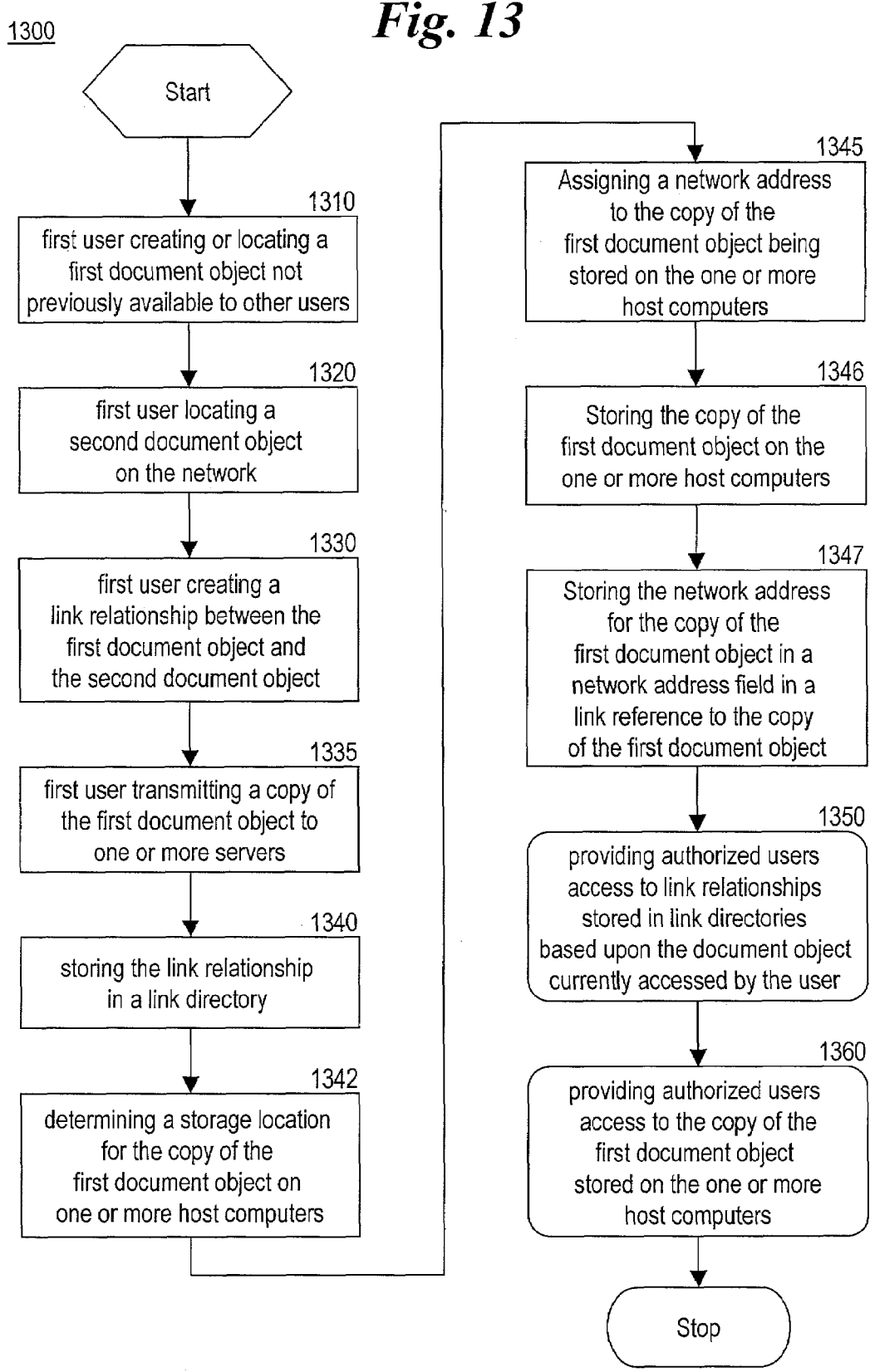
FIG. 13 is a flowchart illustrating a method for publishing a first document object to users of a network, wherein the first document object is not previously available to users of the network according to one embodiment of the invention.

FIG. 13 is a flowchart illustrating a method 1300 according to one embodiment of the invention for publishing or making accessible a first document object 40 to users of the network 10, wherein the first document object 40 may not be previously available to users of the network 10 or may not be easily accessible. The method 1300, by which a first user may publish or create access to a first document object 40 to the network 10, initiates when a first user creates or locates a first document object 40 not previously available to other users of the network 10 (step 1310). The first user then locates a second document object 50 on the network 10 (step 1320). The first user may then create a link relationship 45 between the first document object 40 and the second document object 50 (step 1330). Once the information associated with the created link relationship 45 have been selected by the first user, the first user, through the use of the client tool 220, may transmit a copy of the first document object 40 to one of the one or more servers 30 (step 1335). The first user, again through the use of the client tool 220, transmits the information associated with the created link relationship 45 to a link directory 35 where the link relationship 45 is stored (step 1340).

If a copy of the first document object 40 has been transmitted to the server 30, the method 1300 then determines a storage location for the copy of the first document object 40 on the one or more Linkspace-hosted content units 513, 523, 533 or networked content units 514, 524, 534 (step 1342). Upon determining a storage location for the copy of the first document object 40, the method 1300 assigns a network address consisting of the new network storage location to the link reference 42 representing the copy of the first document object 40 (step 1345). Assigning a network address, such as a URL, to the stored copy of the first document object 40 makes the stored copy of the first document object 40 available to users of the network 10 even though the original first document object 40 may not have been available to users of the network 10. The copy of the first document object 40 is then stored on the one or more Linkspace-hosted content units 513, 523, 533 or networked content units 514, 524, 534 at the network address assigned by the server 30 (step 1346).

The method 1300 then stores the network address for the copy of the first document object 40 in a network address field in a link reference 42 to the stored copy of the first document object 40 (step 1347). In order to make other users of the network 10 aware of the availability of the copy of the first document object 40, the method 1300 provides authorized users of the method 1300 access to link relationships 45 stored in link directories 35 based upon the document object 50 currently accessed by the user (step 1350). The method 1300 also provides authorized users of the method 1300 access to the copy of the first document object 40 stored on the one or more Linkspace-hosted content units 513, 523, 533 (step 1360).

In an alternate embodiment, the user may store the first document object on a networked content units 514, 524, 534 and then use the relate links dialog box 900 described in FIG. 9 to create a link relationship to the first document object 40.

Figure 14:
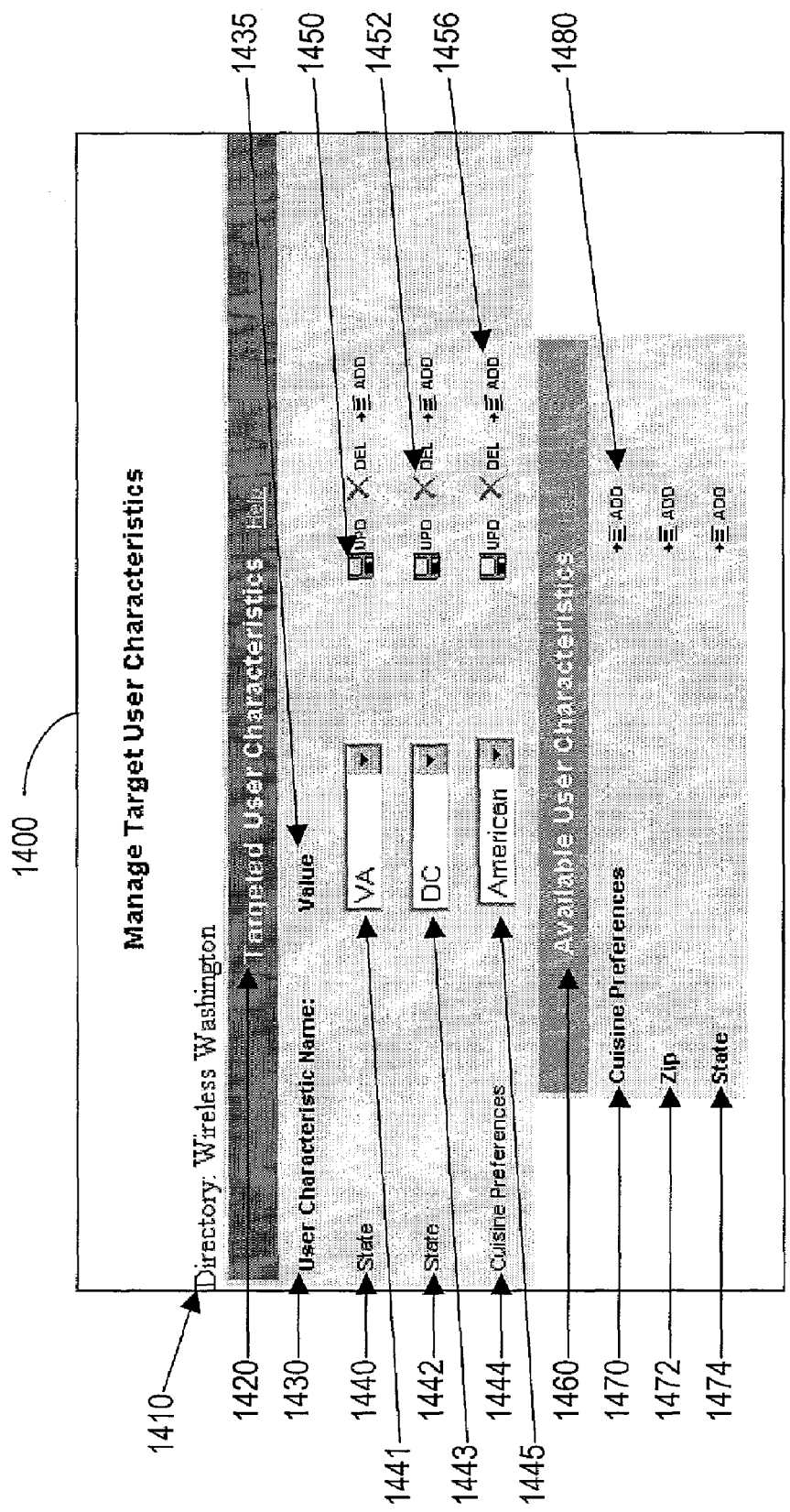
FIG. 14 is one example screen view of a user interface for a target published document objects dialog box.

FIG. 14 is one example screen view of a user interface for a target published document objects dialog box 1400. The target published document objects dialog box 1400 enables the user making the first document object 40 available to users of the network 10 to specify the characteristics of certain users of the network 10 to which the user publishing the first document object 40 wishes to have the first document object 40 made available to. The target published document objects dialog box 1400 is called up by activation of the target publish button 1182 shown in FIG. 11.

The example screen view of the target published document objects dialog box 1400 includes a link directory indicator field 1410, and two sections: a targeted user characteristics section 1420 and an available user characteristics section 1460. The link directory indicator field 1410 specifies the link directory 35 in which the link relationship 45 associated with the first document object 40 the user wishes to make available will be maintained. The available user characteristics section 1460 includes one or more available user characteristics 1470, 1472, 1474 that reflect characteristics associated with users of the network 10 authorized to access link relationships 45 and link references 42, 52 maintained by the link directory 35 indicated by the link directory indicator field 1410. The user of the target published document objects dialog box 1400 may select from among the available user characteristics 1470, 1472, 1474 in order to target the publication of the first document object 40 to users for which the information in the user data store 370 contains those characteristics. The user publishing the first document object 40 activates the add user characteristic button 1480 adjacent to the available user characteristic 1470, 1472, 1474 in order to select that available user characteristic 1470, 1472, 1474 and add it to the targeted user characteristics section 1420.

The targeted user characteristics section 1420 includes one or more targeted user characteristics 1440, 1442, 1444 that have been selected and added from the available user characteristics section 1460. Each targeted user characteristic 1440, 1442, 1444 includes a user characteristic name 1430 and an associated value field 1435. Each targeted user characteristic 1440, 1442, 1444 also has an update targeted user characteristics button 1450, a delete targeted user characteristic button 1452, and an add targeted characteristics value button 1456. Each value field 1441, 1443, 1445 associated with the targeted user characteristics 1440, 1442, 1444 allows the user of the target published document objects dialog box 1400 to select a value for the respective targeted user characteristics.

For example, the targeted user characteristics 1440 and 1442, both instances of the "State" available user characteristic 1474, have values of "VA" 1441 and "DC" 1443 selected, indicating that the user wishing to publish the first document object 40 to other users of the network 10 desires to make the first document object 40 available to users in the states of Virginia and the District of Columbia. Likewise, the value "American" 1445 selected for the targeted user characteristic "Cuisine Preferences" 1444 indicates that the user wishing to publish the first document object 40 to other users of the network 10 desires to make the first document object 40 available and accessible to users whose cuisine preferences include American cuisine.

In an alternate embodiment of the method 1400, the user may wish to publish a civil defense alert, safety alert, or other broadcast message, to targeted users of the system 100 who, based upon information contained in their user characteristics, may be determined to be interested in such a message. In this embodiment, the link reference 42 is presented to any targeted users of such a message according to the steps of step 760 of method 700. This embodiment includes a method for broadcasting a first document object to users of the network comprising creating a link relationship between the first document object and a second document object which is any document object selected by the user; entering one or more user characteristics; comparing the entered characteristics to available user characteristics; targeting users using the comparison; and transmitting the document object to the targeted users.

Figure 15:
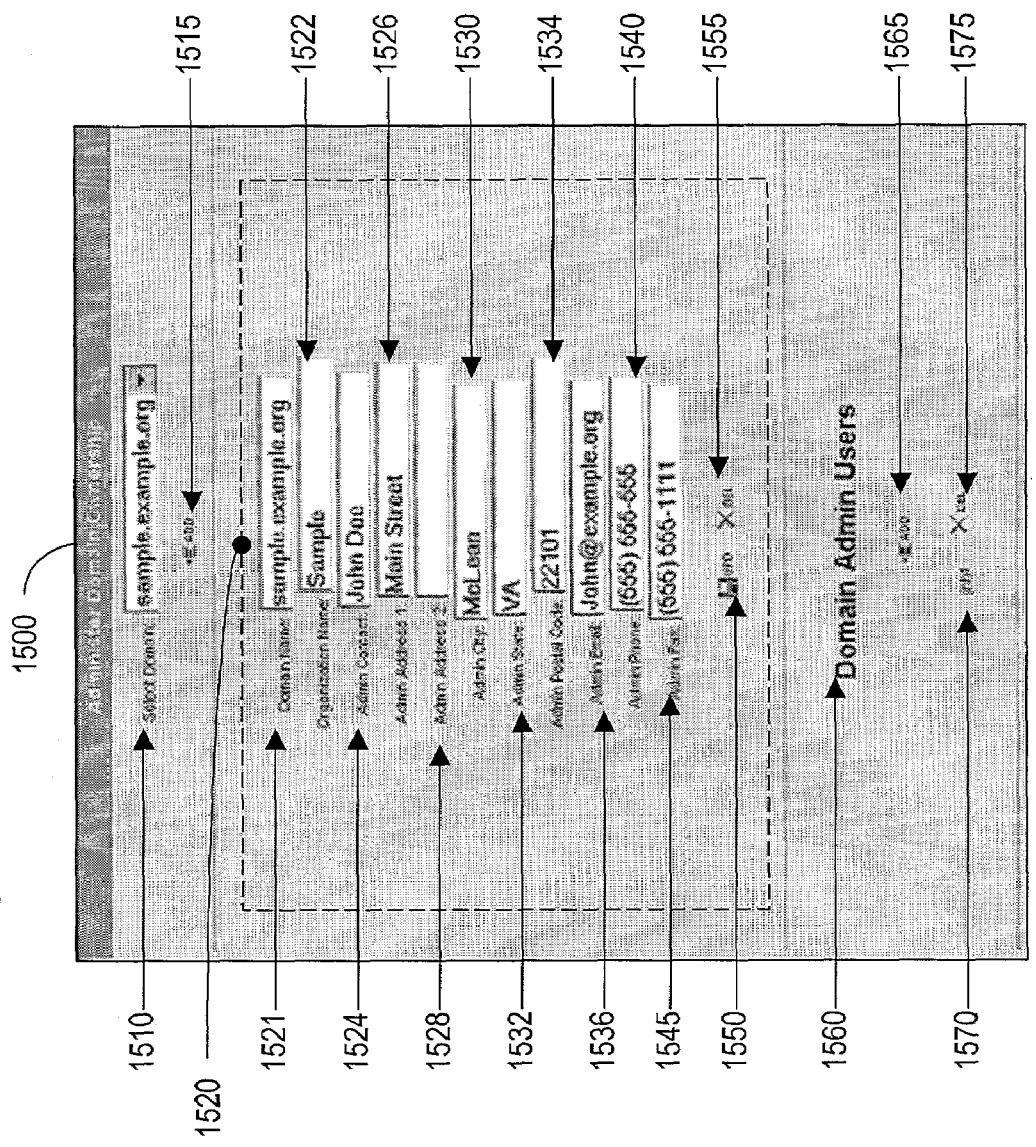
FIG. 15 is one example screen view of a user interface for a domain representation dialog box.

FIG. 15 is one example screen view of a user interface for a domain representation dialog box 1500. The domain representation dialog box 1500 enables a user of the network 10 who has responsibility for managing a link directory 35, a link directory administrator (not shown), to specify one or more users of the system 100 as entities responsible for the document objects 40, 50 which are stored on the network 10 within a specific domain. By specifying that a user is an entity responsible for the document objects 40, 50 stored within a specific domain, user of the system 100 may be made aware that link references 42, 52 and link relationships 45 created by such a responsible user involving document object 40, 50 from the specific domain associated with the responsible user are to be considered "publisher links" as presented under the publisher links tab 1075 shown FIG. 10. The ownership of first document objects 40 published by using the method 1400 may be registered to the publishing user.

The domain representation dialog box 1500 includes a domain selection field 1510, an add represented domain button 1515, a domain information section 1520, and a listing of assigned domain representatives 1560. The domain selection field 1510 allows a link directory administrator to select from a list of network domains to which representative users have been assigned responsibility. The add represented domain button 1515 allows the link directory administrator to add a network domain to the list of domains for which representative users have been assigned responsibility.

The listing of assigned domain representatives 1560 includes one or more usernames 1570 of users of the invention. Each listed username 1570 indicates that that user of the invention has been selected as a representative of the network domain indicated in the domain selection field 1510. The listing of assigned domain representatives 1560 also may include an add domain representative button 1565 which allows the link directory administrator to select and add users of the invention to the listing of assigned domain representatives 1560. Each listed username 1570 may also have a delete domain representative button 1575 adjacent to the listed username 1570 by which a link directory administrator may delete a listed username 1570 from the listing of assigned domain representatives 1560.

The domain information section 1520 includes fields permitting a link directory administrator to enter information relating to the network domain listed in the domain selection field 1510 or a new network domain being added to the list of domains for which representative users have been assigned responsibility through the add represented domain button 1515. The domain information section 1520 includes a domain name field 1521. The domain name field 1521 shown in FIG. 15 follows the form of network domains used on the Internet. This form includes, moving from right to left, a generic top-level domain suffix (".org"), preceded by a period and then a domain name ("example"), which is also preceded by a period, and then a host computer name ("sample"). The domain information section 1520 may also include fields for organization name 1522, administrative contact name 1524, administrative contact address 1526, second administrative contact address line 1528, administrative contact city 1530, administrative contact state 1532, administrative contact postal code 1534, administrative contact e-mail address 1536, administrative contact phone number 1540, and administrative contact fax number 1545.

At the bottom of the domain information section 1520 shown in the example domain representation dialog box 1500 of FIG. 15 there may be an update domain information button 1550 and a delete domain name button 1555. The update domain information button 550 permits a link directory administrator to update the information regarding a network domain to which representative users have been assigned responsibility with the information in the fields in the domain information section 1520. The delete domain name button 1555 deletes the network domain currently selected in the domain selection field 1510 from the list of domains for which representative users have been assigned responsibility.

The document objects 40, 50 managed by the method 1100 may be presented to the user accessing a document object through the link reference display window 1020 shown in the example of a screen view for one embodiment of the client GUI display 225 in FIG. 10. Link relationships 45 between document objects 40, 50 referenced by link references 42, 52 may be presented to the user in a hierarchical listing under affinity directory headings 1081, 1082 in the link reference display window 1020. Each affinity directory heading 1081, 1082 corresponds to one of the one or more link directories 35 on a server 30. In addition, under each affinity directory heading 1081, 1082, there may be displayed one or more attribute folders 1091, 1092. Each attribute folder 1091, 1092 under each affinity directory heading 1082, 1082 corresponds to one of the one or more link relationship attributes or document object attributes that the link directory administrator has defined for the corresponding link directory 35, and that the user has determined through one or more user profiles 230, 332, to be of interest to the user while viewing a document object 40 in the browser display window 1030.

Furthermore, each attribute folder 1091, 1092 may contain one or more listed hyperlinks 1095, 1096 drawn from the respective affinity directory headings 1081, 1082. The listed hyperlinks 1095, 1096 represent link references 52 to second document objects 50 on the network 10 related to the first document object 40 in the browser display window 1030. The link references 52 enable the user to navigate to the second document objects 50 by selecting the listed hyperlinks 1095, 1096. A link reference 52 includes a pointer to the network address, or URL, of the second document 50. The URL of a document object 50 may also permit the rendering tool 210 to present or highlight a particular location in the second document object 50 upon opening the document object 50 when the user selects a listed hyperlink 1095, 1096. Alternatively, the document object 50 accessed when the user selects a listed hyperlink 1095, 1096 may be generated on the network 10 at the time of selection of the listed hyperlink 1095, 1096.

FIGS. 16a, 16b, 16c, 16d, 16e, 16f, and 16g are flowcharts illustrating one embodiment of a method 1600 for enabling users of the network 10 to provide other users of the network 10 with access to link relationships 45 between document objects 40, 50 that are located on the network 10. The method 1600 utilizes the elements of the system 100 of the invention to enable one user, a sponsoring user, to sponsor, populate, and administer one or more link directories 35, to charge the sponsoring user to sponsor, populate, and administer the one or more link directories 35, and to enable the sponsoring user to determine the manner in which users of the system 100 may be charged fees for access to and use of the one or more link directories 35. The sponsoring user may then make those link directories 35, and the link relationships 45 and link references 42, 52 that the link directories 35 contain, available to users of the network 10 on terms that may be determined by the sponsoring user. The method 1600 further provides mechanisms whereby revenue may be generated from the sponsoring user's sponsorship of the one or more link directories 35 and from the activity of the users of the network 10 that the sponsoring user makes the link directories 35 available to.

Figure 16A:
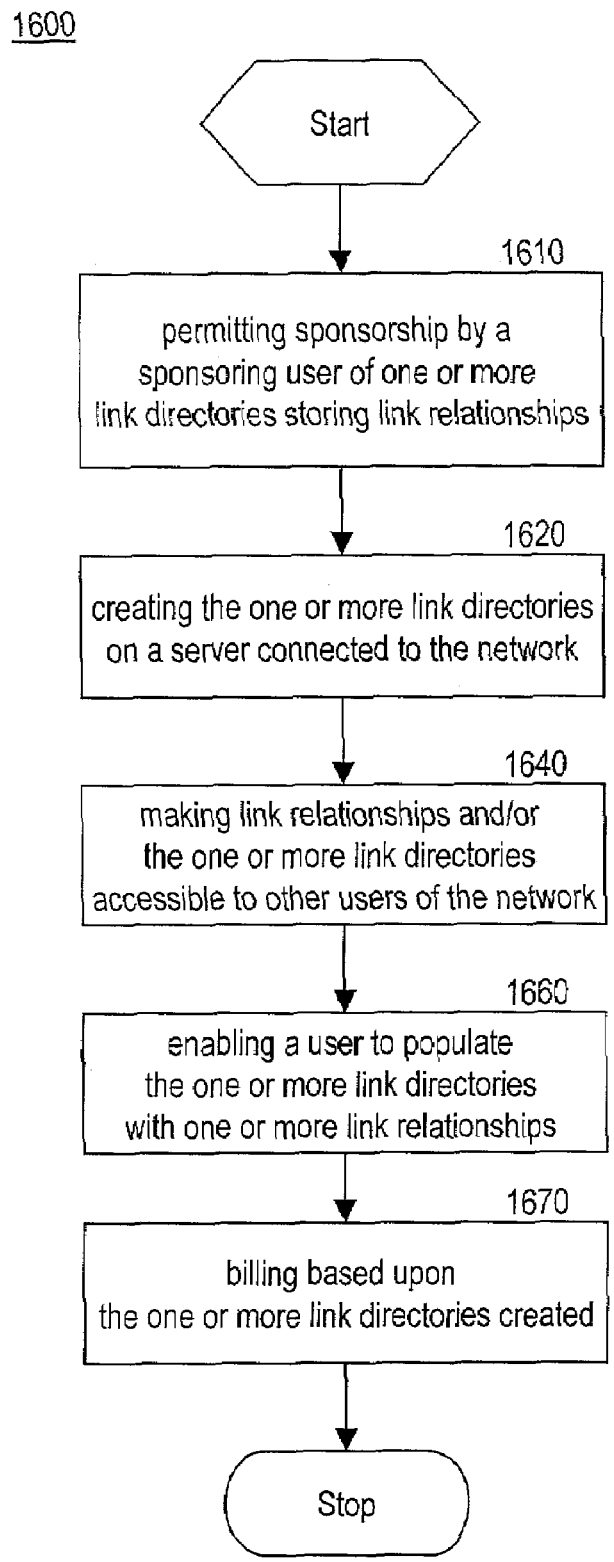
FIGS. 16*a*, 16*b*, 16*c*, 16*d*, 16*e*, 16*f*, and 16*g* are flowcharts illustrating a method for enabling users of a network to pro

FIG. 16a is a flowchart illustrating the steps of one embodiment of the method 1600. The embodiment of the method 1600 shown in FIG. 16a includes steps for permitting sponsorship by a sponsoring user of the one or more link directories 35 containing link relationships 45 (step 1610); creating the one or more link directories 35 on a server 30 connected to the network 10 (step 1620); making one or more link relationships 45, and/or the one or more link directories 35, accessible to users of the network 10 (step 1640); enabling one or more users to populate the one or more link directories 35 with one or more link relationships 45 (step 1660); and billing based upon the one or more link directories 35 created (step 1670).

In one embodiment of the method 1600, the step of enabling one or more users to populate the one or more link directories 35 with one or more link relationships 45 (step 1660) may include a further step of providing the sponsoring user with the capability to allow one or more users to populate the one or more link directories 35 with one or more link relationships 45 (not shown).

Figure 16B:
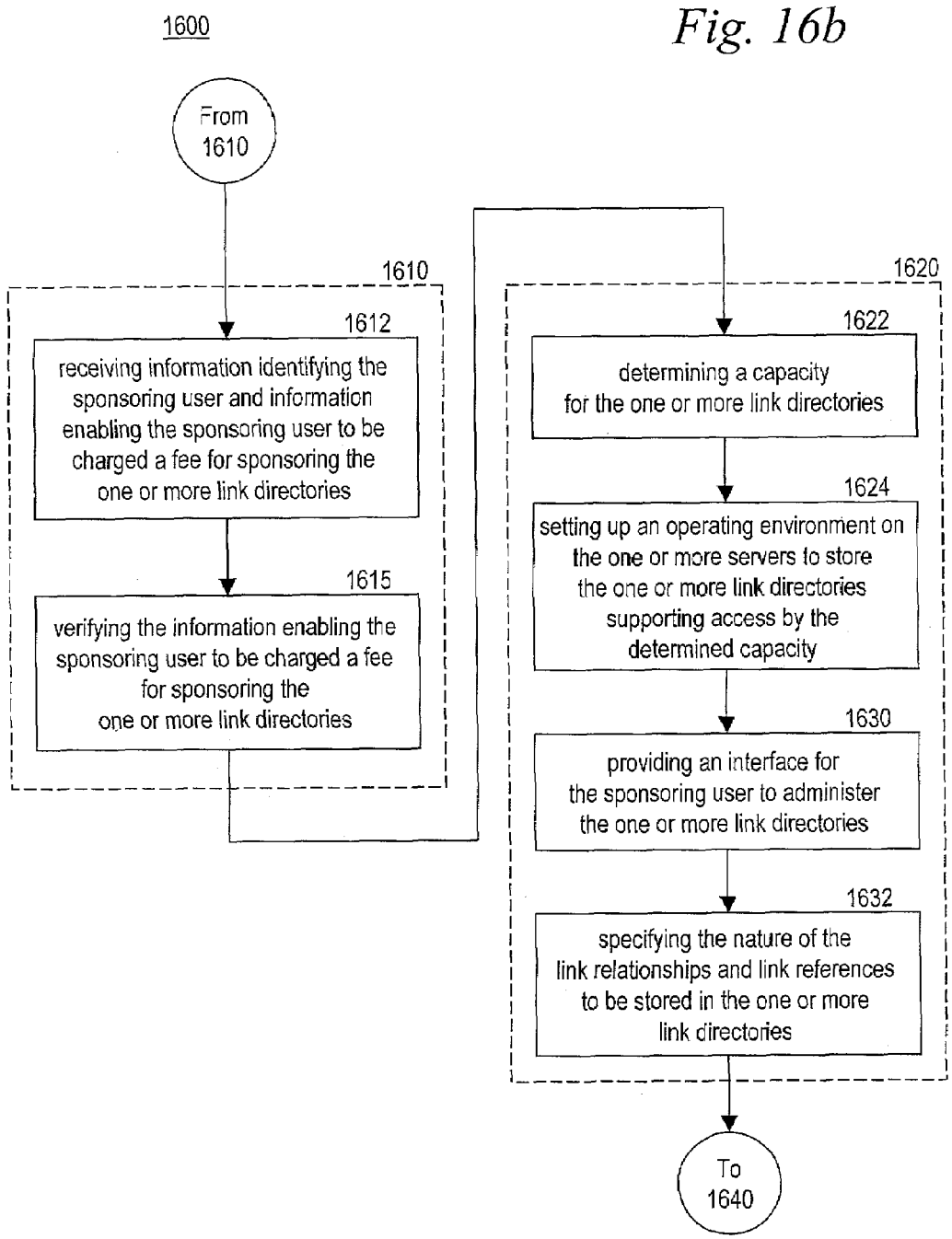

FIG. 16b is a flowchart illustrating one embodiment of the method 1600 wherein the step of permitting sponsorship (step 1610) and the step of creating one or more link directories 35 (step 1620) may include further steps. In one embodiment of the method 1600, as shown in FIG. 16b, the step of permitting sponsorship (step 1610) includes a further step of receiving information identifying the sponsoring user and information enabling the sponsoring user to be charged a fee for sponsoring the one or more link directories 35 (step 1612); and a further step of verifying the information enabling the sponsoring user to be charged a fee for sponsoring the one or more link directories 35 (step 1615). Similarly, in one embodiment of the method 1600, also shown in FIG. 16b, the step of creating the one or more link directories 35 (step 1620) may include a further step of determining a capacity for the one or more link directories 35 (step 1622); a further step of setting up an operating environment on the one or more servers 30 to maintain the one or more link directories 35 supporting the determined capacity (step 1624); a further step of providing an interface for the sponsoring user to administer the one or more link directories 35 (step 1630); and a further step of specifying the nature of the link relationships 45 and link references 42, 52 to be stored in the one or more link directories 35 (step 1632). The step of determining a capacity for the one or more link directories 35 (step 1622) enables the method 1600 to provide a measure of reliability, availability, redundancy and excess capacity to the one or more link directories 35. In one embodiment of the method 1600, the step of specifying the nature of the link relationships 45 and link references 42, 52 (step 1632) may include defining attributes of the link relationships 45 and link references 42, 52 to be stored in the one or more link directories 35.

Figure 16C:
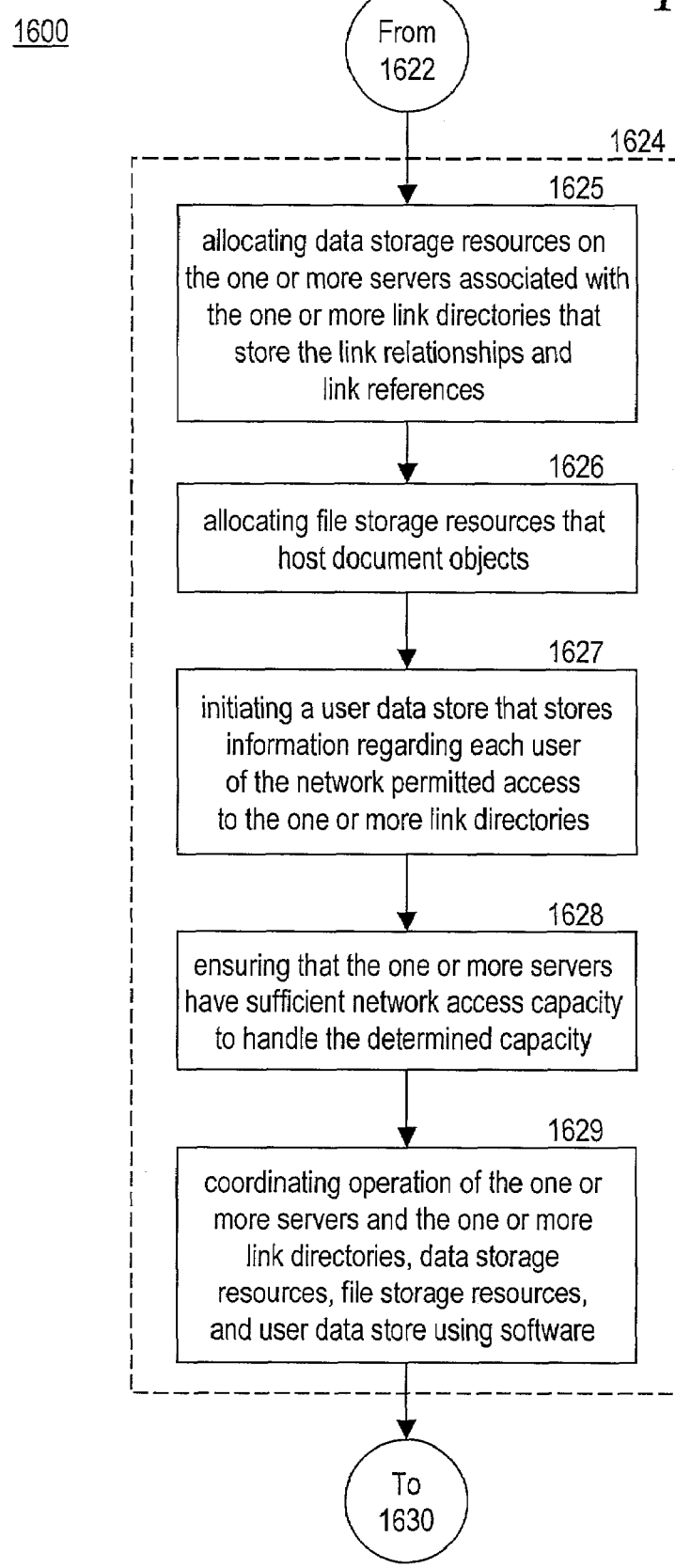

In one embodiment of the method 1600, the step of setting up an operating environment on the one or more servers 30 (step 1624) may include further steps. FIG. 16c is a flowchart illustrating the further steps that perform the step of setting up an operating environment on the one or more servers 30 (step 1624) according to one embodiment of the method 1600. The further steps that make up the step 1624 may include a step of allocating data storage resources on the one or more servers 30 associated with the one or more link directories 35 that store the link relationships 45 and link references 42, 52 (step 1625); a step of allocating file storage resources that host document objects 40, 50 (step 1626); a step of initiating a user data store 370 that maintains information regarding each user of the network 10 permitted access to the one or more link directories 35 (step 1627); a step of ensuring that the one or more servers 30 have sufficient network access capacity to handle the determined user capacity (step 1628); and a step of coordinating operation of the one or more servers 30 and the one or more link directories 35, data storage resources, file storage resources, and user data store 370 using software (step 1629).

The further steps that make up the step 1624 may include a step of assigning one or more servers 30 necessary to support the one or more link directories 35, data storage resources, file storage resources, and user data store 370 (not shown).

The step of ensuring that the one or more servers 30 have sufficient network access capacity to handle the determined capacity (step 1628) may ensure that the system 100 provides sufficient network access by further ensuring sufficient access communications capacity to support communications traffic among the one or more servers 30 and between the one or more servers 30 and the one or more client devices 20. The step of ensuring that the one or more servers 30 have sufficient network access capacity (step 1628) may further include a step of ensuring that the one or more servers 30 are accessible only through a closed network 530 or private network 520.

Figure 16D:
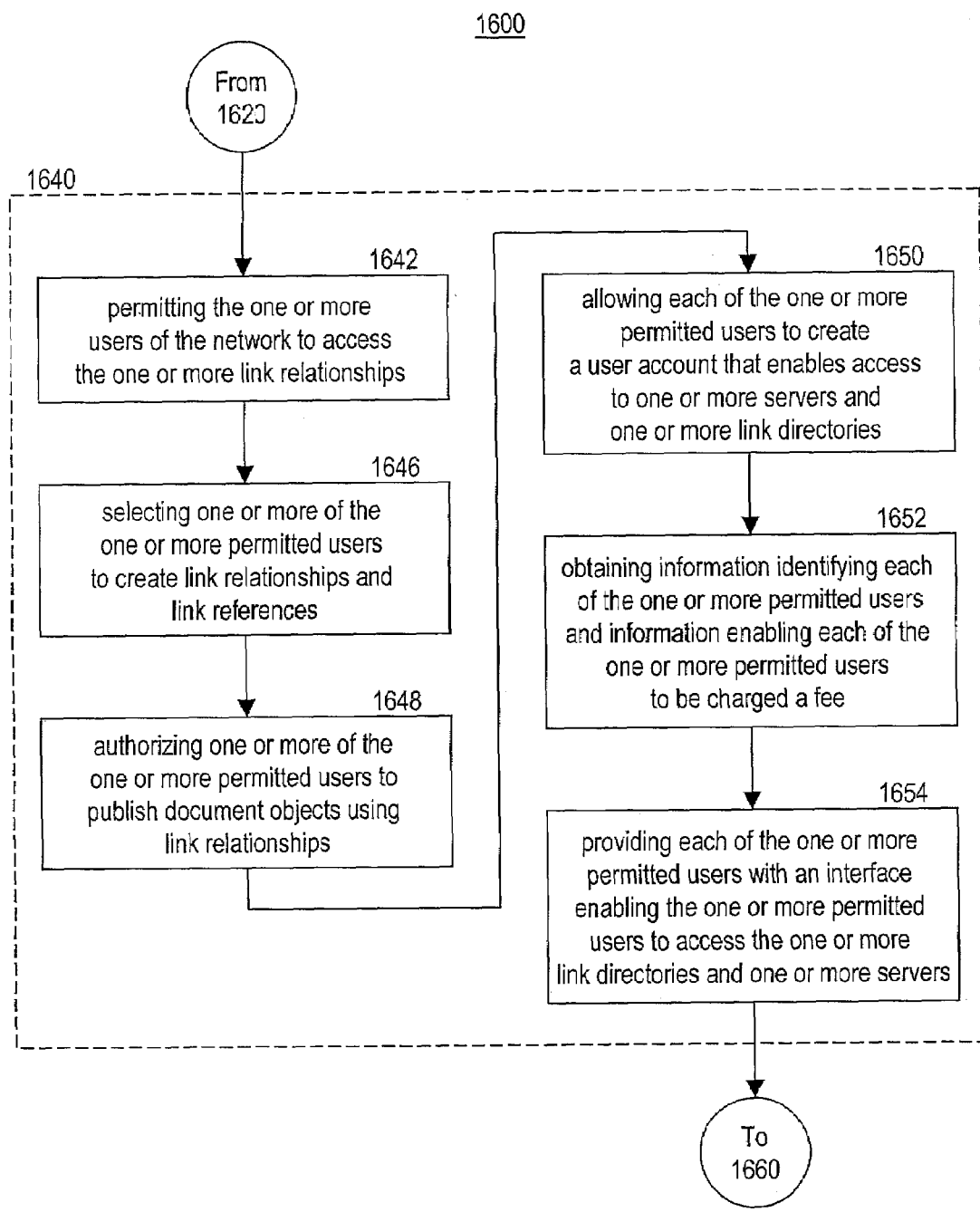

FIG. 16d is a flowchart showing additional steps, according to one embodiment of the method 1600, that further enable execution of the step 1640 of making the one or more link relationships 45 accessible to one or more users of the network 10. The step of making the one or more link relationships 45 accessible to users (step 1640) may include a further step of permitting the one or more users of the network 10 to access the one or more link relationships 45 (step 1642) and a further step of providing each of the one or more permitted users with an interface enabling the one or more permitted users to access the one or more link directories 35 and one or more servers 30 (step 1654). The permitting step 1642 may include steps for verifying the identity of the user, verifying information enabling the user to be charged a fee for access, verifying network access privileges of the user, among other authentication steps (not shown). In a preferred embodiment, the interface enabling the one or more permitted users to access the one or more link directories 35 and one or more servers 30 may be embodied in the client tool 220. The step of making the one or more link relationships 45 accessible to users (step 1640) may also include a step of selecting one or more of the permitted users to create link relationships 45 and link references 42, 52 (step 1646). One example of selecting permitted user to create link relationships 45 and link references 42, 52 (step 1646), may be that in which the sponsoring user selects only employees of the sponsoring user to be permitted the privilege of creating link relationships 45 and link references 42, 52 in link directories 35 sponsored by the sponsoring user.

The step of making the one or more link relationships 45 accessible to users (step 1640) may also, in one embodiment, include a step of authorizing one or more of the permitted users to publish document objects 40, 50 using link relationships 45 (step 1648). In addition, the step of making the one or more link relationships 45 accessible to users (step 1640) may also, in one embodiment, include a step of allowing each of the permitted users to create a user account that enables access to one or more servers 30 and one or more link directories 35 (step 1650). Finally, the step of making the one or more link relationships 45 accessible to users (step 1640) may also, in one embodiment, include a step of obtaining information identifying each of the permitted users and information enabling each of the permitted users to be charged a fee in exchange for being permitted access to the one or more link relationships 45 (step 1652).

Figure 16E:
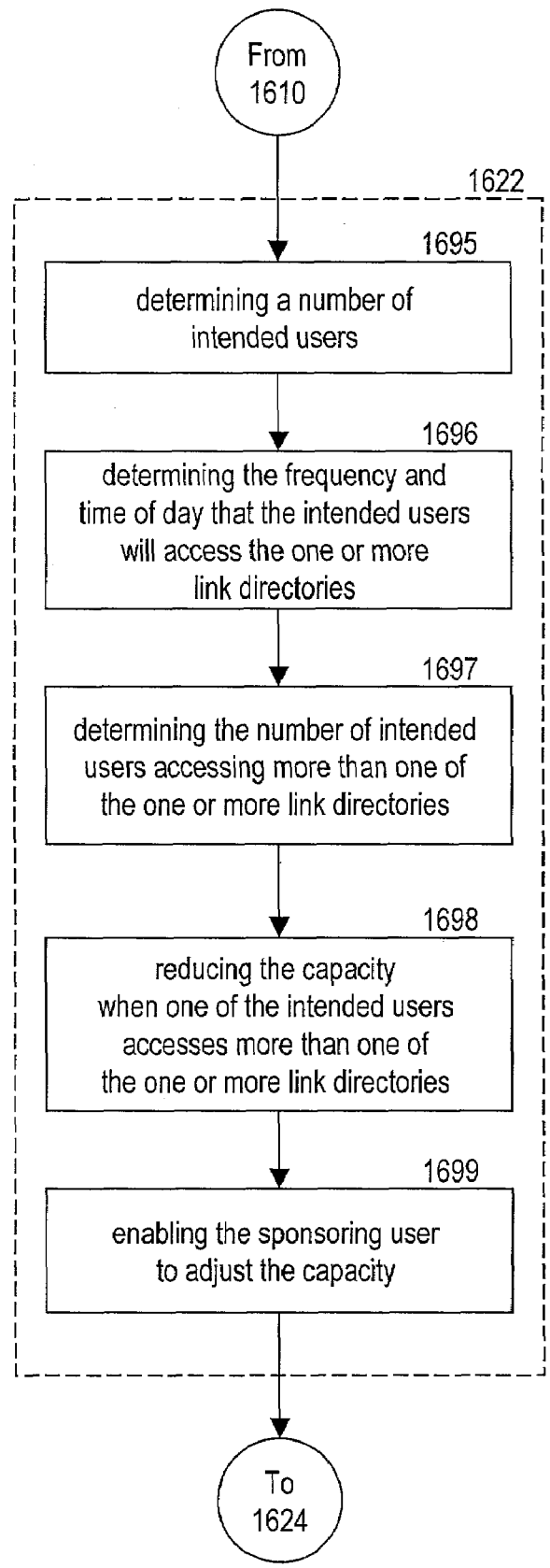

FIG. 16e is a flowchart showing one embodiment of the method 1600 where the step of determining capacity (step 1622) includes additional steps. The embodiment of the method 1600 shown in FIG. 16e expands on the step of determining capacity (step 1622) by including a step of determining a number of intended users (step 1695); a step of determining a frequency and time of day that the intended users will be permitted to access the one or more link directories 35 (step 1696); a step of determining the number of intended users accessing more than one of the one or more link directories 35 (step 1697); a step of reducing the capacity when one of the intended users is permitted access to more than one of the one or more link directories 35 (step 1698); and a step of adjusting the capacity in response to changing determinations of capacity (step 1699).

The step of reducing the capacity provides for, among other things, that the intended users may be interacting with one client tool 220, and one search of the one or more link directories 35, at any instant, and that each client tool 220 can access more than one link directory 35 simultaneously, and that some steps of a search of the one or more link directories 35 do not have to be repeated when more than one link directory 35 is included in the search. This makes possible other benefits including the reduction of server overhead involved where one user simultaneously searches multiple link directories 35 to which the user is permitted access.

Figure 16F:
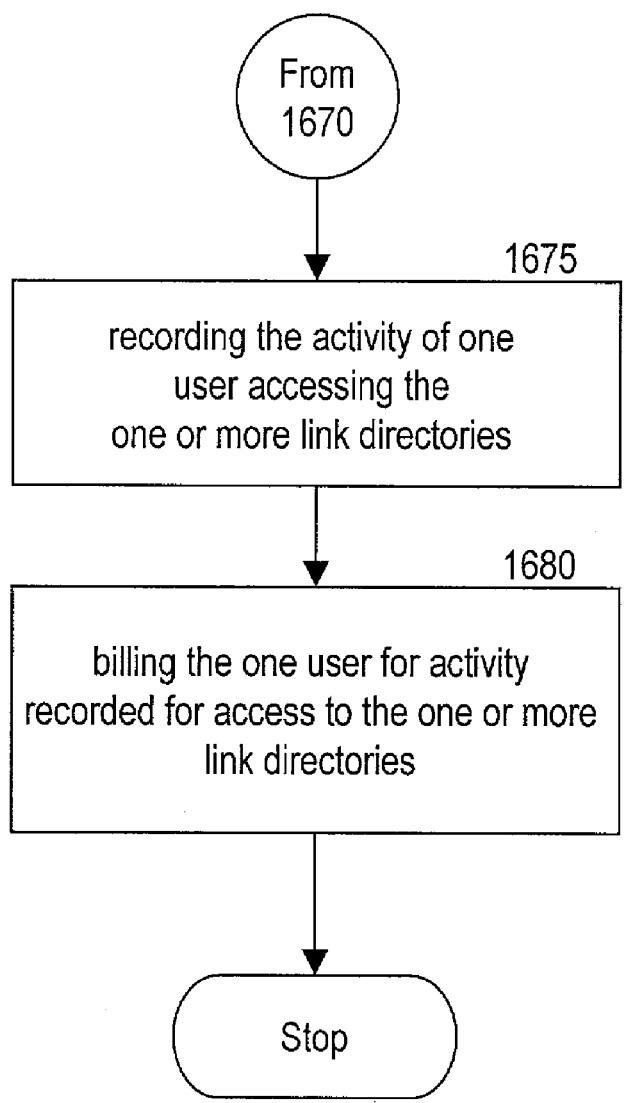

FIG. 16f is a flowchart illustrating additional steps included in one embodiment of the method 1600. The embodiment of the method 1600 shown in FIG. 16f includes additional steps following the step 1670 of billing based upon the one or more link directories 35 created. The method 1600, as illustrated in FIG. 16f, includes a step of recording the activity of one user accessing the one or more link directories 35 (step 1675) and a step of billing the one user for activity recorded for the one user's access to the one or more link directories 35 (step 1680). In one embodiment of the method 1600, the step of billing the one user for activity (step 1680) may include billing the one user for activity recorded for access by users other than the one user to the link relationships 45, link references 42, 52, and hosted document objects 40, 50.

Figure 16G:
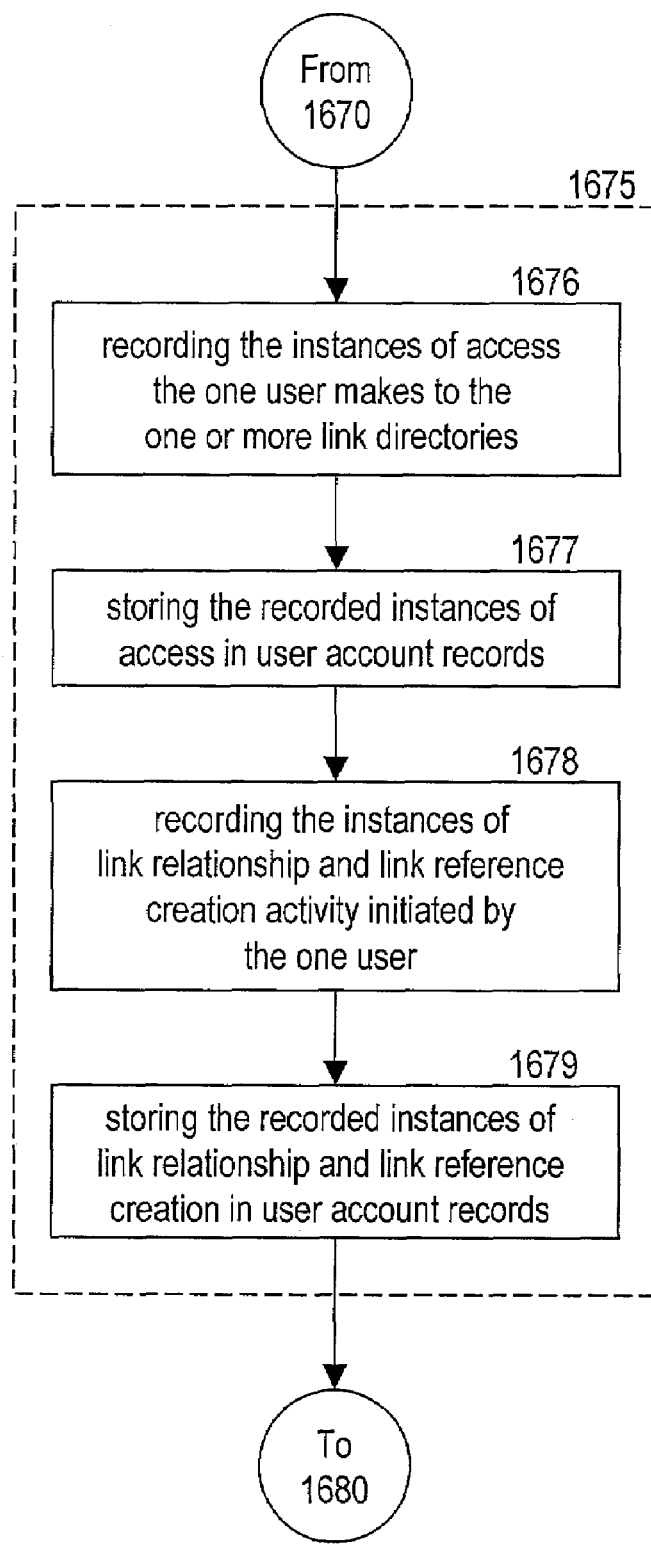

FIG. 16g is a flowchart illustrating one embodiment of the method 1600 where the step of recording the activity of one user accessing the one or more link directories 35 (step 1675). The method 1600, as illustrated in FIG. 16g, includes a step of recording or counting the instances of access the one user makes to the one or more link directories 35 (step 1676); a step of storing the recorded or counted instances of access in user account records 379 (step 1677); a step of recording or counting the instances of link relationship 45 and link reference 42, 52 creation activity initiated by the one user (step 1678); and a step of storing the recorded or counted instances of link relationship 45 and link reference 42, 52 creation in the user account records 379 (step 1679). In the steps of the method 1600 illustrated in FIG. 16g, the one user may be the sponsoring user since the sponsoring user sponsoring the one or more link directories, may, in one embodiment of the method 1600, be included by default in the users of the network 10 that may be permitted to access the one or more link directories.

In another embodiment of the method 1600, the step of recording or tracking the activity of users accessing the one or more link directories 35 (step 1675), may include a step of storing the recorded or counted instances of access to the link relationships 45 and link reference 42,52 in the link relationship entries 460, 470, 480, 490 of the link relationship table 420 and in the link reference entries 430, 440, 450 of the document object table 410 for the one or more link directories 35 containing the link relationships 45 and link references 42,52 accessed by the users (not shown). The recording or tracking of instances of access, link relationship and link references creation activity, and document object publishing activity may comprise measuring the recorded or tracked activity by incrementing a counter for the instances of activity and recording pertinent data regarding the user initiating the instance of activity.

In another embodiment of the method 1600, the step of recording or tracking the activity of one user accessing the one or more link directories 35 (step 1675), may include a step of recording or counting the instances of publishing a document object 40, 50 initiated by the one user (not shown), and a step of storing in the user account records 379 the recorded or counted instances of publishing a document object 40, 50 initiated by the one user (not shown). The steps of recording and storing instances of access (steps 1676, 1677), instances of link relationship 45 and link reference 42, 52 creation and storage (steps 1678, 1679), and instances of document object publishing (not shown) enable the system to bill the sponsoring user sponsoring the one or more link directories 35 and/or bill the user accessing the link directories 35 for each aspect of the recorded or tracked activity.

In an alternate embodiment of the method 1600, the step of recording or tracking the activity of one user accessing the one or more link directories 35 (step 1675) includes a step of preventing information identifying the one user accessing the link relationships 45 and link references 42, 52 from being included in the recorded or counted instances of access to each of the link relationships 45 and link references 42, 52.

The steps of billing based upon the one or more link directories 35 created (step 1670) and of billing the one user (step 1680) may, in various embodiments of the method 1600, may include a further step of presenting an invoice describing activity supporting the bill to the billed user with a request for a payment of an associated fee (not shown). The step of presenting the invoice may be carried out by means of an electronic transaction and presentment of an electronic document object representing the invoice, or by other means included printed and mailed, faxed, or otherwise transmitted invoice documents. The associated fee may include money or other consideration, such as an exchange of goods or services. The fee may be paid by the billed user by means of an electronic transaction, including a wire transfer of funds or an electronic charge to one or more of the billed user's credit cards, or by means of a paper transaction, including a personal or business check, cash or other form of tangible legal tender of exchange. The billed user may further be allowed a prescribed time period in which to make payment of the fee, after which time alternate collection methods, including processing a transaction against the billed user's credit card, may be employed (not shown).

The steps of billing based upon the one or more link directories 35 created (step 1670) and of billing the one user (step 1680) may, in various embodiments of the method 1600, include a plurality of additional steps of billing the sponsoring user and/or billing the one user for each of the types of recorded activity discussed in the description of FIG. 16g.

In one embodiment of the method 1600, the step of billing based upon the one or more link directories 35 created (step 1670) may include a step of billing the sponsoring user for data storage resources on the server 30 associated with the one or more link directories 35 (not shown). In one embodiment of the method 1600, the step of billing based upon the one or more link directories 35 created (step 1670) may include a step of billing the sponsoring user for file storage resources that host document objects 40,50, including document objects 40, 50 published by permitted users of the one or more link directories 35 (not shown). In another embodiment of the method 1600, the step of billing based upon the one or more link directories 35 created (step 1670) may include a step of billing the sponsoring user a fee for each user of the network 10 permitted access to the one or more link directories 35 (not shown).

In a further embodiment of the method 1600, the step of billing based upon the one or more link directories 35 created (step 1670) may include a step of billing the sponsoring user for each link relationship 45 and link reference 42, 52 stored by each permitted user of the one or more link directories 35 (not shown). In another embodiment of the method 1600, the step of billing based upon the one or more link directories 35 created (step 1670) may include a step of billing the sponsoring user for each recorded instance of access to the one or more link directories 35 made by each user of the one or more link directories 35 (not shown). In one embodiment of the method 1600, the step of billing based upon the one or more link directories 35 created (step 1670) may include a step of billing the sponsoring user a fee for a given time period in which the one or more link directories 35 is accessible to permitted users of the one or more link directories 35 (not shown).

In one embodiment of the method 1600, the step of billing the one user (step 1680) may include a step of billing the one user a fee for a given time period in which the one user accesses the one or more servers 30 and the one or more link directories 35 (not shown). In one embodiment of the method 1600, the step of billing the one user (step 1680) may include a step of billing the one user for each instance of link relationship 45 and link reference 42, 52 creation recorded for the one user (not shown). In another embodiment of the method 1600, the step of billing the one user (step 1680) may include a step of billing the one user for file storage resources that host document objects 40, 50 published by the one user (not shown).

In one embodiment of the method 1600, the step of making the one or more link relationships 45 accessible (step 1640) may include a step of enabling the one user to select one or more link directories 35 the one user wishes to access. In this embodiment of the method 1600, the step of billing the one user (step 1680), may then include a step of billing the one user for each link directory 35 selected for access by the one user (not shown).

In one embodiment of the method 1600, the step of billing the one user (step 1680) may include a step of billing the one user for recorded instances of activity initiated by users accessing the link relationships 45 and link references 42, 52 created and stored by the one user, and for hosted content published by the one user.

Additional embodiments of the method 1600 may include one or more of the further steps of billing the sponsoring user and/or further steps of billing the one user described above in any combination of such steps.

Figure 17:
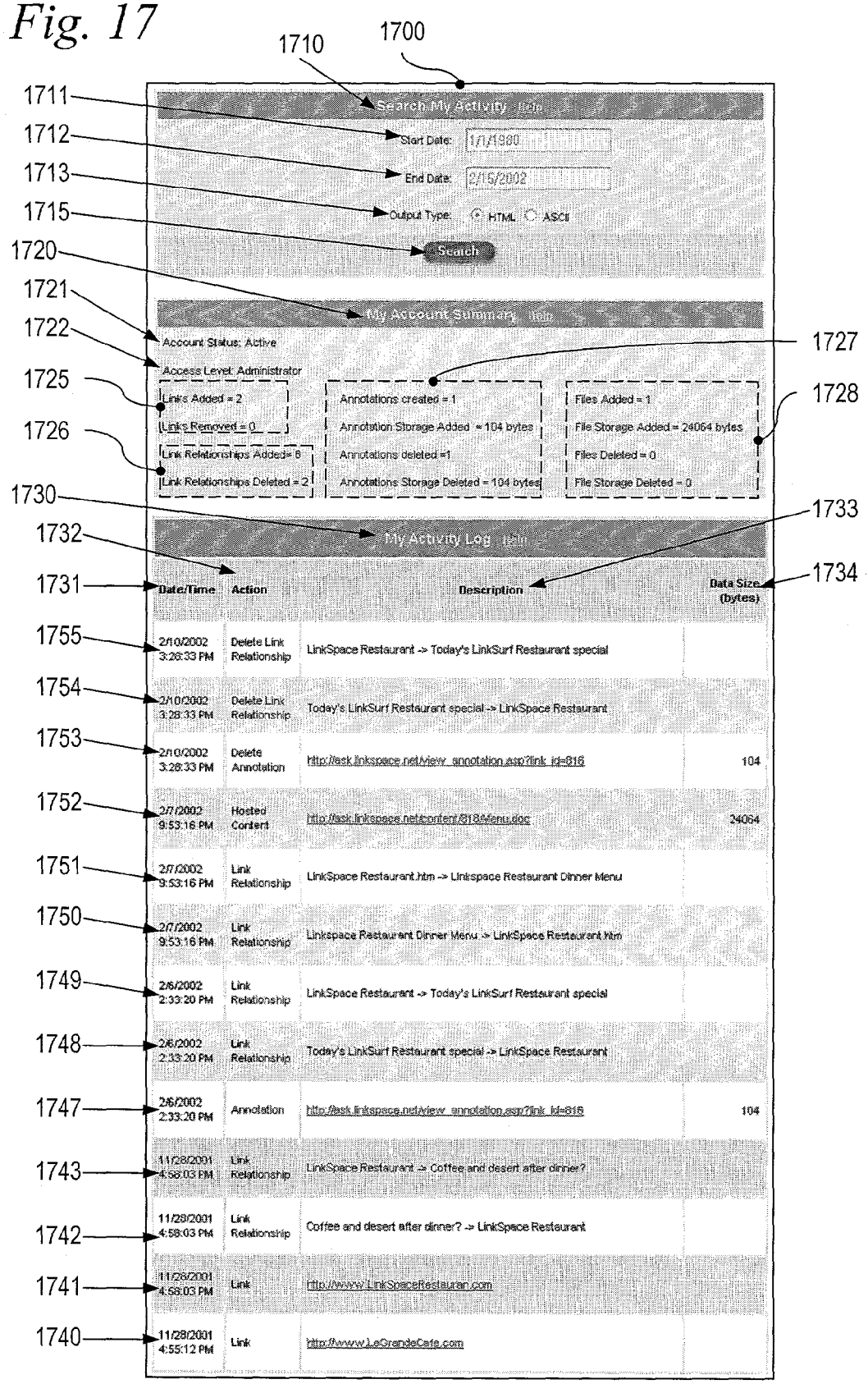
- FIG. 17 is one example screen view of a user interface for a user account activity report.

FIG. 17 is one example screen view of a user interface for a user account activity report 1700 that presents selected information maintained in the user account record 379 associated with one permitted user of the one or more link directories 35. The information maintained in the user account record 379 associated with one permitted user includes details of the activity that the one permitted user has engaged in while accessing the one or more link directories 35.

A permitted user of the one or more link directories 35 may interact with the client tool 220 to display the user account activity report screen 1700 and enable the permitted user to obtain the details of the permitted user's activity accessing the one or more link directories 35 to which the permitted user is permitted access. The user account activity report screen 1700 includes an activity search area 1710, an account summary area 1720, and an activity log display area 1730. The activity search area 1710 includes a start date field 1711, an end date field 1712, output type selection boxes 1713, a search activity button 1715, and a reset search fields button 1716.

One permitted user of the one or more link directories 35 may initiate a search of the information maintained in the user account record 379 associated with one permitted user by specifying a beginning search date in the start date field 1711 and an ending search date in the end date field 1712 so that the search will locate all recorded activities in the user account record 379 that have a date between the beginning search date in the start date field 1711 and the ending search date in the end date field 1712. This is possible in one embodiment of the system 100 and the method 1600 where the date of each of the recorded instances of link directory 35 access activity made by the permitted user is recorded along with the nature of the access activity (e.g., access to link directories 35, creation and storage of link relationships 45 and link references 42, 52, publication of document objects 40, 50, and publication of annotations to document objects 40, 50), and any file storage resources utilized in the access activity (e.g., for publication of document objects 40, 50, and publication of annotations to document objects 40, 50). The output type selection boxes 1713 enable the permitted user to select the display format in which she wishes to view the results of her search of link directory 35 access activity presented in the user account activity report 1700. In the example shown in FIG. 17, the output type selection boxes 1713 allow the permitted user to choose display formats of HTML or plain text. The search activity button 1715 enables the permitted user to submit her search of link directory 35 access activity and view the results in a refreshed screen view of the user account activity report 1700. The reset search fields button 1716 allows the permitted user to clear the start date field 1711, the end date field 1712, and the output type selection boxes 1713 so that the permitted user may enter new search parameters in those fields.

The account summary area 1720 displays a summary of the results of the search of link directory 35 access activity initiated in the activity search area 1710. The account summary area 1720 may include an account status field 1721, an access level field 1722, a link reference activity summary area 1725, a link relationship activity summary area 1726, an annotations activity summary area 1727, and a file storage activity summary area 1728.

The account status field 1721 indicates the activity status of the permitted user's user account for accessing the one or more link directories 35. In the example shown in FIG. 17, the permitted user's account status field is set to "Active," indicating that the permitted user is an active permitted user of the one or more link directories 35. The access level field 1722 indicates the permission level for the permitted user's account. In the example shown in FIG. 17, the permitted user's account level field is set to "Administrator," indicating that the permitted user has been authorized to administer the one or more link directories 35 to which the permitted user is permitted access.

The link reference activity summary area 1725 indicates the number of link references 42, 52 the permitted user has both added and deleted in the time period specified for the search of link directory 35 access activity. The link relationship activity summary area 1726 indicates the number of link relationships 45 the permitted user has both added and deleted in the time period specified for the search of link directory 35 access activity. The annotations activity summary area 1727 includes fields indicating the number of published annotations to document objects 40, 50 both added and deleted by the permitted user in the time period specified for the search of link directory 35 access activity. The annotations activity summary area 1727 also includes fields indicating the file storage resources used (displayed in kilobytes of data in the preferred embodiment) by the published annotations to document objects 40, 50 both added and deleted by the permitted user in the time period specified for the search of link directory 35 access activity. The file storage activity summary area 1728 includes fields indicating the number of published document objects 40, 50 both added and deleted by the permitted user in the time period specified for the search of link directory 35 access activity. The file storage activity summary area 1728 also includes fields indicating the file storage resources used (displayed in bytes of data in the preferred embodiment) by the published document objects 40, 50 both added and deleted by the permitted user in the time period specified for the search of link directory 35 access activity.

The activity log display area 1730, as shown for the embodiment illustrated by FIG. 17, displays a detailed listing of each instance (1740-1755) of link directory 35 access activity recorded for the permitted user in the user account record 379 associated with the permitted user. In the example user account activity report screen 1700 shown for the embodiment illustrated by FIG. 17, each listed instance of link directory 35 access activity recorded for the permitted user in the time period specified for the search of link directory 35 access activity displayed in the activity log display area 1730 includes a field for a date and time 1731 of the access activity, a type of access activity 1732, a description 1733 of the access activity, and a size of data used 1734 for the access activity. In the example user account activity report screen 1700 shown for the embodiment illustrated by FIG. 17, each listed instance of link directory 35 access activity is listed in chronological order with the most recent access activity listed at the top, and the earliest access activity listed at the bottom of the activity log display area 1730.

The listed instances (1740-1755) of link directory 35 access activity displayed in the activity log display area 1730 as shown in the example illustrated by FIG. 17 include a first listed instance 1740. The date and time 1731 of the first listed instance 1740 is Nov. 28, 2001, 4:55:12, and represents an access activity type 1732 of "Link," indicating that it represents the creation and storage of a link reference 42 in the one or more link directories 35. The description 1733 of the first listed instance 1740 displays the network address (or URL) of the document object 40 to which the created link reference 42 refers, in this example, "http://www.LeGrandeCafe.com." The next listed instance 1741 has a date and time 1731 of Nov. 28, 2001, 4:58:03, and represents an access activity type 1732 of a type "Link," and the description 1733 displays the URL of the document object 50 to which the created link reference 52 refers, in this example, "http://www.LinkSpaceRestaurant.com."

The listed instance 1742 has a date and time 1731 of Nov. 28, 2001, 4:58:03, and represents an access activity type 1732 of "Link Relationship," indicating that it represents the creation of a link relationship 45. The description 1733 of the listed instance 1742 displays the plain language names of the participating link references 42,52 in the order of the link relationship 45 between the link references 42, 52 from a starting link reference 42 to an ending link reference 52 wherein the plain language names describe the link relationship 45 recorded for the listed instance 1742, "Coffee and dessert after dinner?=>LinkSpace Restaurant." The next listed instance 1743 also has a date and time 1731 of Nov. 28, 2001, 4:58:03, and represents an access activity type 1732 of "Link Relationship." The description 1733 of the listed instance 1743 displays a link relationship attribute describing the link relationship 45 recorded for the listed instance 1742, "LinkSpace Restaurant=>Coffee and dessert after dinner?" In this manner, the listed instances 1742 and 1743 illustrate an example of the representation of a recorded bi-directional link relationship 45.

The listed instance 1747 has a date and time 1731 of Feb. 6, 2002, 2:33:20 PM, and is of an access activity type 1732 of "Annotation," indicating that it represents a published annotation to a document object 50. The description 1733 of the listed instance 1747 displays a hyperlink to the annotation file stored on the hosted content unit 513. The size of data 1734 used for the listed instance 1747 is shown since the listed instance 1747 refers to a recorded instance of publication of an annotation which uses file storage resources on one or more hosted content units 513. The size of data 1734 used for the listed instance 1747 is shown in the example of FIG. 17 to be 104 bytes.

The listed instance 1748 has a date and time 1731 of Feb. 6, 2002, 2:33:20 PM, and is of an access activity type 1732 of "Link Relationship," and the description 1733 of the listed instance 1748 displays a pair of plain language names of link references 42, 52 describing the link relationship 45 recorded for the listed instance 1748, "Today's LinkSurf Restaurant special=>LinkSpace Restaurant." The listed instance 1749 has a date and time 1731 of Feb. 6, 2002, and is of an access activity type 1732 of "Link Relationship," and the description 1733 of the listed instance 1749 displays a pair of plain language names of link references 42, 52 describing the link relationship 45 recorded for the listed instance 1749, "LinkSpace Restaurant=>Today's LinkSurf Restaurant special."

The listed instance 1750 has a date and time 1731 of Feb. 7, 2002, 9:53:16 PM, and is of an access activity type 1732 of "Link Relationship," and the description 1733 of the listed instance 1750 displays a pair of plain language names of link references 42, 52 describing the link relationship 45 recorded for the listed instance 1750, "LinkSpace Restaurant Dinner Menu=>LinkSpace Restaurant." The listed instance has a date and time 1731 of Feb. 7, 2002,9:53:16 PM, and is of an access activity type 1732 of "Link Relationship," and the description 1733 of the listed instance 1751 displays a pair of plain language names of link references 42, 52 describing the link relationship 45 recorded for the listed instance 1751, "LinkSpace Restaurant=>LinkSpace Restaurant Dinner Menu."

The listed instance 1752 has a date and time 1731 of Feb. 7, 2002, 9:53:16 PM, and is of an access activity type 1732 of "Hosted Content," indicating that it represents a document object 50 published by the permitted user and hosted on the one or more hosted content units 513. The description 1733 of the listed instance 1752 displays a hyperlink to the document object 50 stored on the hosted content unit 513, "http://ask.linkspace.net/content/818/Menu.doc." The size of data 1734 used for the listed instance 1752 is shown since the listed instance 1752 refers to a recorded instance of publication of document object 50 which uses file storage resources on one or more hosted content units 513. The size of data 1734 used for the listed instance 1752 is shown in the example of FIG. 17 to be 24,064 bytes.

The listed instance 1753 has a date and time 1731 of Feb. 10, 2002, 3:28:33 PM, and is of an access activity type 1732 of "Delete Annotation," indicating that it represents deletion of a published annotation to a document object 50. The description 1733 of the listed instance 1753 displays a hyperlink to the now-deleted (or disabled) annotation file stored on the hosted content unit 513. The size of data 1734 used for the listed instance 1753 is shown since the listed instance 1753 refers to a recorded instance of deletion of an annotation which had used file storage resources on one or more hosted content units 513. The size of deleted data 1734 used for the listed instance 1753 is shown in the example of FIG. 17 to be 104 bytes deleted.

The listed instance 1754 has a date and time 1731 of Feb. 10, 2002, 3:28:33 PM, and is of an access activity type 1732 of "Delete Link Relationship," indicating that a link relationship 45 has been deleted by the permitted user. The description 1733 of the listed instance 1754 displays the pair of plain language names of link references 42, 52 that described the now-deleted link relationship 45 recorded for the listed instance 1754, "Today's LinkSurf Restaurant special=>LinkSpace Restaurant." The listed instance 1755 has a date and time 1731 of Feb. 10, 2002, 3:28:33 PM, and is of an access activity type 1732 of "Delete Link Relationship," indicating that a link relationship 45 has been deleted by the permitted user. The description 1733 of the listed instance 1755 displays the pair of plain language names of link references 42, 52 that described the now-deleted link relationship 45 recorded for the listed instance 1755, "LinkSpace Restaurant=>Today's LinkSurf Restaurant special"

The steps of the methods 600, 700, 800, 1300 and 1600, and subsets of those steps or parts of the methods, may be implemented with hardware or by execution of programs, modules or scripts. The programs, modules or scripts may be stored or embodied on one or more computer readable mediums in a variety of formats, including source code, object code or executable code, among other formats. The computer readable mediums may include, for example, both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for enabling users of a network to provide other users of the network with access to link relationships between document objects that are located on the network, the method comprising:
    creating one or more link directories on one or more servers coupled to the network, wherein the one or more link directories store one or more link relationships between document objects, the one or more link relationships identify a first document object, a second document object, and one or more link relationship attributes describing relationships between the first document object and the second document object, and the link relationships are separate from the first document object and the second document object;
    making the one or more link relationships accessible to one or more users of the network;
    enabling one or more users to populate the one or more link directories with one or more link relationships; and
    billing based upon the one or more link directories created.

2. The method of claim 1 further comprising permitting sponsorship by a sponsoring user of the one or more link directories storing link relationships between document objects.

3. The method claim 1 further comprising:
    tracking the activity of one user accessing the one or more link directories; and
    billing the one user for activity tracked for the one user's access to the one or more link directories.

4. The method of claim 2, wherein the step of permitting sponsorship of the one or more link directories comprises receiving information identifying the sponsoring user and information allowing the sponsoring user to be charged a fee for sponsoring the one or more link directories.

5. The method of claim 4, wherein the step of permitting sponsorship of the one or more link directories comprises verifying the information allowing the sponsoring user to be charged a fee for sponsoring the one or more link directories.

6. The method of claim 2, wherein the step of creating the one or more link directories comprises:
    determining a capacity for the one or more link directories; and
    setting up an operating environment to maintain the one or more link directories supporting the determined capacity, the setting up comprising:
    assigning one or more servers;
    allocating data storage resources on the one or more servers associated with the one or more link directories;
    allocating file storage resources that host document objects;
    initiating a user data store that maintains information regarding users of the network permitted access to the one or more link directories; and
    allotting sufficient network access capacity to handle the determined capacity on the one or more servers; and
    coordinating operation of the one or more servers and the one or more link directories, data storage resources, file storage resources, and user data store using software.

7. The method of claim 6, wherein the step of creating the one or more link directories further comprises allowing the sponsoring user to specify the nature of the link relationships and link references to be stored by the one or more link directories, wherein the specifying comprises defining attributes of the link relationships and link references to be stored by the one or more link directories.

8. The method of claim 6, wherein the step of creating the one or more link directories further comprises providing an interface for the sponsoring user to administer the one or more link directories.

9. The method of claim 6, wherein the step of allocating file storage resources comprises allocating file storage resources for document objects published by the one or more users of the one or more link directories.

10. The method of claim 6, wherein the step of determining a capacity further comprises determining a number of intended users.

11. The method of claim 10, wherein the step of determining a capacity further comprises determining the frequency and time of day that the intended users will access the one or more link directories.

12. The method of claim 11, wherein the step of determining a capacity further comprises determining the number of intended users accessing more than one of the one or more link directories.

13. The method of claim 6, wherein the step of determining a capacity comprises adjusting the capacity.

14. The method of claim 6, wherein the step of setting up an operating environment comprises a step of adjusting the operating environment.

15. The method of claim 12, wherein the step of determining a capacity further comprises reducing the capacity when one of the intended users accesses more than one of the one or more link directories.

16. The method of claim 1, wherein the step of creating the one or more link directories comprises storing link references to document objects in the one or more link directories.

17. The method of claim 2, wherein the step of making the one or more link relationships accessible comprises:
    permitting access to the one or more link relationships; and
    providing an interface enabling the one or more permitted users to access the one or more link relationships.

18. The method of claim 17, wherein the step of making the one or more link relationships accessible further comprises allowing the sponsoring user to select one or more of the permitted users of the one or more link directories to create and store link relationships between document objects and link references to document objects in the one or more link directories.

19. The method of claim 18, wherein the step of making the one or more link relationships accessible further comprises allowing the permitted users to assign defined attributes to link relationships and link references created by the one or more users.

20. The method of claim 17, wherein the step of making the one or more link relationships accessible further comprises authorizing one or more of the permitted users of the one or more link directories to publish document objects using link relationships stored in the one or more link directories.

21. The method of claim 17, wherein the permitting step further comprises allowing each of the permitted users to create a user account that enables access to one or more servers and to the one or more link directories storing link relationships to document objects.

22. The method of claim 21, wherein the step of making the one or more link relationships accessible further comprises obtaining information identifying the permitted users and information enabling the permitted users to be charged a fee for access to the one or more link relationships stored on the one or more servers and stored in the one or more link directories.

23. The method of claim 17 further comprising authorizing the sponsoring user to perform the step of making the one or more link relationships accessible.

24. The method of claim 2, wherein the enabling step comprises providing the sponsoring user with the capability to allow one or more users to populate the one or more link directories with one or more link relationships.

25. The method of claim 3, wherein the step of tracking the activity of one user accessing the one or more link directories comprises:
   counting the instances of access the one user makes to the one or more link directories;
   storing the counted instances of access associated with the one user;
   counting the instances of link relationship and link reference creation activity initiated by the one user in the one or more link directories; and
   storing the counted instances of link relationship and link reference creation associated with the one user.

26. The method of claim 25, wherein the step of tracking the activity of the one user accessing the one or more link directories further comprises:
   counting the instances of access to each of the link relationships and link references stored in the one or more link directories;
   storing the counted instances of access to each of the link relationships and link references.

27. The method of claim 26, wherein information identifying the one user accessing the link relationships and link references is prevented from being included in the counted instances of access to each of the link relationships and link references.

28. The method of claim 25, wherein the step of tracking the activity of one user accessing the one or more link directories further comprises:
   counting instances of publishing a document object initiated by the one user using link relationships stored in the one or more link directories; and
   storing the counted instances of publishing a document object.

29. The method of claim 2, wherein the step of billing based upon the one or more link directories created comprises billing the sponsoring user for data storage resources on the server associated with the one or more link directories.

30. The method of claim 2, wherein the step of billing based upon the one or more link directories created comprises billing the sponsoring user for file storage resources that host document objects.

31. The method of claim 17, wherein the step of billing based upon the one or more link directories created comprises billing the sponsoring user a fee for each user of the network permitted access to the one or more link directories.

32. The method of claim 18, wherein the step of billing based upon the one or more link directories created comprises billing the sponsoring user for each link relationship and link reference stored by a permitted user of the one or more link directories.

33. The method of claim 25, wherein the step of billing based upon the one or more link directories created comprises billing the sponsoring user based upon the counted instances of access to the one or more link directories.

34. The method of claim 3, wherein the step of billing based upon the one or more link directories created comprises billing the sponsoring user a fee for a given time period in which the one or more link directories is accessible to users of the network.

35. The method of claim 6, wherein the step of creating the one or more link directories further comprises providing an interface for the sponsoring user to administer the software that coordinates operation of the one or more servers and the one or more link directories, data storage resources, file storage resources, and user data store.

36. The method of claim 6, wherein the step of allocating file storage resources comprises selecting an existing file storage location on the network to host document objects published by users.

37. The method claim 23, wherein the step of authorizing the sponsoring user to perform the step of making the one or more link relationships accessible further comprises allowing the sponsoring user to authorize one or more users to administer the one or more link directories.

38. The method of claim 23, wherein the step of authorizing the sponsoring user to perform the step of making the one or more link relationships accessible further comprises allowing the sponsoring user to determine a fee to be charged a user for access to the one or more link relationships stored in the one or more link directories.

39. The method of claim 18, wherein the step of authorizing the sponsoring user to perform the step of making the one or more link relationships accessible further comprises allowing the sponsoring user to determine a fee to be charged a user for creating and storing link relationships and link references in the one or more link directories.

40. The method of claim 20, wherein the step of authorizing the sponsoring user to perform the step of making the one or more link relationships accessible further comprises allowing the sponsoring user to determine a fee to be charged for publishing document objects using link relationships stored in the one or more link directories.

41. The method of claim 40, wherein the step of allowing the sponsoring user to determine a fee to be charged for publishing document objects further comprises allowing the sponsoring user to determine a fee to be charged for file storage resources that host published document objects.

42. The method of claim 3, wherein the step of billing the one user comprises billing the one user a fee for a given time period in which the one user accesses the one or more link relationships stored on the one or more servers and in the one or more link directories.

43. The method claim 25, wherein the step of billing the one user comprises billing the one user for instances of link relationship and link reference creation counted for the one user.

44. The method claim 28, wherein the step of billing the one user comprises billing the one user for file storage resources that host published document objects.

45. The method of claim 25, wherein the step of making the one or more link relationships accessible further comprises enabling the one user to select one or more link directories the one user wishes to access.

46. The method of claim 45, wherein the step of making the one or more link directories accessible further comprises enabling users to submit an application to the sponsoring user requesting access to the one or more link directories sponsored by the sponsoring user.

47. The method of claim 45, wherein the step of billing the one user comprises billing for a link directory selected for access by the one user.

48. The method of claim 17, wherein the step of providing permitted users with an interface comprises distributing a client tool enabling access to the one or more link relationships stored in one or more link directories.

49. The method of claim 20, wherein link relationships to published document objects are presented with information identifying the user publishing the document objects.

50. The method of claim 22, wherein the information identifying permitted users comprises information indicating that one of the permitted users is an entity responsible for one or more document objects.

51. The method of claim 50, wherein link relationships identify whether the link relationships have been created by an entity responsible for one or more of the document objects related by the link relationships.

52. The method of claim 51, wherein the entity responsible for one or more of the document objects is charged a fee for presenting the link relationships to the one or more document objects for which the entity is responsible.

53. The method of claim 18, wherein the step of allowing the sponsoring user to select one or more of the permitted users to create and store link relationships and link references further comprises permitting the one or more of permitted users to specify attributes of other users of the network to which the link relationships and link references created and stored will be presented.

54. The method of claim 53, wherein the one or more of the permitted users specifying attributes of users of the network is charged a fee based upon the counted instances of access to the link relationships and link references created and stored.

55. The method of claim 1, wherein the step of making the one or more link relationships accessible further comprises:
    allowing the one or more users to search the one or more link directories for document objects participating in link relationships with a document object currently accessed by the one or more users; and
    returning link relationships to the one or more users searching the one or more link directories simultaneously from a plurality of the one or more link directories.

56. The method of claim 4, wherein the step of making the one or more link relationships accessible further comprises identifying a link directory that includes a link reference to the document object currently accessed by one user.

57. The method of claim 56 further comprising allowing the one user to request access to the identified link directory.

58. The method of claim 4, wherein the user has not been permitted access to any of the one or more link directories, wherein the step of making the one or more link relationships accessible comprises providing an interface enabling access to the one or more link relationships stored in the one or more link directories.

59. The method of claim 26 further comprising billing the sponsoring user based upon the counted instances of access to the link relationships and link references.

60. The method of claim 26, wherein the step of billing the one user comprises billing the one user based upon the counted instances of access to the link relationships and link references.

61. A method for enabling users of a network to provide other users of the network with access to link relationships between document objects that are located on the network, the method comprising:
    creating one or more link directories on one or more servers coupled to the network, wherein the one or more link directories store one or more link relationships between document objects, the one or more link relationships identify a first document object, a second document object, and one or more link relationship attributes describing relationships between the first document object and the second document object, and the link relationships are separate from the first document object and the second document object;
    making the one or more link relationships accessible to one or more users of the network;
    enabling one or more users to populate the one or more link directories with one or more link relationships; and
    billing based upon activity involving access to the one or more link directories.

62. The method of claim 61, wherein the billing step further comprises tracking the activity of one user accessing the one or more link directories.

63. The method of claim 62, wherein the step of tracking the activity of one user accessing the one or more link directories comprises:
    counting the instances of access the one user makes to the one or more link directories;
    storing the counted instances of access associated with the one user;
    counting the instances of link relationship and link reference creation activity initiated by the one user in the one or more link directories; and
    storing the counted instances of link relationship and link reference creation associated with the one user.

64. The method of claim 63, wherein the step of tracking the activity of the one user accessing the one or more link directories further comprises:
    counting the instances of access to each of the link relationships and link references stored in the one or more link directories;
    storing the counted instances of access to each of the link relationships and link references.

65. The method of claim 64, wherein information identifying the one user accessing the link relationships and link references is prevented from being included in the counted instances of access to each of the link relationships and link references.

66. The method of claim 63, wherein the step of tracking the activity of one user accessing the one or more link directories further comprises:

counting instances of publishing a document object initiated by the one user using link relationships stored in the one or more link directories; and storing the counted instances of publishing a document object.

67. The method of claim 62, wherein the step of billing the one user comprises billing the one user a fee for a given time period in which the one user accesses the one or more link relationships stored on the one or more servers and in the one or more link directories.

68. The method claim 63, wherein the step of billing the one user comprises billing the one user for instances of link relationship and link reference creation counted for the one user.

69. The method claim 63, wherein the step of billing the one user comprises billing the one user for file storage resources that host published document objects.

70. The method of claim 63, wherein the step of making the one or more link relationships accessible further comprises enabling the one user to select one or more link directories the one user wishes to access.

71. The method claim 70, wherein the step of billing the one user comprises billing for a link directory selected for access by the one user.

72. The method of claim 61, wherein the step of making the one or more link relationships accessible comprises distributing a client tool enabling access to the one or more link relationships stored in one or more link directories.

73. The method of claim 61, wherein the step of making the one or more link relationships accessible further comprises:

allowing the one or more users to search the one or more link directories for document objects participating in link relationships with a document object currently accessed by the one or more users; and returning link relationships to the one or more users searching the one or more link directories simultaneously from a plurality of the one or more link directories.

74. The method of claim 61, wherein the step of making the one or more link relationships accessible further comprises identifying a link directory that includes a link reference to the document object currently accessed by the one user.

75. The method of claim 74 further comprising allowing the one user to request access to the identified link directory.

76. The method of claim 63, wherein the user has not been permitted access to any of the one or more link directories, wherein the step of making the one or more link relationships accessible comprises providing an interface enabling access to the one or more link relationships stored in the one or more link directories.

77. The method of claim 64, wherein the step of billing the one user comprises billing the one user based upon the counted instances of access to the link relationships and link references.

78. A method for enabling a computing device to store and access link relationships between document objects, the method comprising:

creating one or more link directories on the computing device, wherein the one or more link directories store link relationships between document objects, the one or more link relationships identify a first document object, a second document object, and one or more link relationship attributes describing relationships between the first document object and the second document object, and the link relationships are separate from the first document object and the second document object;

enabling one or more users of the computing device to populate the one or more link directories with one or more link relationships; and allowing one or more users of the computing device to access the one or more link relationships.

\* \* \* \* \*